(12) United States Patent
Ohtake

(10) Patent No.: US 6,215,599 B1
(45) Date of Patent: Apr. 10, 2001

(54) ZOOM LENS OPTICAL SYSTEM

(75) Inventor: Motoyuki Ohtake, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/664,553

(22) Filed: Sep. 18, 2000

Related U.S. Application Data

(62) Division of application No. 09/506,935, filed on Feb. 18, 2000, now Pat. No. 6,166,863, which is a division of application No. 09/100,169, filed on Jun. 18, 1998, now Pat. No. 6,055,114.

(30) Foreign Application Priority Data

| Jun. 18, 1997 | (JP) | 9-177679 |
| Jul. 16, 1997 | (JP) | 9-207203 |
| Aug. 19, 1997 | (JP) | 9-236500 |
| Nov. 14, 1997 | (JP) | 9-314067 |
| Nov. 26, 1997 | (JP) | 9-339452 |

(51) Int. Cl.$^7$ ................................ G02B 15/14
(52) U.S. Cl. ................ 359/688; 359/676; 359/684
(58) Field of Search ................... 359/688, 676, 359/683, 684, 686

(56) References Cited

U.S. PATENT DOCUMENTS

| 4,439,017 | 3/1984 | Yamaguchi | 359/687 |
| 4,591,235 | 5/1986 | Tokumaru et al. | 359/686 |
| 4,629,294 | 12/1986 | Tanaka et al. | 359/686 |
| 4,673,258 | 6/1987 | Masumato | 359/686 |
| 4,759,617 | 7/1988 | Tokumaru | 359/686 |
| 4,846,562 | 7/1989 | Tokumaru et al. | 359/686 |
| 5,189,557 | 2/1993 | Endo | 359/683 |
| 5,191,476 | 3/1993 | Sato | 359/687 |
| 5,499,141 | 3/1996 | Ohtake | 359/684 |
| 5,606,459 | 2/1997 | Nakatsuji | 359/683 |
| 5,627,682 * | 5/1997 | Nagaoka | 359/688 |
| 5,706,138 * | 1/1998 | Abe et al. | 359/688 |
| 5,734,508 | 3/1998 | Sato | 359/687 |

FOREIGN PATENT DOCUMENTS

| 57-35822 | 2/1982 | (JP) | G02B/15/18 |
| 58-95315 | 6/1983 | (JP) | G02B/15/16 |
| 60-14212 | 1/1985 | (JP) | G02B/15/20 |
| 60-55314 | 3/1985 | (JP) | G02B/15/20 |
| 4-186211 | 7/1992 | (JP) | G02B/15/20 |
| 4-208912 | 7/1992 | (JP) | G02B/15/20 |
| 6-34885 | 2/1994 | (JP) | G02B/15/167 |
| 7-92390 | 4/1995 | (JP) | G02B/15/22 |
| 8-94933 | 4/1996 | (JP) | G02B/15/20 |

* cited by examiner

Primary Examiner—Georgia Epps
Assistant Examiner—Jordan M. Schwartz
(74) Attorney, Agent, or Firm—Vorys, Sater, Seymour and Pease LLP

(57) ABSTRACT

A zoom lens having a high zoom ratio (>4×) and a large aperture ratio (FNO 2.8) and capable of providing close-range focus with only a small amount of aberration fluctuations. The zoom lens comprises either five or six lens groups. An exemplary zoom lens comprises, objectwise to imagewise, a first lens group having positive refractive power, a second lens group having negative refractive power and separated from the first lens group by a first air space, a third lens group having negative refractive power and separated from the second lens group by a second air space, a fourth lens group having positive refractive power and separated from the third lens group by a third air space, and a fifth lens group having a positive refractive power and separated from said fourth lens group by a fourth air space. The zoom lens is designed such that when zooming from the maximum wide-angle state to the maximum telephoto state, at least the second lens group moves imagewise and at least one of the first lens group and said fourth lens group moves so as to increase the first and second air spaces and decrease the third and fourth air spaces. The zoom lens also satisfies one or more of a number of preferred design conditions.

7 Claims, 25 Drawing Sheets

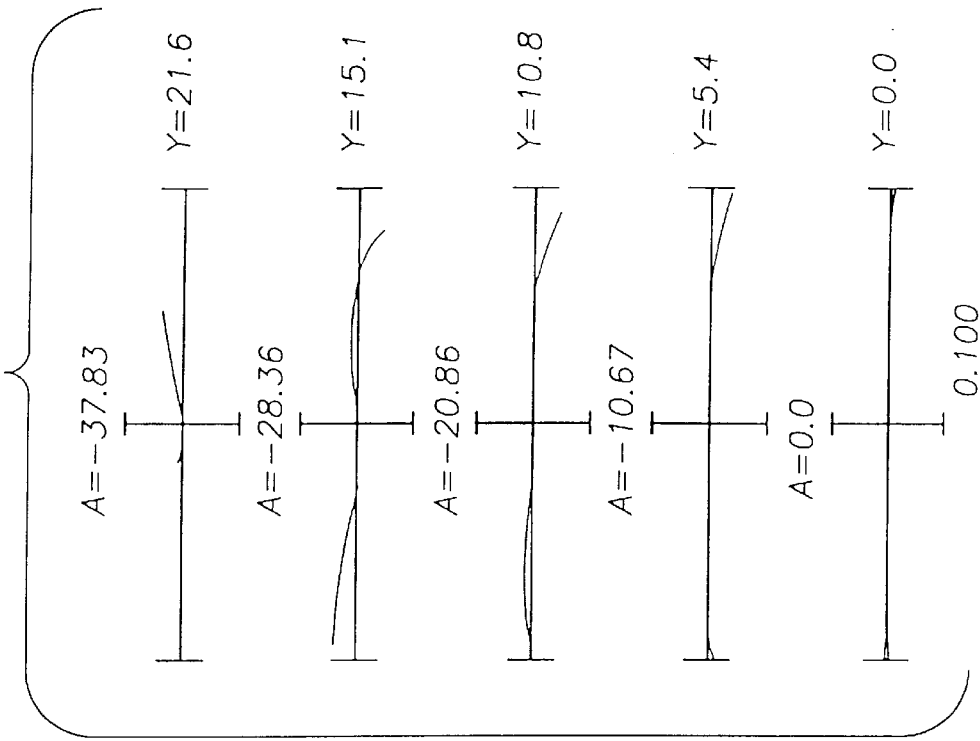
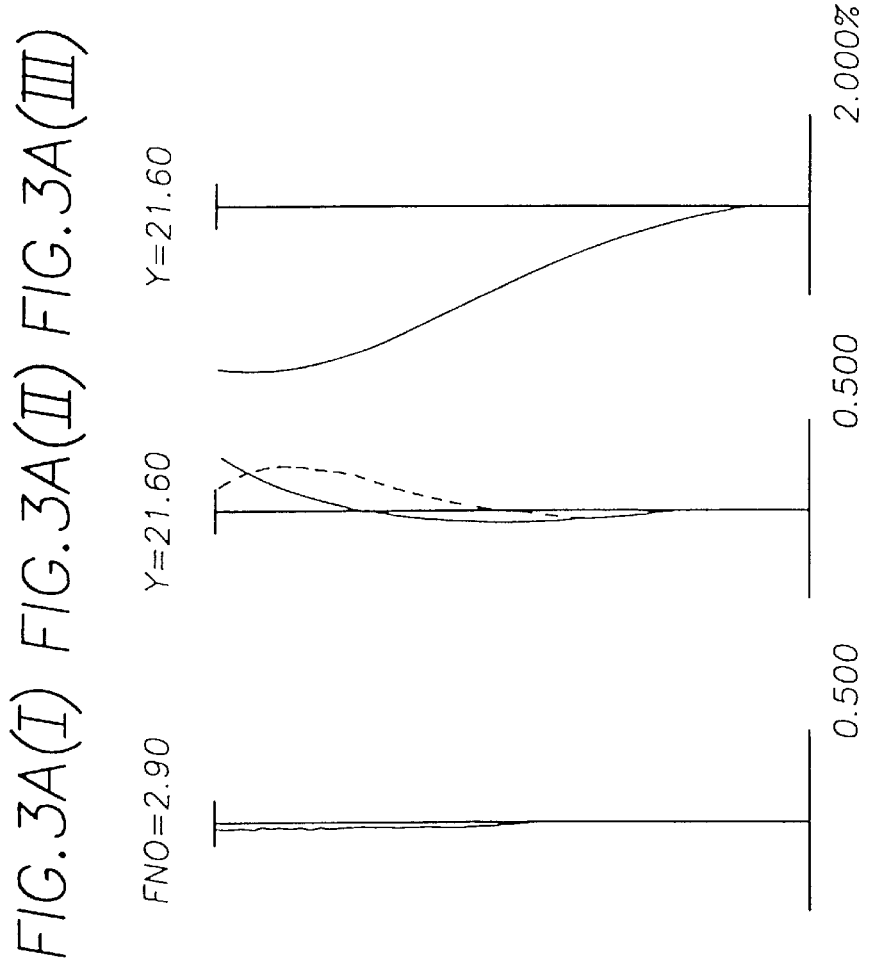
FIG.3A(I)  FIG.3A(II)  FIG.3A(III)  FIG.3A(IV)

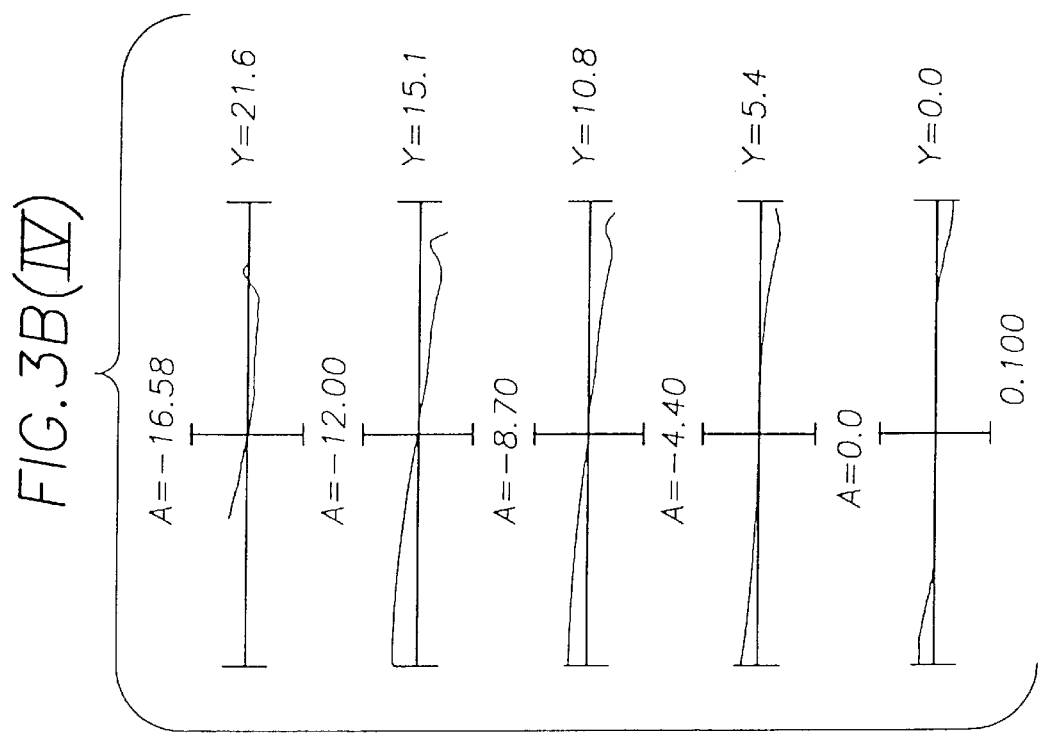
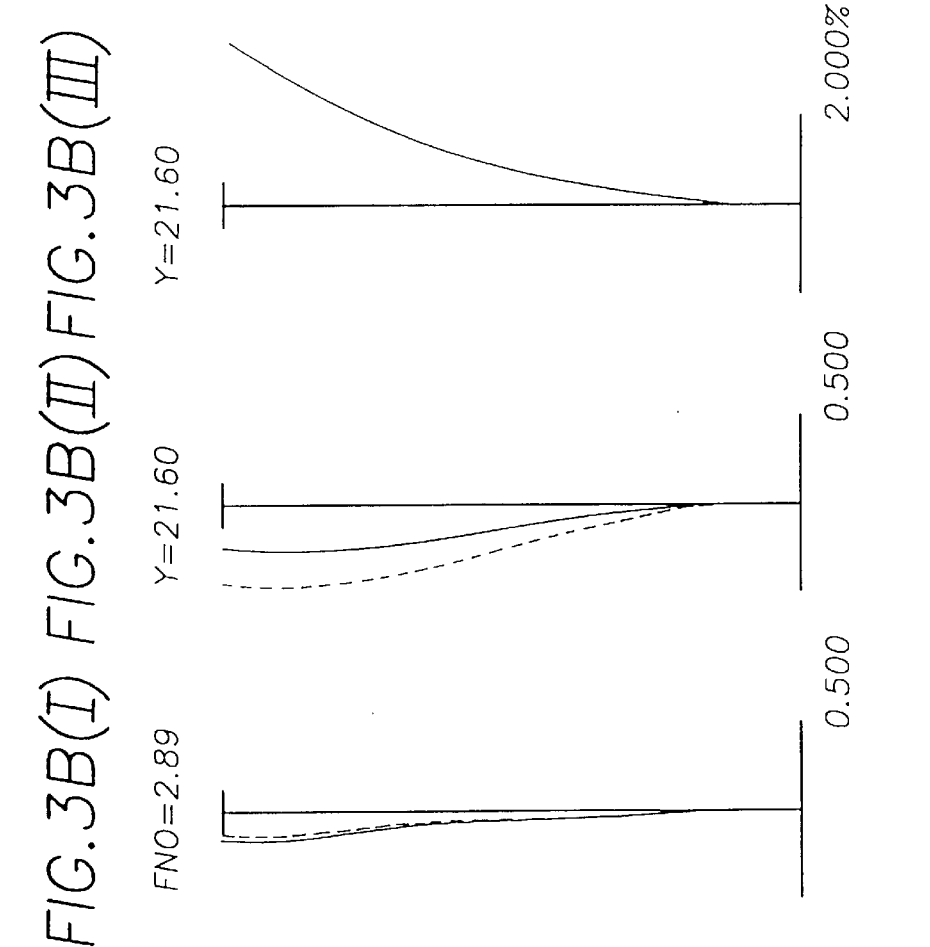

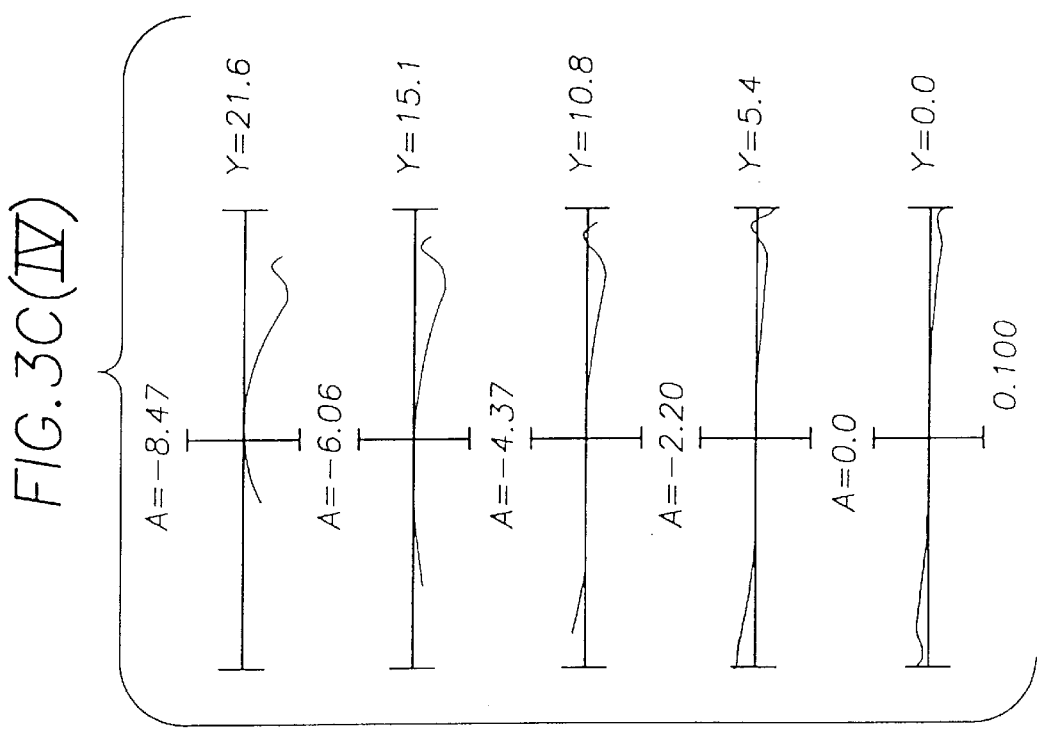
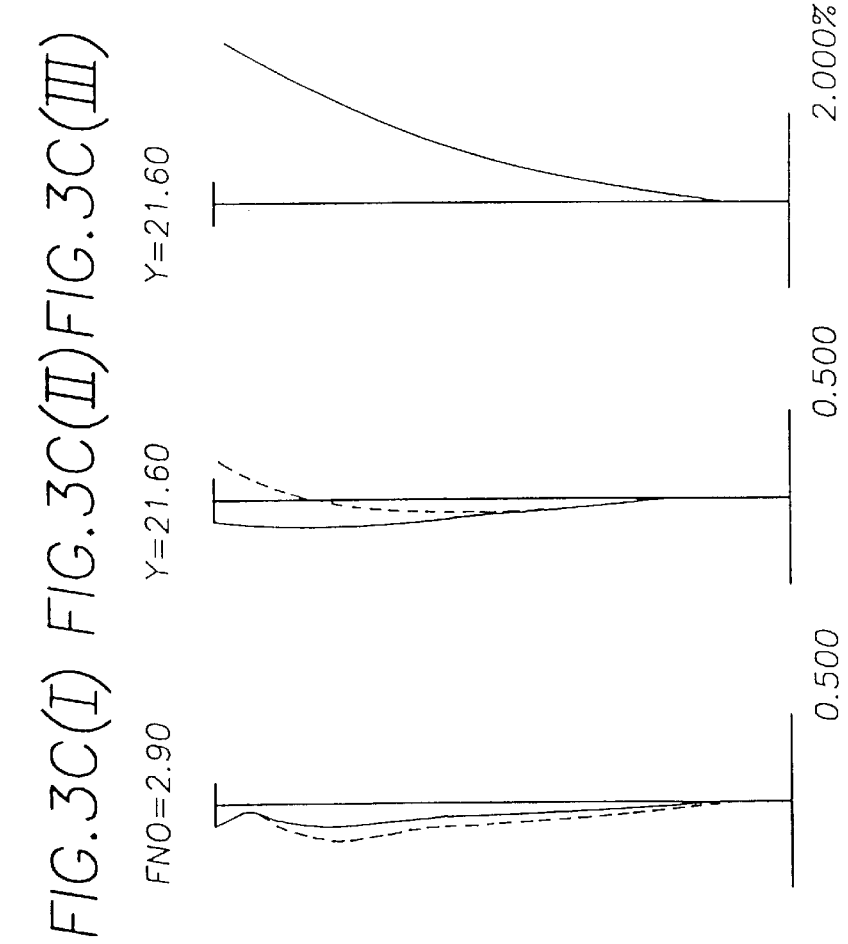

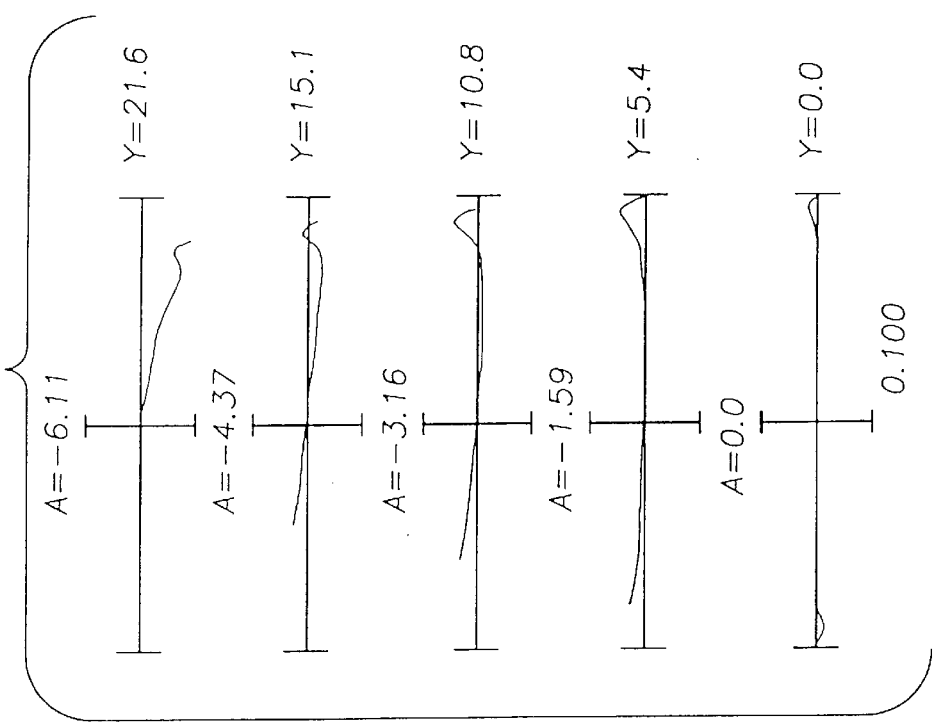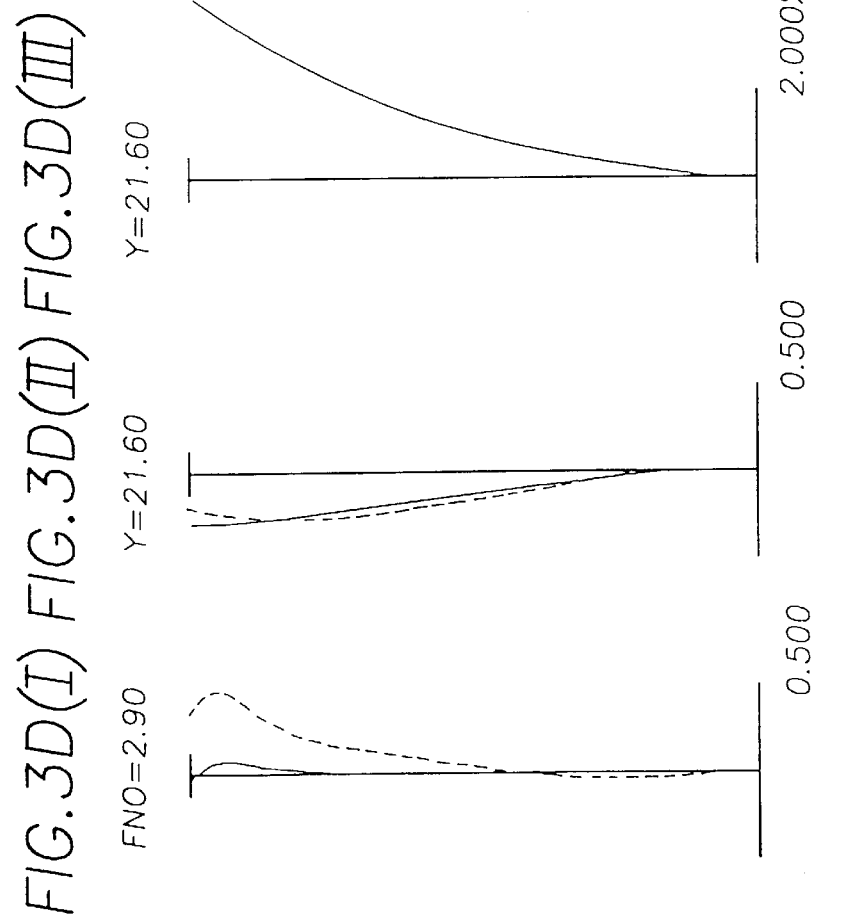

ZOOM LENS OPTICAL SYSTEM

CROSS-REFERENCE TO RELATED APPLICATIONS

This application is a division of application Ser. No. 09/506,935 filed Feb. 18, 2000 (now U.S. Pat. No. 6,166,863), which is a division of application Ser. No. 09/100,169 filed Jun. 18, 1998 (now U.S. Pat. No. 6,055,114).

FIELD OF THE INVENTION

The present invention relates to zoom lens optical systems, and more particularly, to such systems having a high zoom ratio and a large aperture ratio.

BACKGROUND OF THE INVENTION

As zoom lenses having high zoom ratios and large apertures have become more common, there has been market demand for zoom lenses having even larger apertures and higher zoom ratios. Nevertheless, it has heretofore been impossible to realize a zoom lens based on the prior art that simultaneously achieves an increased aperture size while achieving a high zoom ratio.

Generally, zoom lenses are classified either as a positive lead type, wherein the most objectwise lens group has overall positive refractive power (i.e., is "positive"), or as a negative lead type, wherein the most objectwise lens group has overall negative refractive power (i.e., is "negative"). In positive lead type zoom lenses, the overall length of the lens is easily reduced. Accordingly, these zoom lenses are widely used as telephoto zoom lenses. On the other hand, in negative lead type zoom lenses, the back focus is easily lengthened. Accordingly, these zoom lenses are widely used as wide-angle zoom lenses.

Telephoto zoom lens designs having a positive-negative-positive-positive four-group arrangement (i.e., wherein a positive master lens group is arranged after a positive-negative-positive focal variable power system) and a positive-negative-positive-negative four-group arrangement have been disclosed in, for example, U.S. Pat. No. 4,673,258.

Among photographic lenses for 135-sized film format (Leica size), zoom lenses that include a focal length state wherein the focal length is 50 mm are generally called standard zoom lenses. Standard zoom lens designs having a negative-positive-negative-positive four-group arrangement have been disclosed in, for example, U.S. Pat. Nos. 4,591,235, 4,750,617 and 4,846,562. Further, a positive-negative-positive-positive four-group arrangement of a standard zoom lens is disclosed in U.S. Pat. No. 4,439,017. Conventional positive-negative-positive-positive four-group type zoom lenses divide the third lens group of a positive-negative-positive three-group type zoom lens into two positive lens groups, and change the air space between the two positive lens groups when changing the positional state of the lens (i.e., when "zooming"). It is known that this lens configuration allows the fluctuation of off-axis aberrations generated as the positional state of the lens changes (i.e., as the power is varied) to be satisfactorily corrected. Accordingly, an increased zoom ratio can be realized.

With the progress in fabrication technology of aspherical lenses in recent years, it has been possible to introduce aspherical lenses at low cost. This has increased the number of aberration correction degrees of freedom. In addition, due to progress in fabrication technology for lens barrels, it has become possible to control with high precision the position of each lens group comprising a zoom lens. As a result, by increasing the number of moveable lens groups, it has become possible to further increase the number of aberration correction degrees of freedom. This, in turn, has made it possible to reduce the number of lenses in a zoom lens, increase zoom lens performance, and to improve their specifications.

In U.S. Pat. No. 5,189,557 and Japanese Patent Application Kokai No. Hei 6-34885, a zoom lens is disclosed wherein an increased zoom ratio was achieved using a positive-negative-positive-negative-positive-negative six-group arrangement. Also, U.S. Pat. No. 5,191,476 discloses a zoom lens wherein an increased aperture size and an approximately three-fold zoom ratio were simultaneously achieved by introducing an aspherical surface in a positive-negative-positive-positive four-group type arrangement.

In addition, Japanese Patent Application Kokai No. Hei 6-34885 discloses a zoom lens having a positive-negative-negative-positive-positive five-group arrangement. This zoom lens realizes an increased worn ratio by arranging two negative lens groups imagewise of the first lens group. Furthermore, Japanese Patent Application Kokai No. Hei 8-94933 discloses a zoom lens having a positive-negative-positive-positive four-group arrangement that realizes an increased variable power by introducing an aspherical surface in the second lens group.

Generally, negative lead type zoom lenses are used in zoom lenses that cover a field angle of 70° or greater. The zoom lens disclosed in Japanese Patent Application Kokai No. Hei 8-94933 is a positive lead type zoom lens through the introduction of an aspherical surface in the second lens group. It satisfactorily corrects fluctuation of coma due to changes in the field angle which tend to occur in the wide-angle state, and realizes high optical performance. However, since the second lens group of this zoom lens has strong negative refractive power, an attempt to increase the aperture size would greatly increase the surface area occupied when the on-axis light beam passes through the second lens group in the telephoto state (i.e., the lens positional state wherein the focal length is longest), as compared with when the worn lens is in the wide-angle state (i.e., lens positional state wherein the focal length is shortest). As a result, the off-axis aberrations in the wide-angle state and the on-axis aberrations in the telephoto state cannot be simultaneously corrected. Consequently, the coexistence of an increased aperture ratio and an increased zoom ratio is problematic.

In addition, if an attempt is made to increase the zoom ratio in a negative lead type zoom lens, the overall length of the lens in the telephoto state tend to increase, and the on-axis light beam emitted from the first lens group diverges and impinges on the positive lens group arranged imagewise of the first lens group. Consequently, the lens diameter tends to increase. In addition, in U.S. Pat. No. 5,499,141 (the "'141 patent"), by changing the air space between two adjacent negative lens groups when changing the lens positional state, the number of degrees of freedom is increased for correcting the fluctuation of off-axis aberrations generated as the lens positional state changes. Consequently, increased variable power and an increased optical performance are realized. The design in the '141 patent is such that if the air space between two lens groups having refractive powers of the same sign is changed when changing the lens positional state, the fluctuation of off-axis aberrations generated as the lens positional state changes can be satisfactorily corrected.

Zoom lenses generally focus at close range by moving one lens group, and are broadly classified by the following three systems: front focus systems, inner focus systems, and rear focus systems. In front focus systems, control is easier during manual focusing, since the amount of focusing movement of the first lens group needed to focus on a predetermined object is nearly fixed regardless of the lens positional state. Nevertheless, as autofocusing has become a common function in recent years, efforts have been made to increase its speed. To increase the speed of the autofocus function, it is vital that the amount of work required to move the focusing group (i.e., weight×amount of movement) be small. In the case of front focus systems, the lens diameter is extremely large and is thus not well-suited for autofocusing. U.S. Pat. No. 4,439,017, for example, discloses a zoom lens wherein the off-axis light beam passing through the first lens group arranged at a position removed from the aperture stop deviates greatly from the optical axis. Accordingly, the lens diameter of the first lens group, which is the focusing group in the front focus system, greatly increases.

The inner focus system and the rear focus system are suited to increasing the speed of autofocusing since a lens group having a small lens diameter can be selected as the focusing group. For example, U.S. Pat. No. 5,499,141 discloses a zoom lens having, objectwise to imagewise, a first lens group having a positive refractive power, a second lens group having a negative refractive power and a third lens group having a negative refractive power. Close-range focusing is performed by moving the third lens group. In this zoom lens, if an inner focus system or a rear focus system is used as to achieve close-range focusing, it is difficult to control the lens position of the focusing group, since the amount of focusing movement changes as the lens positional state changes from the wide-angle state to the telephoto state. In particular, if the zoom ratio of the zoom lens is increased, the change in the amount of focusing movement increases greatly as the lens positional state changes. Thus, it becomes even more difficult to control the lens position of the focusing group. In addition, in such a zoom lens having a large aperture, fluctuations of aberrations generated when focusing at close range tend to increase. Thus, it becomes difficult to reduce the fluctuation of aberrations as the lens positional state of the lens changes.

Further, the zoom lens disclosed in the abovementioned U.S. Pat. No. 5,499,141 has a zoom ratio on the order of 3× and an FNO on the order of 10 in the telephoto state, and is not suited to increasing the zoom ratio and the aperture size.

SUMMARY OF THE INVENTION

The present invention relates to zoom lens optical systems, and more particularly, to such systems having a high zoom ratio and a large aperture ratio. An objective of the present invention to provide a close-range focusable variable focal length zoom lens having a high zoom ratio, a large aperture ratio, and a small amount of fluctuation of aberrations when focusing at close range. In particular, an objective of the present invention is to provide a variable focal length zoom lens having an aperture ratio on the order of substantially 1:2.8 (brightness on the order of substantially FNO 2.8) and a zoom ratio that exceeds about 4×.

For a zoom lens having a large aperture ratio, it is preferable to increase the number of lenses comprising each lens group, since the need arises to correct the aberrations for each lens group. However, increasing the number of lenses results in an increased size and weight of the zoom lens barrel. This constrains the range of movement of the photographer and has an adverse effect particularly on portability. Accordingly, maintaining the compactness of the lens system is important.

Thus, a first aspect of the invention is a zoom lens capable of forming an image of an object and zooming between an extreme wide-angle positional state and an extreme telephoto positional state. The zoom lens comprises, objectwise to imagewise, a first lens group having overall positive refractive power, a second lens group having overall negative refractive power and separated from the first lens group by a first air space, a third lens group having overall negative refractive power and separated from the second lens group by a second air space, a fourth lens group having overall positive refractive power and separated from the third lens group by a third air space, and a fifth lens group having a positive refractive power and separated from said fourth lens group by a fourth air space. The zoom lens is designed such that when zooming from the maximum wide-angle state to the maximum telephoto state, at least the second lens group moves imagewise and at least one of the first lens group and said fourth lens group moves so as to increase the first and second air spaces and decrease the third and fourth air spaces.

In another aspect of the invention, the second lens group has one or more lens surfaces each with a paraxial curvature, and satisfied the design condition $$0.1 < (Ave.\ C) \times f_w < 0.6$$

wherein, "Ave. C" is the average value of the absolute value of the paraxial curvature of each of the one or more lens surfaces comprising the second lens group, and $f_w$ is the focal length of the entire zoom lens in the maximum wide-angle state.

Another aspect of the invention is a zoom lens capable of forming an image of an object and zooming between an extreme wide-angle positional state and an extreme telephoto positional state. The zoom lens comprises, objectwise to imagewise, a first lens group having overall a positive refractive power, a second lens group having overall negative refractive power and separated from the first lens group by a first air space, a third lens group having overall negative refractive power and separated from the second lens group by a second air space, a fourth lens group having overall positive refractive power and separated from said third lens group by a third air space, and a fifth lens group having a positive refractive power and separated from the fourth lens group by a fourth air space, and a sixth lens group having a negative refractive power and separated from the fifth lens group by a fifth air space. The zoom lens is designed such that when zooming from the maximum wide-angle state to the maximum telephoto state, at least the second lens group moves imagewise and the sixth lens group moves objectwise so as to increase the first and second air spaces, decrease the third and fourth air spaces, and change the fifth air space.

In a further aspect of the invention, the above zoom lens satisfies the design condition $$1.0 < f_1/(f_w \cdot f_t)^{1/2} < 1.6$$

wherein $f_1$ is the focal length of said first lens group, $f_w$ is the focal length of the zoom lens in the maximum wide-angle state, and $f_t$ is the focal length of the entire zoom lens in the maximum telephoto state.

In another aspect of the invention, the zoom lenses set forth above preferably satisfy a number of other design conditions, as described in detail below.

BRIEF DESCRIPTION OF DRAWINGS

FIGS. 3A(I)–3A(IV) are aberration plots for spherical aberration, astigmatism, distortion and coma in the extreme wide-angle state (infinite focus) for Working Example 1;

FIGS. 3B(I)–3B(IV) are aberration plots for spherical aberration, astigmatism, distortion and coma in a first intermediate state (infinite focus) for Working Example 1;

FIGS. 3C(I)–3C(IV) are aberration plots for spherical aberration, astigmatism, distortion and coma in a second intermediate state (infinite focus) for Working Example 1;

FIGS. 3D(I)–3D(IV) are aberration plots for spherical aberration, astigmatism, distortion and coma in the extreme telephoto state (infinite focus) for Working Example 1;

DETAILED DESCRIPTION OF THE INVENTION

The present invention relates to zoom lens optical systems and more particularly, to such systems having a high zoom ratio and a large aperture ratio. An objective of the present invention is to provide a zoom lens having a large aperture ratio on the order of substantially 1:2.8 (i.e., brightness on the order of substantially FNO 2.8) and a zoom ratio in excess of about 4×. Another objective of the present invention to provide a high-aperture-ratio, high-zoom-ratio zoom lens having the ability to focus at close range with only small aberration fluctuations.

Figure 1:
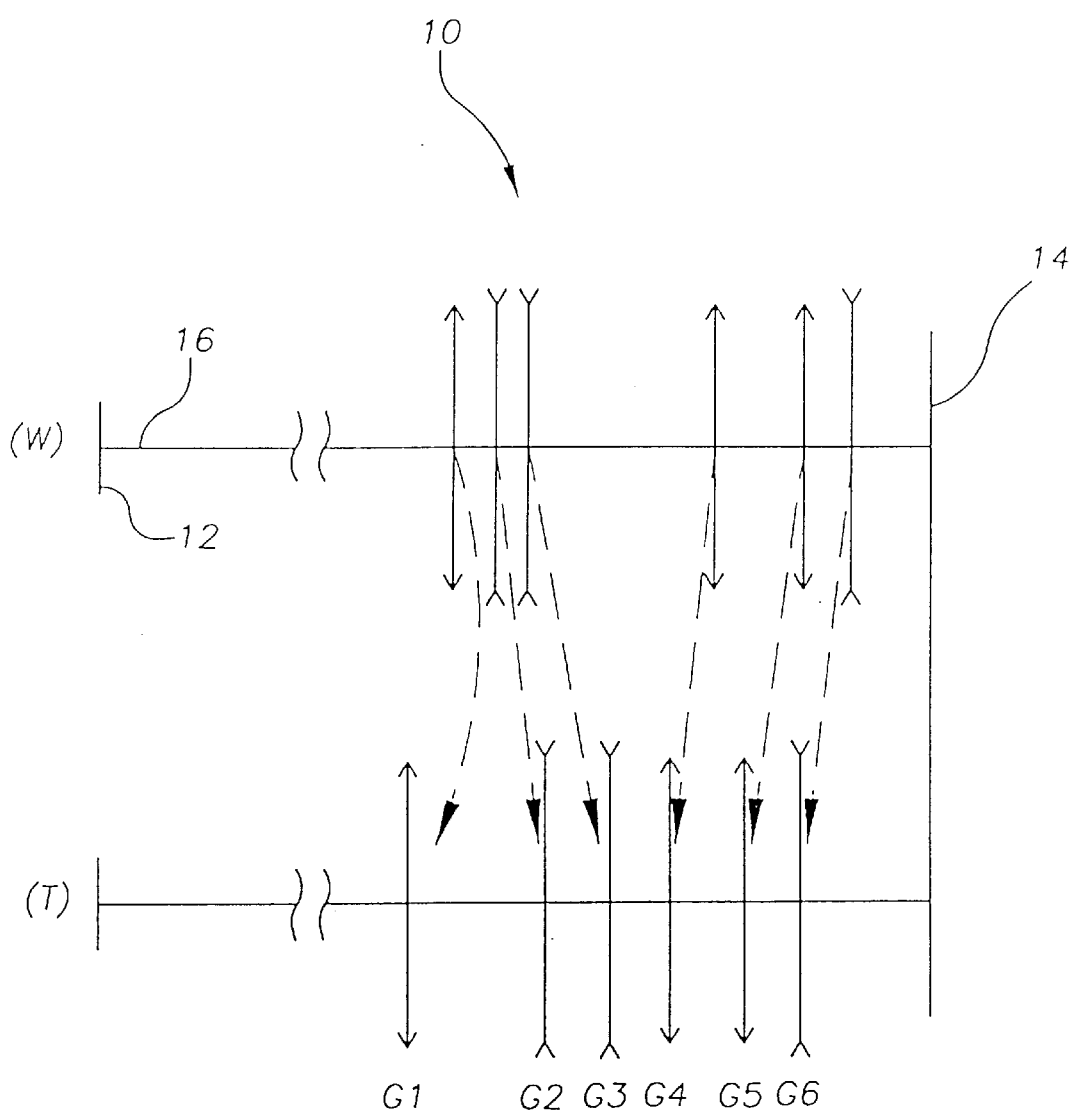
FIG. 1 is a schematic optical diagram of the lens groups comprising the zoom lens of Working Examples 1–3 of the present invention, with dashed arrows depicting the movement of each lens group when zooming from the extreme wide-angle state (W) to the extreme telephoto state (T)

With reference to FIG. 1, a zoom lens 10 according to a first preferred embodiment of the present invention comprises, from object plane 12 to image plane 14 along optical axis 16, a first lens group G1 having a positive refractive power, a second lens group G2 having negative refractive power, a third lens group G3 having negative refractive power, a fourth lens group G4 having positive refractive power, a fifth lens group G5 having positive refractive power, and a sixth lens group G6 having negative refractive power. At least second lens group G2 moves imagewise and sixth lens group G6 moves objectwise such that, when changing the lens positional state from the extreme wide-angle state (W) to the extreme telephoto state (T), the axial distance (hereinafter, "air space") between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes. Based on the above configuration, a zoom lens capable of increased variable power while having a large aperture size can be achieved.

The aberration correction function for each lens group comprising the zoom lens according to a first preferred embodiment is now described. With continuing reference to FIG. 1, the divergence action is strengthened by moving first lens group G1 and third lens group G3 closer in the wide-angle state, and the off-axis light beam passing through first lens group G1 approaches the optical axis. As a result, the lens diameter of first lens group G1 is reduced and a sufficient back focus is ensured. In addition, by moving second lens group G2 imagewise such that the air space between first lens group G1 and second lens group G2 widens (increases) when changing the lens positional state from the wide-angle state to the telephoto state, the convergence action due to first lens group G1 in the telephoto state increases, and a reduction in the overall length of the lens is realized. Also, both second lens group G2 and third lens group G3 have negative refractive power. This allows for the fluctuations in the off-axis aberrations to be satisfactorily corrected since the height of the off-axis light beam passing therethrough changes.

In addition, fourth lens group G4 and fifth lens group G5 both have a positive refractive power. The fluctuation of off-axis aberrations generated as the lens positional state changes can be satisfactorily corrected by reducing (decreasing) the air space between fourth lens group G4 and fifth lens group G5 when changing the lens positional state from the wide-angle state to the telephoto state.

In the first preferred embodiment of the present invention, the off-axis light beam passing through second lens group G2 and fifth lens group G5 is removed from the optical axis when the zoom lens is in the wide-angle state. This allows for the fluctuation of coma generated as the field angle changes to be corrected. In particular, coma generated with respect to the lower part light beam at second lens group G2 is satisfactorily corrected and coma generated with respect to the upper part light beam at fifth lens group G5 is satisfactorily corrected. Also, the difference in height between the off-axis light beam and the on-axis light beam passing through second lens group G2 and fifth lens group G5 decreases as the lens positional state changes from the wide-angle state to the telephoto state, the fluctuation of off-axis aberrations generated as the lens positional state changes can be corrected. As a result, an increased zoom ratio can be achieved.

In the first preferred embodiment of the present invention, third lens group G3 and fourth lens group G4 principally correct on-axis aberrations. In other words, by independently correcting on-axis aberrations generated by third lens group G3 and fourth lens group G4, the fluctuation of on-axis aberrations generated as the lens positional state changes is corrected. As a result, an increased aperture size can be achieved. Thus, the first preferred embodiment of the present invention is configured such that the signs of the refractive powers of lens groups G2 and G3 are the same, and the sign of the refractive powers of lens groups G4 and G5 are the same. By clarifying the aberration correction function of each lens group, the coexistence of a high zoom ratio and a large aperture ratio is realized. Also, the overall length of the zoom lens is reduced in the telephoto state by having the most imagewise sixth lens group G6 be of negative refractive power. Negative distortion, which is easily generated in the wide-angle state, is satisfactorily corrected by generating positive distortion in the wide-angle state. In addition, in the first preferred embodiment of the present invention, it is preferable to provide an aperture stop between third lens group G3 and fifth lens group G5.

In light of the above design properties, several design conditions are preferably satisfied to meet the above-identified objectives of the first preferred embodiment of the present invention. These design conditions are set forth immediately below. The first design condition pertains to an appropriate value for the focal length of first lens group G1 to achieve the coexistence of a high zoom ratio and a large aperture ratio. The first condition is expressed as $$1.0 < f_1/(f_w \cdot f_t)^{1/2} < 1.6 \quad (1)$$

wherein $f_1$ is the focal length of first lens group G1, $f_w$ is the focal length of the zoom lens in the wide-angle state, and $f_t$ is the focal length of the zoom lens in the telephoto state. If $f_1/(f_w \cdot f_t)^{1/2}$ exceeds the upper limit of condition (1), it becomes difficult to satisfactorily correct negative spherical aberration generated independently by first lens group G1. Also, since the off-axis light beam impinging on first lens group G1 in the wide-angle state deviates from the optical axis, an increase in the diameter of the lens becomes unavoidable to ensure a sufficient amount of peripheral light. Conversely, if $f_1/(f_w \cdot f_t)^{1/2}$ falls below the lower limit of condition (1), an increase in the overall lens length results, since the convergence action due to first lens group G1 weakens.

To further reduce the overall lens length in the telephoto state, it is preferable to set the upper limit of condition (1) to 1.45. In addition, to satisfactorily correct off-axis aberrations generated by first lens group G1 in the wide-angle state and to attain increased optical performance, it is preferable to set the lower limit of condition (1) to 1.2.

The second design condition relates to attaining increased optical performance without inviting an increase in the lens diameter even in the wide-angle state. In particular, condition (2) below stipulates the amount of movement of first lens group G1 as the lens positional state changes from the wide-angle state to the telephoto state. Condition (2) is expressed as $$0.8 < TL_w/TL_t < 1.2 \quad (2)$$

wherein $TL_w$ is the overall length of the lens in the wide-angle state, and $TL_t$ is the overall length of the lens in the telephoto state. If $TL_w/TL_t$ exceeds the upper limit of condition (2), the composite refractive power from first lens group G1 to third lens group G3 strengthens toward the negative, since the overall lens length in the wide-angle state is reduced. As a result, increased optical performance can no longer be attained, since the off-axis light beam passing through first lens group G1 to third lens group G3 approaches the optical axis, and fluctuations of coma with field angle increase. Conversely, if $TL_w/TL_t$ falls below the lower limit of condition (2), the overall length of the lens in the wide-angle state increases. Consequently, the off-axis light beam passing through first lens group G1 to third lens group G3 deviates excessively from the optical axis, which increases the lens diameter.

To achieve the coexistence of an increased zoom ratio and an increased optical performance in the zoom lens of the present invention, it is preferred that the height of the off-axis light beam passing through each lens group change greatly as the lens positional state changes. In particular, since the field angle is large in the wide-angle state, the correction of off-axis aberrations is vital. The off-axis aberrations in the wide-angle state can be satisfactorily corrected by locating an aperture stop near the center of the zoom lens. Accordingly, as mentioned above, it is preferable to locate an aperture stop between third lens group G3 and fourth lens group G4, or between fourth lens group G4 and fifth lens group G5. In particular, since there is a large air space between third lens group G3 and fourth lens group G4 in the wide-angle state, it is preferable to locate an aperture stop between third lens group G3 and fourth lens group G4 from the viewpoint of reducing the lens diameter. Furthermore, it is optimal to locate the aperture stop near fourth lens group G4 to reduce the lens diameter of each lens group. When changing the lens positional state, the aperture stop may be moved either together with or independently of a moveable lens group. Since the air space between third lens group G3 and fourth lens group G4 narrows in the telephoto state, the lens barrel construction can be simplified by moving the aperture stop together with fourth lens group G4.

Accordingly, in the first preferred embodiment of the present invention, it is preferable, as mentioned above, to locate the aperture stop between third lens group G3 and fifth lens group G5, and to satisfy the following design condition (3), which stipulates the on-axis space between third lens group G3 and fourth lens group G4 in the wide-angle state. Condition (3) is expressed as $$1.4 < D_{34}/f_w < 2.0 \tag{3}$$

wherein $D_{34}$ is the axial distance between third lens group G3 and fourth lens group G4 in the wide-angle state, and $f_w$ is the focal length of the zoom lens in the wide-angle state. If $D_{34}/f_w$ exceeds the upper limit of condition (3), the composite refractive power from first lens group G1 through third lens group G3 in the wide-angle state weakens toward the negative. Also, the composite refractive power from fourth lens group G4 through sixth lens group G6 weakens toward the positive. In this case, the off-axis light beam passing through first lens group G1 to third lens group G3 deviates from the optical axis. Thus, coma in the peripheral part of the field is no longer satisfactorily corrected. Conversely, if $D_{34}/f_w$ falls below the lower limit in condition (3), the composite refractive power from first lens group G1 through third lens group G3 in the wide-angle state strengthens toward the negative. Also, the composite refractive power from fourth lens group G4 through sixth lens group G6 strengthens toward the positive. In this case, the refractive power of each lens group strengthens. Thus, the fluctuation of on-axis aberrations generated as the lens positional state changes can no longer be satisfactorily corrected.

To further increase optical performance in the first preferred embodiment of the present invention, it is preferable to set the lower limit of condition (3) to 1.5, or to set the upper limit of condition (3) to 1.9.

It is also preferable for the first preferred embodiment of the present invention to satisfy a fourth design condition (4) to attain compactness of the zoom lens and to increase optical performance and balance in the telephoto state. Condition (4) stipulates the on-axis space between first lens group G1 and second lens group G2 in the telephoto state and is expressed as $$0.15 < D_{12}/f_t < 0.40 \tag{4}$$

wherein $D_{12}$ is the axial distance between first lens group G1 and second lens group G2 in the telephoto state, and ft is the focal length of the zoom lens in the telephoto state. If $D_{12}/f_t$ exceeds the upper limit of condition (4), the off-axis light beam passing through first lens group G1 in the telephoto state deviates excessively from the optical axis. Consequently, coma in the peripheral part of the field can no longer be satisfactorily corrected. Conversely, if $D_{12}/f_t$ falls below the lower limit in condition (4), the overall length of the lens in the telephoto state increases.

Further, in the first preferred embodiment of the present invention, it is also preferable to satisfy a fifth design condition to increase optical performance in the wide-angle state. Condition (5) stipulates the on-axis space between fourth lens group G4 and fifth lens group G5 in the wide-angle state, and is expressed as $$0.4 < D_{45}/f_5 < 0.7 \tag{5}$$

wherein $D_{45}$ is the on-axis space between fourth lens group G4 and fifth lens group G5 in the wide-angle state, and $f_5$ is the focal length of fifth lens group G5. If $D_{45}/f_5$ exceeds the upper limit of condition (5), the off-axis light beam passing through fifth lens group G5 in the wide-angle state deviates excessively from the optical axis. Consequently, coma generated in the peripheral part of the field can no longer be satisfactorily corrected. Conversely, if $D_{45}/f_5$ falls below the lower limit in condition (5), the off-axis light beam passing through fifth lens group G5 in the wide-angle state excessively approaches the optical axis. Consequently, the fluctuation of coma with field angle can no longer be satisfactorily corrected.

It is also preferable in the first preferred embodiment of the present invention to introduce at least one aspherical surface in second lens group G2 to satisfactorily correct the fluctuation of coma due with field angle in the wide-angle state, and to attain an even greater degree of optical performance. Generally, the aberration correction function of an aspherical surface is broadly classified into two cases: the case wherein it is arranged near the aperture stop, it and the case wherein it is arranged at a position removed from the aperture stop. In other words, if the aspherical surface is arranged near the aperture stop, it principally corrects on-axis aberrations. On the other hand, if the aspherical surface is arranged at a position removed from the aperture stop, it principally corrects off-axis aberrations.

If an aspherical surface is arranged in second lens group G2 through which the off-axis light beam passing therethrough deviates from the optical axis in the wide-angle state, it would result in the aspherical surface being arranged near the aperture stop. Accordingly, in this case, the fluctuation of coma with field angle produced in the wide-angle state can be satisfactorily corrected. As a result, increased optical performance becomes possible.

In this case, it is preferable to satisfy a sixth design condition, expressed as $$1.5 < f_3/f_2 < 2.5 \tag{6}$$

wherein $f_2$ is the focal length of second lens group G2, and $f_3$ is the focal length of third lens group G3. If $f_3/f_2$ exceeds the upper limit of condition (6), the spherical aberration generated independently by second lens group G2 can no longer be satisfactorily corrected. Conversely, if $f_3/f_2$ falls below the lower limit of condition (6), the off-axis light beam passing through first lens group G1 deviates from the optical axis, since the composite principle point position of second lens group G2 and third lens group G3 in the wide-angle state moves imagewise. As a result, the lens diameter increases.

To attain the coexistence of an increased aperture size and an increased optical performance in the telephoto state, it is vital to more satisfactorily correct spherical aberration. Further, if the off-axis light beam in the wide-angle state passes through the zoom lens groups far removed from the optical axis, and the aperture ratio is made fixed without depending on a change in the lens positional state, then an increased aperture size and an increased optical performance can be more effectively achieved. This is accomplished by introducing an aspherical surface is introduced in lens group G5 through which the off-axis light beam passing therethrough widens in the telephoto state compared with the wide-angle state.

Accordingly, it is preferable in the first preferred embodiment of the present invention to introduce at least one aspherical surface in fifth lens group G5. In this case, it is further preferable to satisfy a seventh design condition expressed as $$1.2 < f_4/f_5 < 1.8 \tag{7}$$

wherein $f_4$ is the focal length of fourth lens group G4, and $f_5$ is the focal length of fifth lens group G5. If $f_4/f_5$ exceeds the upper limit of condition (7), the overall length of the lens in the telephoto state increases. Conversely, if $f_4/f_5$ falls below the lower limit of condition (7), the off-axis light beam passing through fifth lens group G5 in the wide-angle state approaches the optical axis. Consequently, on-axis aberrations and off-axis aberrations can no longer be corrected independently, and the predetermined optical performance can no longer be achieved.

Furthermore, as discussed below, an aperture ratio on the order of FNO 2.8 is realized in each Working Example of the present invention. Nevertheless, in the present invention, it is relatively easy, for example, to reduce the zoom ratio and further increase the aperture size, or to increase the FNO and further increase the zoom ratio. In addition, by axially moving at least one lens group when focusing, high optical performance can be realized in each phototaking distance ranging from infinite focus to close-range focus.

A second preferred embodiment of the zoom lens of the present invention, comprises, objectwise to imagewise, a first lens group G1 having positive refractive power and arranged most objectwise, a second lens group G2 having negative refractive power and arranged imagewise of and adjacent first lens group G1, an intermediate lens group GM (corresponding to the six-group type fourth lens group G4) having positive refractive power and arranged imagewise of second lens group G2, and a lens group GE (corresponding to the six-group type sixth lens group G6). In this case, when changing the lens positional state from the wide-angle state to the telephoto state, second lens group G2 moves imagewise and last lens group GE moves objectwise such that the air space between first lens group G1 and second lens group G2 increases, and the air space between second lens group G2 and intermediate lens group GM decreases. Then, the abovementioned design conditions (1) and (2) are satisfied.

Figure 6:
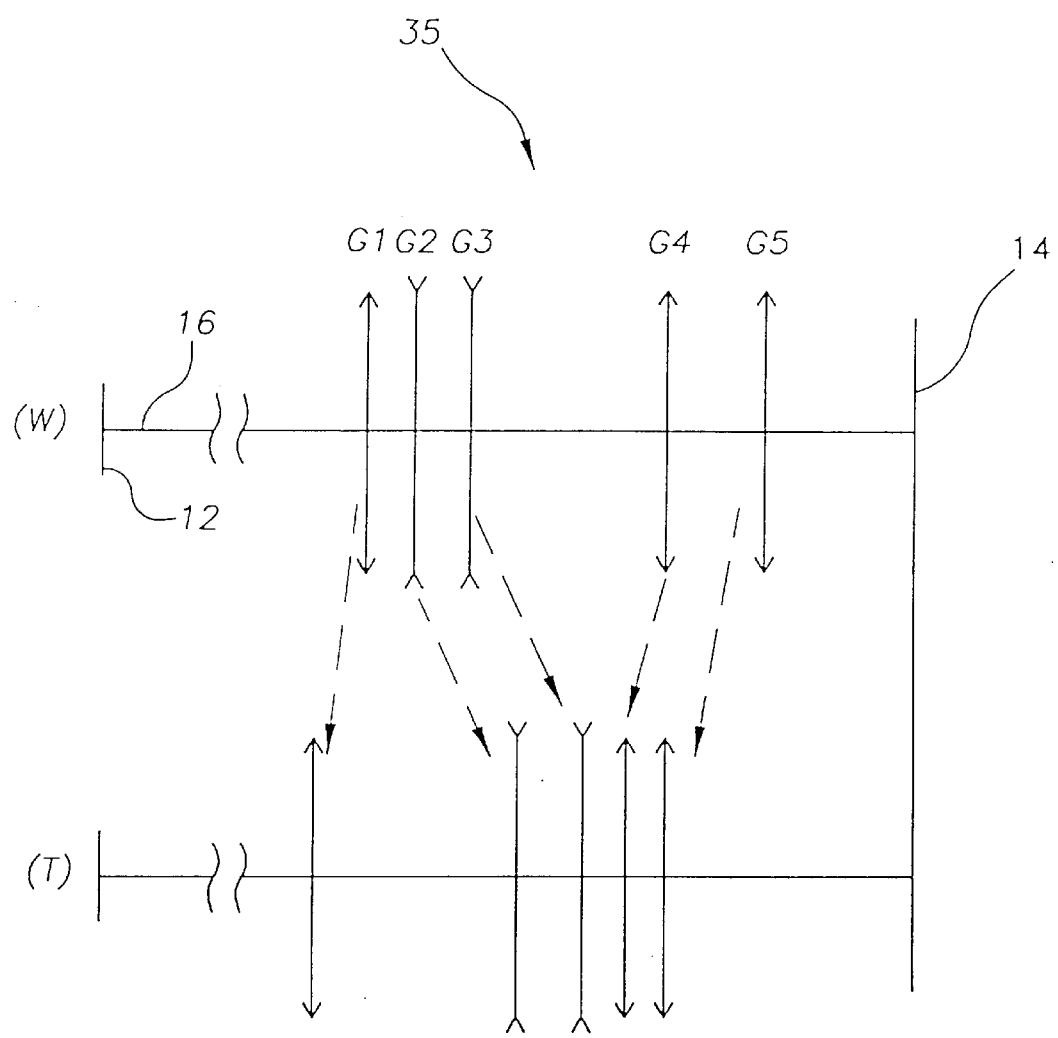
FIG. 6 is a schematic optical diagram of the lens groups comprising the zoom lens of Working Examples 4–6 of the present invention, with dashed arrows depicting the movement of each lens group when zooming from the extreme wide-angle state (W) to the extreme telephoto state (T)

With reference now to FIG. 6, a third preferred embodiment of a zoom lens 35 of the present invention is described. Zoom lens 35 comprises, from object plane 12 to image plane 14 along optical axis 16, a first lens group G1 having positive refractive power, a second lens group G2 having negative refractive power, a third lens group G3 having negative refractive power, a fourth lens group G4 having positive refractive power and fifth lens group G5 having a positive refractive power. When changing the lens positional state from the wide-angle state to the telephoto state, at least second lens group G2 moves imagewise, and at least one of first lens group G1 or fourth lens group G4 moves such that the air space between first lens group G1 and second lens group G2 increases, the air space between second lens group G2 and third lens group G3 increases, the air space between third lens group G3 and fourth lens group G4 decreases, and the air space between fourth lens group G4 and fifth lens group G5 decreases.

The aberration correction function of each lens group comprising zoom lens 35 according to the third preferred embodiment of the present invention is now described. With continued reference to FIG. 6, in the wide-angle state (W), first lens group G1 through third lens group G3 are arranged close together. First lens group G1 through third lens group G3 have a strong negative composite refractive power, and fourth lens group G4 and fifth lens group G5 have a strong positive composite refractive power. A sufficient back focus is obtained for the distribution of refractive powers of zoom lens 35 as a reverse telephoto system.

In the third preferred embodiment of the present invention, it is particularly important to satisfactorily correct the fluctuation of coma due with field angle if covering a field angle that exceeds 70°. By appropriately setting the lens group spacing such that the off-axis light beam passing through second lens group G2 to third lens group G3, and fifth lens group G5 in the wide-angle state deviates from the optical axis, coma of the lower part light beam of second lens group G2 to third lens group G3 is satisfactorily corrected. Also, coma of the upper part light beam of fifth lens group G5 is satisfactorily corrected. In particular, it is preferable to appropriately set the focal length of second lens group G2 and third lens group G3, as described below. It is also preferable to arrange first lens group G1 and second lens group G2 such that they are close together, and to ensure that the off-axis light beam passing through first lens group G1 does not excessively deviate from the optical axis.

By moving at least second lens group G2 imagewise such that the air space between first lens group G1 and second lens group G2 widens (increases) when changing the lens positional state from the wide-angle state to telephoto state, the convergence action due to first lens group G1 in the telephoto state strengthens and the overall length of the lens decreases. In addition, by moving second lens group G2 and third lens group G3 imagewise and narrowing the air space between third lens group G3 and the aperture stop (discussed below) such that the air space between second lens group G2 and third lens group G3 widens (increases) when changing the lens positional state from the wide-angle state to the telephoto state, the lateral magnification of second lens group G2 and third lens group G3 increases, and an increased zoom ratio is achieved. In addition, the off-axis light beam passing through second lens group G2 and third lens group G3 approaches the optical axis. Thus, the fluctuation of off-axis aberrations as the lens positional state changes can be satisfactorily corrected. By narrowing (decreasing) the air space between fourth lens group G4 and fifth lens group G5 when changing the lens positional state from the wide-angle state to the telephoto state, the off-axis light beam passing through fifth lens group G5 and removed from the optical axis in the wide-angle state approaches the optical axis as the telephoto state is approached. Thus, the fluctuation of off-axis aberrations generated when the lens positional state changes can be satisfactorily corrected.

To realize an increased aperture size, it is important to satisfactorily correct on-axis aberrations generated by each lens group. In the zoom lens of the third preferred embodiment of the present invention, third lens group G3 and fourth lens group G4 contribute principally to on-axis aberrations. Since third lens group G3 and fourth lens group G4 are positioned near the center of the zoom lens (see FIG. 6), and are arranged relatively near to the aperture stop (discussed below), the off-axis light beam tends to pass through these lens groups near the optical axis. This reduces off-axis aberrations. By satisfactorily correcting the on-axis aberrations generated by third lens group G3 and fourth lens group G4, the fluctuation of on-axis aberrations generated as the lens positional state changes can be satisfactorily corrected. This allows for an increased aperture size to be achieved. Also, by clarifying the aberration correction function of each lens group and satisfactorily correcting the aberrations generated by each lens group in the third preferred embodiment of the present invention as described above, the coexistence of an increased zoom ratio and an increased aperture size (i.e., aperture ratio) is realized.

In the third preferred embodiment of the present invention, it is preferable to satisfy design condition (8), which stipulates the appropriate range for the radius of curvature of the lens surfaces comprising second lens group G2. Condition (8) is expressed as $$0.1 < (\text{Ave. } C) \cdot f_w < 0.6 \tag{8}$$

wherein "Ave. C" is the average value of the absolute value of the paraxial curvature of each lens surface comprising second lens group G2, and $f_w$ is the focal length of the zoom lens in the wide-angle state.

If (Ave. C)·$f_w$ exceeds the upper limit of condition (8), it is difficult to correct the off-axis aberrations in the wide-angle state, since the absolute value of the radius of curvature increases. Conversely, if (Ave. C)·$f_w$ falls below the lower limit of condition (8), a sufficient back focus in the wide-angle state cannot be obtained. In addition, it is further preferable in the present invention to set the upper limit of condition (8) to 0.5 to obtain higher optical performance.

It is also preferable that the zoom lens of the third preferred embodiment of the present invention satisfy design condition (9) relating to maintaining lens compactness. Condition (9) is expressed as $$0.45 < D_2/f_1 < 0.55 \tag{9}$$

wherein $D_2$ is the axial distance between first lens group G1 and second lens group G2 in the wide-angle state, and $f_1$ is the focal length of first lens group G1.

If $D_2/f_1$ exceeds the upper limit of condition (9), the lens diameter of first lens group G1 increases, since the off-axis light beam passing through first lens group G1 in the telephoto state deviates excessively from the optical axis. Conversely, if $D_2/f_1$ falls below the lower limit in condition (9), the overall length of the lens in the telephoto state increases.

Figure 7:
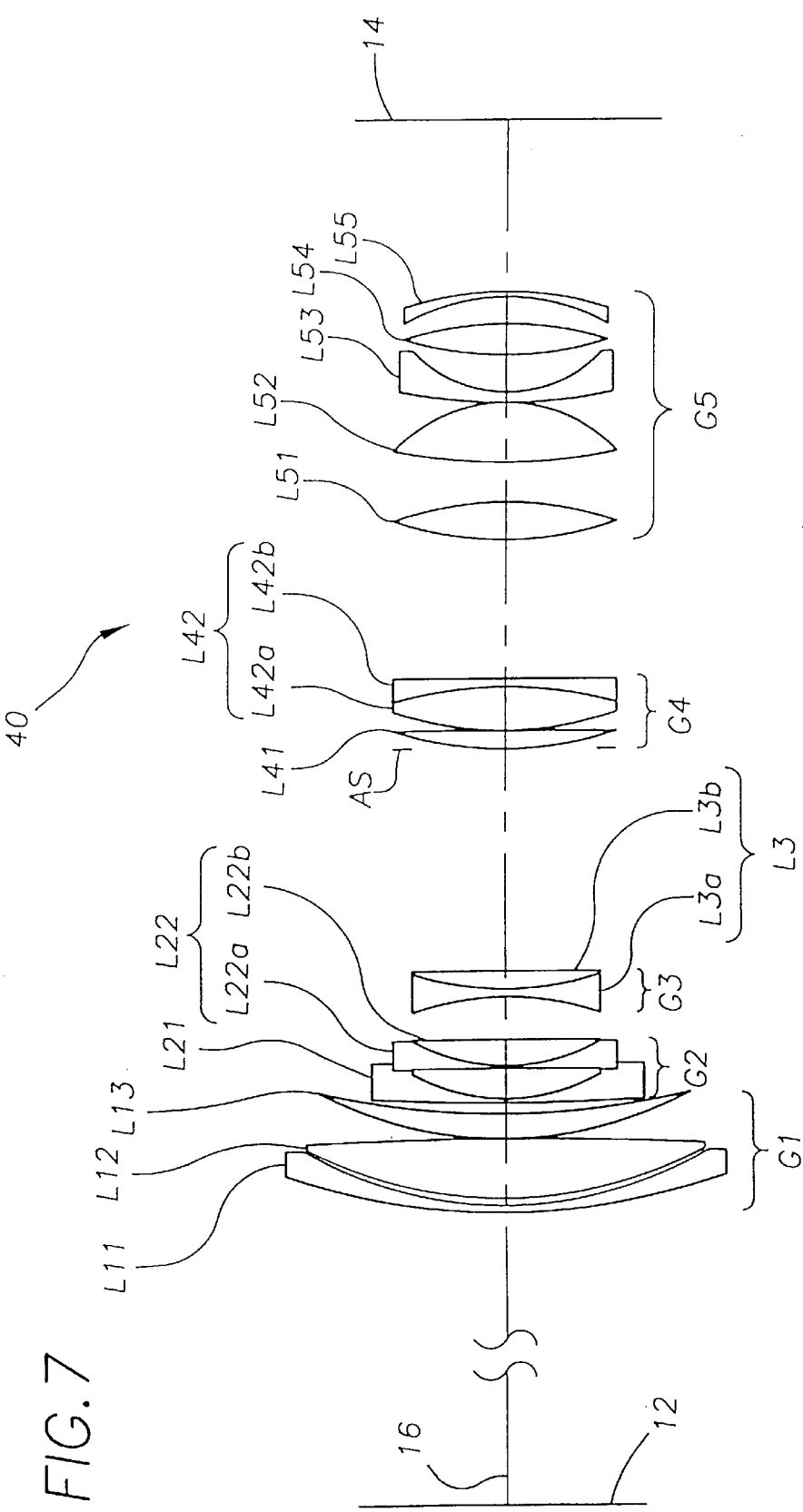
FIG. 7 is an optical diagram of the configuration of the zoom lens according to Working Example 4 of the present invention.

In addition, for satisfactorily correcting coma generated in the wide-angle state, it is preferable that lens group G2 of the zoom lens comprise, objectwise to imagewise, a negative lens L21 having an imagewise concave surface, and a cemented lens L22 comprising a biconcave lens L22a and a positive lens L22b (see e.g., zoom lens 40 of FIG. 7). It is further preferable that negative lens L21 have a meniscus shape to attain higher performance. Also, it is preferable that an aperture stop AS be arranged adjacent fourth lens group G4 (see, e.g., zoom lens 40 of FIG. 7).

The location of the aperture stop necessary to attain increased variable magnification and an increased optical performance is now described. Generally, the off-axis light beam passing through the lens groups removed from the aperture stop tends to be removed from the optical axis. Since it is easy to independently correct on-axis aberrations and off-axis aberrations in lens groups through which the off-axis light beam passing therethrough deviates from the on-axis light beam, lens groups removed from the aperture stop are suited to the correction of off-axis aberrations. To satisfactorily correct off-axis aberrations generated as the lens positional state changes, it is preferred that there be many lens groups wherein the height of the off-axis light beam passing therethrough changes greatly as the lens positional state changes.

Accordingly, in the zoom lens of the third preferred embodiment of the present invention, the aperture stop is located near the center of the zoom lens. Each lens group in the zoom lens is moved as the lens positional state changes such that the air space adjacent to the aperture stop changes greatly. Consequently, the off-axis aberrations generated as the lens positional state changes are satisfactorily corrected, and an increased zoom ratio and an increased optical performance is achieved. To attain increased optical performance in particular, it is preferable to arrange the aperture stop adjacent fourth lens group G4.

More particularly, it is preferable to locate the aperture stop between third lens group G3 and fourth lens group G4 to attain a reduction in the lens diameter simultaneous with attaining increased optical performance. If the aperture stop is arranged between third lens group G3 and fourth lens group G4, it is preferable that third lens group G3 include a negative lens having an objectwise concave surface, and that the zoom lens satisfy the design condition $$0.7 < |r_a|/D_a < 1.3 \tag{10}$$

wherein $r_a$ is the radius of curvature of the objectwise lens surface of the negative lens (e.g., lens L3a in FIG. 9), and $D_a$ is the axial separation between the aperture stop and the objectwise lens surface of the negative lens in the wide-angle state. Condition (10) is necessary for more satisfactorily correction on-axis aberrations in the telephoto state.

If $|r_a|/D_a$ exceeds the upper limit of condition (10), sufficient back focus cannot be ensured in the wide-angle state. Conversely, if $|r_a|/D_a$ falls below the lower limit of condition (10), spherical aberration generated in the telephoto state cannot be satisfactorily corrected, and an increased optical performance cannot be attained. Off-axis aberrations in the wide-angle state can be more satisfactorily corrected by setting the lower limit to 0.85. Also, even higher optical performance in the telephoto state can be obtained by setting the upper limit to 1.2.

In addition, in the zoom lens of the third preferred embodiment of the present invention, it is preferable that fifth lens group G5 include first and second subgroups, and that the zoom lens satisfy the design condition $$0.15 < D_5/f_w < 0.45 \tag{11}$$

wherein $f_w$ is the focal length of the zoom lens in the wide-angle state, and $D_5$ is the air space between the first and second subgroups of the lens group G5. Condition (11) is necessary for satisfactorily correcting coma generated with respect to the upper part light beam in the wide-angle state. In the present invention, it is important to satisfactorily correct off-axis aberrations generated by each lens group to attain an increased aperture size. In particular, the off-axis light beam in the wide-angle state deviates from the optical axis and the on-axis light beam in the telephoto state widens and passes through fifth lens group G5. Thus, it is preferable to divide fifth lens group G5 into first and second positive subgroups, where the first subgroup principally corrects on-axis aberrations, while the second subgroup principally corrects off-axis aberrations.

If $D_5/f_w$ exceeds the upper limit of condition (11), the lens diameter increases, since the off-axis light beam passing through the second subgroup in the wide-angle state deviates excessively from the optical axis. In zoom lenses of SLR cameras in particular, since the diameter of the mount (i.e., flange) that attaches the lens barrel to the camera body is of a predetermined size, increasing the lens diameter of the second subgroup presents a serious problem. Conversely, if $D_5/f_w$ falls below the lower limit of condition (11), coma generated with respect to the upper part light beam in the wide-angle state can no longer be satisfactorily corrected.

In addition, in the zoom lens of the third preferred embodiment of the present invention, it is preferable to use one or more aspherical surfaces in fifth lens group G5 to attain higher performance. Further, it is preferable to use an aspherical surface in the first subgroup of lens group G5, which principally corrects on-axis aberrations.

A fourth preferred embodiment of the zoom lens of the present invention is now described. This fourth preferred embodiment has the same lens group configuration of the third preferred embodiment (see FIG. 6), and preferably satisfies the design conditions set forth below. First, it is preferable that the zoom lens of the fourth preferred embodiment of the present invention satisfy the design condition $$0.4 < f_1/f_t < 0.7 \tag{12}$$

wherein $f_t$ is the focal length of the zoom lens in the telephoto state, and $f_1$ is the focal length of first lens group G1 in the telephoto state. Design condition (12) stipulates an appropriate range for the focal length of first lens group G1, and is a necessary condition for reducing the overall length of the lens in the telephoto state. If $f_1/f_t$ exceeds the upper limit of condition (12), the overall length of the lens in the telephoto state increases. Conversely, if $f_1/f_t$ falls below the lower limit of condition (12), the off-axis light beam passing through first lens group G1 in the wide-angle state deviates from the optical axis, generating excessive coma. Thus, the predetermined optical performance cannot be obtained.

It is also preferable that in the zoom lens of the third and fourth preferred embodiments of the present invention satisfy at least one of the design conditions $$1.2 < f_3/f_2 < 2.2 \tag{13}$$

$$0.7 < f_4/f_5 < 1.5 \tag{14}$$

wherein $f_2$ is the focal length of second lens group G2, $f_3$ is the focal length of third lens group G3, $f_4$ is the focal length of fourth lens group G4, and $f_5$ is the focal length of fifth lens group G5, respectively. Design conditions (13) and (14) are necessary for further increasing optical performance while maintaining the predetermined zoom ratio. If $f_3/f_2$ exceeds the upper limit of condition (13), the off-axis aberrations generated by second lens group G2 in the wide-angle state can no longer be satisfactorily corrected. Conversely, if $f_3/f_2$ falls below the lower limit of condition (13), spherical aberration generated by third lens group G3 in the telephoto state can no longer be satisfactorily corrected. If $f_4/f_5$ exceeds the upper limit in condition (14), the off-axis aberrations cannot be. satisfactorily corrected, since the off-axis light beam passing through fifth lens group G5 in the wide-angle state approaches the optical axis. Conversely, if $f_4/f_5$ falls below the lower limit, the negative spherical aberration generated by fourth lens group G4 in the telephoto state can no longer be satisfactorily corrected.

Figure 10:
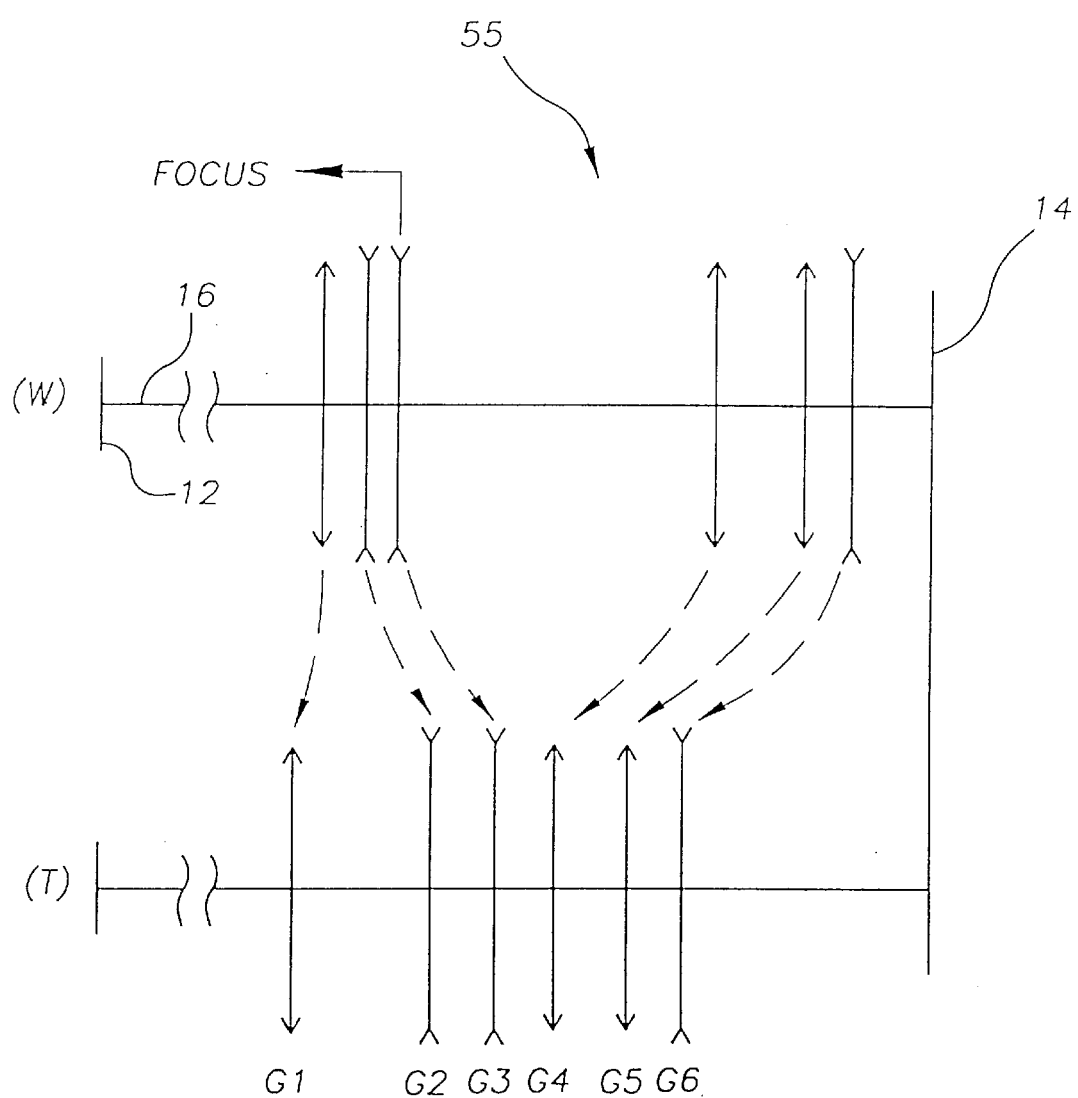
FIG. 10 is a schematic optical diagram of the lens groups comprising the zoom lens of Working Examples 7–10 of the present invention, with dashed arrows depicting the movement of each lens group when zooming from the extreme wide-angle state (W) to the extreme telephoto state (T), and showing the conditions for reducing the amount of focusing movement of the focusing lens group.

A fifth preferred embodiment of the zoom lens of the present invention capable of close-range focus is now described. With reference to FIG. 10, zoom lens 55 comprises from object plane 12 to image plane 14 along optical axis 16, at least a first lens group G1 having a positive refractive power, a second lens group 62 having a negative refractive power, a third lens group G3 having a negative refractive power, and a fourth lens group G4 having a positive refractive power. Accordingly, second lens group G2 is moved imagewise and at least one lens group of first lens group G1 and fourth lens group G4 moves such that, when changing the lens positional state from the wide-angle state to the telephoto state, the air space between first lens group G1 and second lens group G2 increases, the air space between second lens group G2 and third lens group G3 increases, and the air space between third lens group G3 and fourth lens group G4 decreases. The close-range focus (i.e., focus from an infinite object to a close-range object) is achieved by moving third lens group G3 axially objectwise along optical axis 16, as shown in FIG. 10. In this manner, a zoom lens is achieved that can easily control the lens position of the focusing group while ensuring a high variable power ratio and a large aperture ratio by the following steps: (i) appropriately setting the composite focal length of first lens group G1 and second lens group G2, and (ii) appropriately setting the focal length of third lens group G3.

The design conditions for reducing the amount of focusing movement of third lens group G3 are now discussed. With continuing reference to FIG. 10, when the position of object plane 12 with respect to third lens group G3 moves axially a small amount δ, it is necessary to move axially third lens group G3 by a corresponding amount Δ to make the position of object plane 12 fixed with respect to fourth lens group G4. In this case, the amount of focusing movement Δ of third lens group G3 is given by the mathematical expression $$\Delta = \{\beta_3^2/(\beta_3^2 - 1)\} \cdot \delta \tag{a}$$

wherein $\beta_3$ is the lateral magnification of third lens group G3.

If $\beta_3^2/(\beta_3^2 - 1)$ in expression (a) is defined as "k", then k depends on the value of $\beta_3^2$, and the conditions set forth in expressions (b) and (c):

$$1 \leq k(\beta_3^2 > 1) \tag{b}$$

$$0 > k(\beta_3^2 > 1) \tag{c}$$

Accordingly, if $\beta_3^2 > 1$, it is necessary that k approach 1 as much as possible, i.e., that $1/\beta_3$ approaches 0, to reduce the size of focusing movement amount Δ. In addition, if $\beta_3^2 < 1$, it is necessary that k approach 0 as much as possible, i.e., that $\beta_3$ approaches 0.

Thus, the focusing movement of third lens group G3 is reduced by making the lateral magnification $\beta_3$ of third lens group G3 approach 0. Making $\beta_3$ approach 0 means that the composite refractive power of first lens group G1 and second lens group G2 weakens in the extreme. Accordingly, it is preferable to appropriately set the composite focal length of first lens group G1 and second lens group G2, and it is vital to satisfy step (i), above.

In addition, if the refractive power of third lens group G3 is strongly negative, the focusing movement amount becomes small since the lateral magnification $\beta_3$ of third lens group G3 approaches 0. Nevertheless, if the negative refractive power of third lens group G3 strengthens, the refractive power of each lens comprising third lens group G3 strengthens. Consequently, aberrations arise. Accordingly, it is preferable to appropriately set the refractive power of third lens group G3, and it is vital to satisfy step (ii), above.

Generally, in the optimal solution of a zoom lens, it is necessary not only to simply satisfy a predetermined optical performance, but also to simultaneously achieve a reduction in the size and weight of the zoom lens. To this end, it is preferred that the fifth preferred embodiment of the zoom lens of the present invention satisfy design conditions (15) and (16), expressed as $$-0.5 < \phi 12_t \cdot f_t < 0.3 \tag{15}$$

$$0.8 < |f_3|/(f_w \cdot f_t)^{1/2} < 1.2 \tag{16}$$

wherein $\phi 12_t$ is the composite refractive power of first lens group G1 and second lens group G2 in the telephoto state.

Design condition (15) stipulates the composite refractive power of first lens group G1 and second lens group G2 in the telephoto state, and design condition (16) stipulates the focal length of third lens group G3. As discussed above, it is preferable to appropriately set the composite focal length of first lens group G1 and second lens group G2 to reduce the focusing movement amount of third lens group G3.

If $\phi 12_t \cdot f_t$ exceeds the upper limit of condition (15), the off-axis light beam passing through first lens group G1 in the telephoto state deviates excessively from the optical axis. This makes it necessary to increase the size of the lens diameter to ensure a sufficient quantity of light in the peripheral part of the field. If $(\phi 12_t \cdot f_t$ falls below the lower limit, the overall lens length in the telephoto state increases. To further reduce the focusing movement of third lens group G3 in the telephoto state, and to further increase the speed of the autofocus operation, it is preferable to either set the lower limit of condition (15) to −0.4 or to set the upper limit to 0.15. If $|f_3|/(f_w \cdot f_t)^{1/2}$ exceeds the upper limit of condition (16), the focusing movement amount increases when focusing at close range, since the focal length of third lens group G3 increases. As a result, the speed of the focusing operation cannot be increased and the compactness of the lens system can not be attained. To do so, it would be necessary to unacceptably widen the air space between third lens group G3 and the lens group arranged adjacent and objectwise or imagewise thereof. Conversely, if $|f_3|/(f_w \cdot f_t)^{1/2}$ falls below the lower limit of condition (16), the fluctuation of various aberrations generated when focusing at close range increases, since the focal length of third lens group G3 decreases. As a result, the predetermined optical performance can no longer be maintained in each phototaking distance state from the infinite-focus state to the close-range focus state. Accordingly, in the fifth preferred embodiment of the present invention, a fifth lens group G5 having a positive refractive power is provided imagewise of fourth lens group G4. Also, it is preferable, when changing the lens positional state from the wide-angle state to the telephoto state, that fifth lens group G5 move objectwise such that the air space between fourth lens group G4 and fifth lens group G5 decreases.

In a sixth preferred embodiment of the present invention, a sixth lens group G6 having a negative refractive power is provided imagewise of fifth lens group G5 in the above-described fifth embodiment. Further, it is preferable, when changing the lens positional state from the wide-angle state to the telephoto state, that sixth lens group G6 move objectwise such that the air space between fourth lens group G4 and sixth lens group G6 changes.

The sixth preferred embodiment of the zoom lens of the present invention allows for the realization of a zoom lens having an aperture ratio on the order of FNO 2.8 and a zoom ratio exceeding 5×. With reference to FIG. 10, zoom lens 55 according to the sixth preferred embodiment of the present invention comprises, from object plane 12 to image plane 14 along optical axis 16, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a negative refractive power. It is preferable to move second lens group G2 imagewise and to move sixth lens group G6 objectwise such that, when changing the lens positional state from the wide-angle state to the telephoto state, the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes.

The function of each lens group in the abovementioned six-group type zoom lens according to this sixth preferred embodiment is now described. In the fifth and sixth preferred embodiments of the present invention, the divergence action is strengthened by moving first lens group G1 and third lens group G3 closer to one another in the wide-angle state. As a result, the off-axis light beam passing through first lens group G1 approaches the optical axis. Thus, the lens diameter of first lens group G1 is reduced and a sufficient back focus is ensured. In addition, by moving second lens group G2 imagewise such that the air space between first lens group G1 and second lens group G2 widens when changing the lens positional state from the wide-angle state to the telephoto state, the convergence action due to first lens group G1 in the telephoto state increases, and a reduction in the overall length of the lens is realized. Furthermore, both second lens group G2 and third lens group G3 have negative refractive power, and the fluctuation of off-axis aberrations can be satisfactorily corrected. This is due to the widening of the air space between second lens group G2 and third lens group G3 when changing the lens positional state from the wide-angle state to the telephoto state, which causes the height of the off-axis light beam passing therethrough to change. Fourth lens group G4 and fifth lens group G5 also both have positive refractive power. Thus, the fluctuation of off-axis aberrations generated as the lens positional state changes can be satisfactorily corrected by reducing the air space between fourth lens group G4 and fifth lens group G5 when changing the lens positional state from the wide-angle state to the telephoto state.

Also, in the fifth and sixth preferred embodiments of the zoom lens of the present invention, the fluctuation of coma with field angle can be satisfactorily corrected, since the off-axis light beam passing through second lens group G2 and fifth lens group G5 removed from the optical axis when the lens is in the wide-angle state. In particular, coma generated with respect to the lower part light beam at second lens group G2 is satisfactorily corrected and coma generated with respect to the upper part light beam at fifth lens group G5 is satisfactorily corrected.

Also, the difference in the height between the off-axis light beam and the on-axis light beam passing through second lens group G2 and fifth lens group G5 decreases as the lens positional state changes from the wide-angle state to the telephoto state. Thus, the fluctuation of off-axis aberrations generated as the lens positional state changes can be satisfactorily corrected. As a result, an increased zoom ratio can be achieved. Furthermore, third lens group G3 and fourth lens group G4 principally correct on-axis aberrations. In other words, by the satisfactory correcting on-axis aberrations generated by third lens group G3 and fourth lens group G4, the fluctuation of on-axis aberrations generated as the lens positional state changes is corrected. As a result, an increased aperture size can be achieved.

The fifth and sixth preferred embodiments of the present invention are constituted such that the signs of the refractive powers of second lens group G2 and third lens group G3 are the same, and the sign of the refractive powers of fourth lens group G4 and fifth lens group G5 are the same. Thus, by clarifying the aberration correction function of each lens group, the coexistence of an increased zoom ratio and an increased aperture size is realized.

In the sixth preferred embodiment of the present invention, the overall length of the zoom lens is reduced in the telephoto state by making sixth lens group G6 having a negative refractive power the most imagewise lens group of the zoom lens. In addition, negative distortion, which is easily generated in the wide-angle state, is satisfactorily corrected by generating positive distortion in the wide-angle state. Also, in the fifth and sixth preferred embodiments of the present invention, it is preferred that the zoom lens satisfy the design condition $$2<|\phi MAX|\cdot f_t<8 \quad (17)$$

wherein φMAX is the refractive power of the lens group having the strongest refractive power among the plurality of lens groups. Condition (17) stipulates the refractive power of the lens group having the strongest refractive power among the plurality of lens groups. To achieve increased optical performance while ensuring a large aperture ratio, it is vital to satisfactorily correct on-axis aberrations generated by each lens group. Also, it is important to appropriately weaken the refractive power of each lens group.

If $|\phi MAX|\cdot f_t$ exceeds the upper limit of condition (17), on-axis aberrations generated by each lens group cannot be satisfactorily corrected. Also, the fluctuation of various aberrations generated as the lens positional state changes can no longer be satisfactorily corrected. Conversely, if $|\phi MAX|\cdot f_t$ falls below the lower limit of condition (17), it is necessary to greatly change the air spaces between lens groups to obtain the predetermined zoom ratio. As a result, the off-axis light beam passing through the lens groups removed from the aperture stop deviates from the optical axis, thereby increasing the lens diameter.

Also, in the fifth and sixth preferred embodiments of the present invention, it is preferable to satisfy the design condition $$0.9<|\phi 2+\phi 3|\cdot f_w<1.3 \quad (18)$$

wherein φ2 is the refractive power of second lens group G2 and φ3 is refractive power of third lens group G3. Condition (18) stipulates the composite refractive power of second lens group G2 and third lens group G3 in the wide-angle state. If the axial separation between the principle points between the second lens group G2 and third lens group G3 is given as d, then the composite refractive power of second lens group G2 and third lens group G3 can be expressed as φ2+φ3−dφ2φ3. However, since second lens group G2 and third lens group G3 are close together in the wide-angle state, the principle point space is small, so that the effect of the term dφ2φ3 is negligible. Consequently, in condition (18), the sum of the refractive powers of second lens group G2 and third lens group G3 effectively serves to stipulate the composite refractive power of second lens group G2 and third lens group G3.

If $|\phi 2+\phi 3|\cdot f_w$ exceeds the upper limit of condition (18), the off-axis light beam passing through second lens group G2 and third lens group G3 in the wide-angle state approaches the optical axis too closely, and the fluctuation of coma with field angle can no longer be satisfactorily corrected. Conversely, if $|\phi 2+\phi 3|\cdot f_w$ falls below the lower limit of condition (18), the off-axis light beam passing through first lens group G1 in the wide-angle state deviates too greatly from the optical axis, and excessive coma is generated in the peripheral part of the image plane.

To attain the coexistence of a high zoom ratio and an increased aperture size, it is necessary that the height of the off-axis light beam passing through each lens group change greatly as the lens positional state changes, as discussed above. Generally, if the aperture stop is located near the center of the zoom lens, the fluctuation of off-axis aberrations generated as the lens positional state changes can be satisfactorily corrected. Accordingly, in the fifth and sixth preferred embodiments of the present invention, it is preferable to locate the aperture stop between third lens group G3 and fourth lens group G4.

In addition, in the fifth and sixth preferred embodiments of the present invention, it is preferable to satisfy the following design condition (19):

$$0.7<|f_3|/f_4<1.0. \quad (19)$$

Design condition (19) stipulates the ratio of the focal length of third lens group G3 to the focal length of fourth lens group G4. If $|f_3|/f_4$ exceeds the upper limit of condition (19), coma with respect to the upper part light beam in the wide-angle state can no longer be satisfactorily corrected. Conversely, if $|f_3|/f_4$ falls be below the lower limit of condition (19), coma with respect to the lower part light beam in the wide-angle state can no longer be satisfactorily corrected.

In addition, in the fifth and sixth preferred embodiments of the present invention, it is preferred that the zoom lens satisfy the design condition $$1.5<f_1/D_{12t}<2.5 \quad (20)$$

wherein $D_{12t}$ is the axial distance between first lens group G1 and second lens group G2 in the telephoto state. Design condition (20) is for the purpose of attaining compactness of the lens system in the telephoto state. If $f_1/D_{12t}$ exceeds the upper limit of condition (20), the convergence action of first lens group G1 weakens. Consequently, the overall length of the lens can no longer be sufficiently shortened. Conversely, if $f_1/D_{12t}$ falls be below the lower limit of condition (20), the off-axis light beam passing through first lens group G1 deviates from the optical axis. Consequently, a compact lens diameter can no longer be attained.

Figure 15:
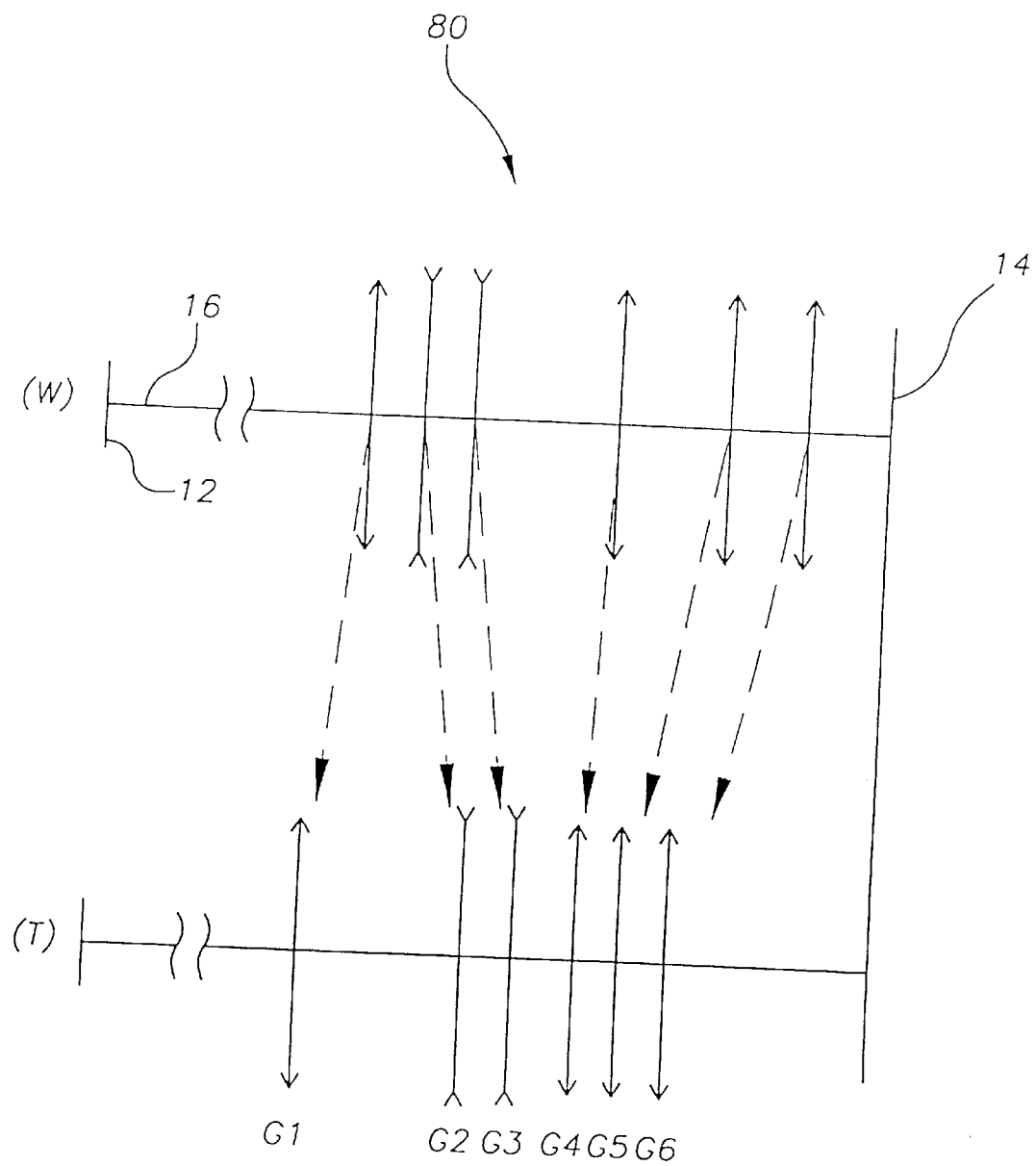
FIG. 15 is a schematic optical diagram of the lens groups comprising the zoom lens of Working Examples 11–13 of the present invention, with dashed arrows depicting the movement of each lens group when zooming from the extreme wide-angle state (W) to the extreme telephoto state (T)

With reference now to FIG. 15, a zoom lens according to a seventh preferred embodiment of the present invention is now described. Zoom lens 80 comprises, from object plane 12 to image plane 14 along optical axis 16, a first lens group G1 having positive refractive power, a second lens group G2 having negative refractive power, a third lens group G3 having negative refractive power, a fourth lens group G4 having positive refractive power, a fifth lens group G5 having positive refractive power, and a sixth lens group G6 having positive refractive power. At least second lens group G2 moves imagewise and fifth lens group G5 moves objectwise such that, when changing the lens positional state from the wide-angle state to the telephoto state, the air space between the first lens group and second lens group increases, the air space between the second lens group and third lens group increases, the air space between the third lens group and fourth lens group decreases, the air space between the fourth lens group and fifth lens group and the space between the fifth lens group and sixth lens group change, respectively. An aperture stop (not shown) is arranged between first lens group G1 and sixth lens group G6. Based on this configuration, the coexistence of an increased zoom ratio and an increased aperture size is achieved.

To realize an increased zoom ratio, it is necessary to respectively correct the fluctuation of on-axis aberrations and off-axis aberrations generated as the lens positional state changes. Fluctuation in on-axis aberrations can be controlled by satisfactorily correcting on-axis aberrations generated by each lens group. However, the location of an aperture stop to achieve such correction is vital. Generally, lens groups removed from the aperture stop are suited to the correction of off-axis aberrations, since the off-axis light beam passing therethrough is off-axis. Fluctuations of off-axis aberrations generated as the lens positional state changes can be satisfactorily corrected when the height of the off-axis light beam passing through each lens group changes greatly with the lens positional state. By arranging the aperture stop at or near the center of the zoom lens, and designing the zoom trajectory of the plurality of lenses such that the air space surrounding the aperture stop changes greatly when changing the lens positional state, the fluctuation of off-axis aberrations generated as the lens positional state changes can be satisfactorily corrected, as mentioned above. Thus, in the seventh preferred embodiment of the present invention, the coexistence of an increased zoom ratio and an increased optical performance can be attained, since the aperture stop is arranged imagewise of first lens group G1 and objectwise of sixth lens group G6.

The aberration correction function of each lens group comprising the zoom lens according to the seventh preferred embodiment of the present invention is now described. In the wide-angle state, first lens group G1 to third lens group G3 are close together and have a strong negative composite refractive power. The arrangement of refractive powers of the entire lens system is that of a reverse telephoto system. As such, a sufficient back focus is obtained by widening the space between the third lens group and the fourth lens group. In particular, if the field angle in the extreme wide-angle state exceeds 70°, it is important to satisfactorily correct the fluctuation of coma with field angle. This is achieved by appropriately setting the lens group spacing such that the off-axis light beam passing through second lens group G2 and third lens group G3 as well as fifth lens group G5 and sixth lens group G6 deviates from the optical axis in the wide-angle state. This allows for the correction of coma with respect to the lower part light beam at second lens group G2 and third lens group is satisfactorily corrected. Also coma with respect to the upper part light beam at fifth lens group G5 and sixth lens group is satisfactorily corrected. It is also preferable to appropriately set the focal length of second lens group G2 and third lens group, to arrange first lens group G1 and second lens group such that they are close together, and to ensure that the off-axis light beam passing through first lens group G1 does not excessively deviate from the optical axis. Also, by moving at least second lens group G2 imagewise such that the air space between first lens group G1 and second lens group G2 widens when changing the lens positional state from the wide-angle state to the telephoto state, the convergence action due to first lens group G1 in the telephoto state strengthens. This decreases the overall lens length.

Further, lens group G2 and third lens group G3 move imagewise, and the air space between third lens group G3 and the aperture stop narrows such that the air space between second lens group G2 and third lens group widens when changing the lens positional state from the wide-angle state to the telephoto state. Consequently, an increased zoom ratio can be realized, since the size of the lateral magnification of second lens group G2 and third lens group G3 increases. In addition, the fluctuations of off-axis aberrations as the lens positional state changes can be satisfactorily corrected, since the off-axis light beam passing through second lens group G2 and third lens group G3 gradually approaches the optical axis. Also, by narrowing the air space between fourth lens group G4 and fifth lens group G5 when changing the lens positional state from the wide-angle state to the telephoto state, the off-axis light beam passing through fifth lens group G5 in the wide-angle state deviates from the optical axis, and the off-axis light beam approaches optical axis as the telephoto state is approached. This allows for the fluctuation of off-axis aberrations generated when the lens positional state changes to be satisfactorily corrected.

Generally, for interchangeable lenses ideally suited to single lens reflex cameras and the like, the coupling flange between the camera body and the lens barrel is constrained in the radial direction. Accordingly, the off-axis light beam passing through the lens groups arranged imagewise of the aperture stop is close to the on-axis light beam. Consequently, it is difficult to satisfactorily correct coma with respect to the upper part light beam, generated as the lens positional state changes. Thus, it is preferable to locate fourth lens group G4, fifth lens group G5 and sixth lens group G6, each having positive refractive powers, imagewise of the aperture stop. When changing the lens positional state from the wide-angle state to the telephoto state, coma with respect to the upper part light beam can be corrected by narrowing the air space between fourth lens group G4 and fifth lens group G5 and by changing the height of the off-axis light beam passing through fifth lens group G5. Also, the fluctuation of coma with respect to the upper part light beam generated in the intermediate focal length state can be satisfactorily corrected by changing the air space between fifth lens group G5 and sixth lens group G6.

The seventh preferred embodiment of the present invention preferably satisfies several design conditions. Design condition (21) stipulates the focal length of fifth lens group G5 and sixth lens group G6 and is expressed as $$0.5 < f_5/f_6 < 2.0 \tag{21}$$

wherein f5 and f6 are the focal lengths of lens group G5 and G6, respectively.

If $f_5/f_6$ exceeds the upper limit of condition (21), the off-axis light beam in the wide-angle state passes through sixth lens group G6 removed from the optical axis. Thus, the light beam is vignetted by the coupling flange that couples the lens to the camera body, and the amount of light at the peripheral part of the image plan is reduced. Conversely, if $f_5/f_6$ falls below the lower limit of condition (21), the fluctuations of off-axis aberrations generated as the lens positional state changes can no longer be satisfactorily corrected.

Design condition (22) stipulates the quantity of movement of first lens group G1 when changing the lens positional state, and is expressed as $$-0.2 < D_1/(F_t - f_w) < 0.30 \tag{22}$$

wherein $D_1$ is the amount of axial movement of lens group G1 when zooming from the maximum wide-angle state to the maximum telephoto state.

If $D_1/(f_t - f_w)$ exceeds the upper limit of condition (22), the positive composite refractive power from first lens group G1 to third lens group G3 in the wide-angle state strengths toward the negative. Also, the composite refractive power from fourth lens group G4 to sixth lens group G6 strengthens toward the positive. Further, the asymmetry of the distribution of refractive powers of the entire lens system becomes more pronounced. As a result, negative distortion in the wide-angle state can not be corrected. Conversely, if $D_1/(f_t - f_w)$ falls below the lower limit of condition (22), the overall length of the lens in the telephoto state shortens, and the off-axis light beam passing through the first lens group deviates from the optical axis. As a result, the lens diameter of first lens group G1 increases.

In the zoom lens of the seventh preferred embodiment of the present invention, it is preferable to locate the aperture stop between third lens group G3 and fourth lens group G4 to obtain a higher optical performance in an arbitrary lens positional state. In particular, it is preferable to move the aperture stop together with the fourth lens group when changing the lens positional state.

In the seventh preferred embodiment of the zoom lens of the present invention, it is preferable to satisfy at least one of the design conditions, expressed as $$0.4 < |D_2|/(f_w \cdot f_t)^{1/2} < 0.7 \ (D_2 < 0) \text{tm} \quad (23)$$

$$0.4 < D_5/(f_w \cdot f_t)^{1/2} < 0.8 \quad (24)$$

to achieve a satisfactory optical performance in any arbitrary lens position state. In design conditions (23) and (24), $D_2$ is the amount of axial movement of second lens group G2 when changing the lens positional state from the wide-angle state to the telephoto state, and $D_5$ is the amount of axial movement of fifth lens group G5 when changing the lens positional state from the wide-angle state to the telephoto state. Here, an objectwise movement is positive. Design condition (23) stipulates the amount of movement of second lens group G2 as the lens positional state changes.

If $|D_2|/(f_w \cdot f_t)^{1/2}$ exceeds the upper limit of condition (23), the amount of movement of first lens group G1 increases when the lens positional state changes from the wide-angle state to the telephoto state (since the amount of movement of second lens group G2 decreases). The zoom lens barrel of the zoom lens moves each lens group in accordance with a predetermined movement ratio. However, since the lens diameter of first lens group G1 is large, the lens barrel construction becomes complex if the amount of movement for lens group G1 increases. Accordingly, if $|D_2|/(f_w \cdot f_t)^{1/2}$ exceeds the upper limit of condition (23), the lens barrel construction becomes complex. Conversely, if $|D_2|/(f_w \cdot f_t)^{1/2}$ falls below the lower limit of condition (23), the size of the lens diameter increases, since the off-axis light beam passing through first lens group G1 and second lens group G2 in the wide-angle state deviates excessively from the optical axis.

Design condition (24) stipulates the amount of movement of fifth lens group G5 as the lens positional state changes. If $D_5/(f_w \cdot f_t)^{1/2}$ exceeds the upper limit of condition (24), coma in the peripheral part of the image plane suddenly increases, since the off-axis light beam passing through fifth lens group G5 and sixth lens group in the wide-angle state deviates from the optical axis. Conversely, if $D_5/(f_w \cdot f_t)^{1/2}$ falls below the lower limit of condition (24), the refractive power of fourth lens group G4 and fifth lens group G5 strengthens toward the positive. Thus, the fluctuations of off-axis aberrations generated as the lens positional state changes can no longer be satisfactorily corrected.

Accordingly, increased optical performance cannot be achieved simultaneously with increased aperture size and an increased zoom ratio since, with a four-group type zoom lens having a conventional positive-negative-positive-positive arrangement of refractive powers, the lateral magnification of second lens group G2 changes greatly as the lens positional state changes.

In the zoom lens of the seventh preferred embodiment of the present invention, increased optical performance can also be achieved simultaneously by arranging imagewise of first lens group G1, the two negative lenses of second lens group G2, and third lens group G3. However, to obtain improved optical performance, it is preferable to satisfy the design condition $$0.02 < \Delta 2/(|f_2|+|f_3|) < 0.18 \ (f_2 < 0, f_3 < 0) \quad (25)$$

wherein $\Delta 2$ is the axial extent of change in the air space between second lens group G2 and third lens group G3 when changing the lens positional state from the wide-angle state to the telephoto state. Condition (25) stipulates the focal length of second lens group G2 and third lens group G3. If $\Delta 2/(|f_2|+|f_3|)$ exceeds the upper limit of condition (25), the fluctuation of coma with field angle increases, since the off-axis light beam passing through second lens group G2 and third lens group G3 in the wide-angle state approaches the optical axis. Conversely, if $\Delta 2/(|f_2|+|f_3|)$ falls below the lower limit, coma in the peripheral part of the image plane cannot be satisfactorily corrected, since the off-axis light beam passing through first lens group G1 in the telephoto state deviates from the optical axis.

Now described is a zoom lens according to an eighth preferred embodiment of the present invention, which has the same lens group arrangement as the third preferred embodiment described above with reference to zoom lens 35 of FIG. 6. In the eighth preferred embodiment, first lens group G1 and fourth lens group G4 are fixed (i.e., do no move axially) during zooming. Thus, the air space between second lens group G2 and third lens group G3 widens as these lens groups move imagewise. Also, fifth lens group G5 moves objectwise. Based on this configuration, the coexistence of an increased zoom ratio and an increased aperture size is attained.

It has been known in the design of zoom lenses that if the number of aberration correction degrees of freedom could be increased, and increased variable power and an increased aperture size along with increased optical performance could be achieved by increasing the number of moveable lens groups. Nevertheless, when the number of movable lens groups is increased, the predetermined optical performance cannot be guaranteed during manufacturing due to stringent requirements on the accuracy of the lens stopping position. Also, there are prior art four-group type zoom lenses having a positive-negative-positive-positive four-group arrangement with a wide-angle field angle exceeding 70° attained by moving first lens group G1. However, since first lens group G1 is removed from the image plane, the diameter of this lens group was large. Consequently, a large driving power was necessary to drive this first lens group axially as the lens positional state changed.

In the zoom lens of the eighth preferred embodiment of the present invention, a field angle exceeding 70° can be achieved while maintaining high optical performance, without having to axially move first lens group G1. This is accomplished by arranging two negative lens groups imagewise of first lens group G1. In addition, the predetermined zoom ratio can be ensured, without simultaneously moving fourth lens group G4 axially. This is accomplished by moving fifth lens group G5 axially to compensate for the image plane movement generated as second lens group G2 and third lens group move. Also, it is preferable to further arrange a sixth lens group imagewise of fifth lens group G5 to realize a higher optical performance. Accordingly, if the air space between fifth lens group G5 and sixth lens group is changed when the lens positional state changes, the fluctuations of off-axis aberrations generated as the lens positional state changes can be satisfactorily corrected. To simplify the construction of the barrel, it is preferable to locate the aperture stop between third lens group G3 and fourth lens group G4, and to set the aperture stop at a fixed position along the optical axis, regardless of any change in the lens positional state.

The zoom lens of the eighth preferred embodiment of the present invention preferably satisfies design condition (26) directed to shortening the overall length of the lens and achieving a zoom lens with superior portability. Condition (26) is expressed as $$1.0 < f_1/(f_w \cdot f_t)^{1/2} < 1.8. \tag{26}$$

If $f_1/(f_w \cdot f_t)^{1/2}$ exceeds the upper limit of condition (26), the overall length of the lens in the telephoto state increases and portability suffers, since the convergence action of first lens group G1 weakens. Conversely, if $f_1/(f_w \cdot f_t)^{1/2}$ falls below the lower limit of condition (26), the off-axis light beam passing through first lens group G1 in the wide-angle state deviates from the optical axis, and excessive coma is present in the peripheral part of the image plane. To realize a high optical performance even with a large aperture ratio and a more compact size, it is preferable that the eighth preferred embodiment of the present invention satisfy design condition (27), expressed as $$1.5 < M_1/M_4 < 2 \tag{27}$$

wherein $M_1$ is the axial separation between the most objectwise lens surface of first lens group G1 and the image plane, and $M_4$ is the axial separation between the most objectwise lens surface of fourth lens group G4 and the image plane.

If $M_1/M_4$ exceeds the upper limit of condition (27), the off-axis light beam passing through second lens group G2 from first lens group G1 in the wide-angle state deviates from the optical axis, and coma generated with respect to the lower part light beam at the peripheral part of the image plane increases. Accordingly, the predetermined optical performance cannot be satisfied. Conversely, if $M_1/M_4$ falls below the lower limit of condition (27), the fluctuation of off-axis aberrations generated as the lens positional state changes cannot be satisfactorily corrected, since the amount of movement of second lens group G2 and third lens group when the lens positional state changes decreases.

Accordingly, in the seventh and eighth preferred embodiments of the present invention, it is preferable to adopt either an appropriate inner focus (IF) system or a rear focus (RF) system for autofocusing, as discussed above. In particular, it is preferable to make third lens group G3 the focusing group. Also as discussed above, third lens group G3 and fourth lens group G4 in the seventh and eighth preferred embodiment of the present invention principally correct off-axis aberrations. This is because, since third lens group G3 and fourth lens group are positioned near the center of the zoom lens, the off-axis light beam passes therethrough near the optical axis. This reduces off-axis aberrations. Accordingly, even if third lens group G3 or fourth lens group is made the focusing group, the change in off-axis aberrations is small because the fluctuation of off-axis aberrations generated when focusing at close range is small. In particular, in the seventh and eight preferred embodiment of the present invention, it is preferable to reduce the lens diameter of the third lens group and to make it the focusing group, since the on-axis light beam diverges from the third lens group and impinges on the fourth lens group. Furthermore, it is preferable to clarify the aberration correction role of each lens group and to locate the aperture stop between the third lens group and fourth lens group, since the third lens group and fourth lens group principally correct on-axis aberration. Accordingly, with regard to the location of the aperture stop when changing the lens positional state attendant with zooming, there are leases wherein the aperture stop is fixed regardless of the lens positional state. There are also cases wherein it moves together with other lens groups. To simplify the construction of the barrel, it is preferable that the aperture stop have a fixed position regardless of the lens positional state. Also, it is preferable, to attain increased optical performance, that the aperture stop move together with fourth lens group G4 when the lens positional state changes.

A zoom lens according to a ninth preferred embodiment of the present invention having the same lens group configuration as the eighth preferred embodiment described above (see, e.g., zoom lens 35 of FIG. 6) is now discussed. When the lens positional state changes from the wide-angle state to the telephoto state, at least the second lens group moves imagewise and at least one of first lens group G1 and fourth lens group G4 moves such that the space between first lens group G1 and second lens group G2 increases, the air space between second lens group G2 and third lens group G3 increases, the air space between third lens group G3 and fourth lens group G4 decreases, and the air space between fourth lens group G4 and fifth lens group G5 decreases. An aperture stop is preferably located between first lens group G1 and fifth lens group G5.

In the configuration of the ninth preferred embodiment, fifth lens group G5 comprises, objectwise to imagewise, a positive lens subgroup including at least one positive lens component. Also included is a negative lens subgroup comprising a negative lens component and a positive lens component arranged in the air space imagewise of the negative lens component. The fifth lens group G5 satisfies the design condition $$0.15 < (r_1 + r_2)/(r_1 - r_2) < 1.2 \tag{28}$$

wherein $r_1$ is the radius of curvature of the objectwise lens surface of the positive lens component of the negative lens subgroup, and $r_2$ is the radius of curvature of the lens surface imagewise of the positive lens component of the negative lens subgroup. Condition (28) stipulates the shape of the most imagewise positive lens in the positive lens subgroup of fifth lens group G5.

If $(r_1 + r_2)/(r_1 - r_2)$ exceeds the upper limit of condition (28), outward-oriented coma is generated in the wide-angle state. Conversely, if $(r_1 + r_2)/(r_1 - r_2)$ falls below the lower limit of condition (28), inward-oriented coma is generated in the wide-angle state. In addition, it is preferable to adopt an appropriate inner focus system or rear focus system for autofocusing, as discussed above. In particular, it is preferable that only third lens group G3 move axially during focusing.

In the ninth preferred embodiment of the zoom lens of the present invention, the fluctuation of off-axis aberrations generated as the lens positional state changes is satisfactorily corrected by locating the aperture stop near the center of the zoom lens, as explained above in connection with the seventh preferred embodiment of the present invention. Aberration fluctuations are also corrected by designing the zoom trajectory of the lens groups such that the air space adjacent the aperture stop increases greatly when the lens positional state changes. In other words, in the zoom lens of the ninth preferred embodiment of the present invention, the coexistence of increased variable power and an increased optical performance is attained by locating the aperture stop between first lens group G1 and fifth lens group G5, and more preferably near the center of the zoom lens.

The aberration correction finction of each lens group comprising the zoom lens according to the ninth preferred embodiment of the present invention is now described. First lens group G1, second lens group G2 and third lens group G3 are arranged close together and have a strongly negative composite refractive power in the wide-angle state. A sufficient back focus is obtained, with the arrangement of refractive powers of the entire lens system as a reverse telephoto system, by widening the air space between third lens group G3 and fourth lens group G4. If the field angle exceeds 70° is covered, it is important that the fluctuation of coma with field angle be satisfactorily corrected. Coma in the lower part light beam at second lens group G2 and third lens group G3 is satisfactorily corrected, and coma in the upper part light beam at fifth lens group G5 is satisfactorily corrected by appropriately setting the lens group spacing such that the off-axis light beam passing through second lens group G2, third lens group G3 and fifth lens group G5 in the wide-angle state deviates from the optical axis. In particular, it is preferable to appropriately set the focal length of second lens group G2 and third lens group G3 as discussed below, to arrange first lens group G1 and second lens group G2 such that they are close to one another, and to ensure that the off-axis light beam passing through first lens group G1 does not deviate excessively from the optical axis.

The convergence action due to first lens group G1 in the telephoto state is strengthened and the overall length of the lens is shortened by axially moving at least second lens group G2 imagewise such that the air space between first lens group G1 and second lens group G2 widens when the lens positional state changes from the wide-angle state to the telephoto state. Also, the size of the lateral magnification of second lens group G2 and third lens group G3 increases and the zoom ratio increases by moving second lens group G2 and third lens group G3 imagewise, and by narrowing the air space between third lens group G3 and the aperture stop such that the air space between second lens group G2 and third lens group G3 widens when the lens positional state changes from the wide-angle state to the telephoto state. In addition, the off-axis light beam passing through second lens group G2 and third lens group G3 approaches the optical axis, and the fluctuation of off-axis aberrations as the lens positional state changes is satisfactorily corrected.

Further, by narrowing the air space between fourth lens group G4 and fifth lens group G5 when the lens positional state changes from the wide-angle state to the telephoto state, the off-axis light beam in the wide-angle state passes through fifth lens group G5 removed from the optical axis. The off-axis light beam approaches the optical axis as the telephoto state is approached, and the fluctuation of off-axis aberrations generated when the lens positional state changes is satisfactorily corrected.

To realize increased aperture size, it is important that the off-axis aberrations generated by each lens group be satisfactorily corrected. In the zoom lens according to the ninth preferred embodiment of the present invention, third lens group G3 and fourth lens group G4 principally correct on-axis aberrations. Since third lens group G3 and fourth lens group G4 are positioned near the center of the zoom lens, and are more preferably arranged relatively near the aperture stop, the off-axis light beam has a tendency to pass through these lens groups near the optical axis. Hence, the generation of off-axis aberrations is small. By satisfactorily correcting off-axis aberrations generated by third lens group G3 and fourth lens group G4, the fluctuation of off-axis aberrations generated as the lens positional state changes can be satisfactorily corrected and an increased aperture size can be achieved.

As explained above, in the zoom lens of the ninth preferred embodiment of the present invention, the aberration correction function of each lens group is clarified, and the coexistence of an increased zoom ratio and an increased aperture size is realized by satisfactorily correcting aberrations generated by each lens group. In addition, the diameter of the mount (i.e. flange) of the barrel of an interchangeable lens for a single lens reflex (SLR) camera is fixed. Thus, the diameter of the most imagewise lens is constrained. Generally, this most imagewise lens has a positive refractive power and the aperture stop is located objectwise of the most imagewise lens group. Accordingly, the diameter of the most imagewise lens tends to increase if the back focus shortens. In the prior art, a negative lens is frequently the most imagewise lens, such as is disclosed in Japanese Patent Application Kokai No. Hei 6-34885.

In the zoom lens of the ninth preferred embodiment of the present invention, fifth lens group G5 comprises a positive lens subgroup having at least one positive lens, and a negative lens subgroup having a negative lens and a positive lens arranged imagewise thereof. Based on this configuration, the off-axis light beam passing through the most imagewise lens approaches the optical axis. Consequently, satisfactory image optical performance and compactness are possible with a small number of constituent lenses.

In the ninth preferred embodiment of the present invention, the off-axis light beam passes through third lens group G3 and fourth lens group G4 near the optical axis by virtue of being near the center of the zoom lens. Accordingly, the generation of off-axis aberrations is small, and third lens group G3 and fourth lens group G4 principally correct on-axis aberrations. Also, the change in off-axis aberrations is small even if third lens group G3 and fourth lens group G4 move axially. Consequently, if third lens group G3 is made the focusing group, increased optical performance is possible since the fluctuation of off-axis aberrations generated when focusing at close range is small. In particular, since the on-axis light beam diverges from third lens group G3 and impinges on fourth lens group G4, the lens diameter of third lens group G3 is smaller. As such, it is preferable to make third lens group G3 the focusing group. In addition, it is preferable to clarify the aberration correction role of each lens and to locate the aperture stop between third lens group G3 and fourth lens group G4, since third lens group G3 and fourth lens group G4 principally correct on-axis aberrations.

With respect to aperture stop location, the case wherein the aperture stop is fixed regardless of the lens positional state, and the case wherein it moves together with another lens group are known. In the zoom lens of the ninth preferred embodiment of the present invention, in certain cases it is preferable that the aperture stop be at a fixed position regardless of the lens positional state to simply the lens barrel construction. In other cases, it is preferable that the aperture stop move together with the fourth lens group when the lens positional state changes to increase optical performance.

It is also preferable that the zoom lens of the ninth preferred embodiment of the present invention satisfy the design condition $$0.75 < |f_b|/f_5 < 1.50 \tag{29}$$

wherein $f_b$ is the focal length of the negative lens subgroup of fifth lens group G5. Condition (29) stipulates an appropriate focal length for the negative lens subgroup of fifth lens group G5 for increasing compactness, performance and balance. If $|f_b|/f_5$ exceeds the upper limit of condition (29), the overall length of the lens in the telephoto state cannot be reduced. Conversely, if $|f_b|/f_5$ falls below the lower limit of condition (29), the off-axis light beam passing through fifth lens group G5 in the wide-angle state approaches the optical axis and the fluctuation in coma with field angle cannot be satisfactorily corrected.

The zoom lens of the ninth preferred embodiment of the present invention preferably also satisfies the design condition $$0.2 < (f_4 - f_5)/(f_4 + f_5) < 0.2 \tag{30}$$

Condition (30) stipulates an appropriate ratio between the focal lengths of fourth lens group G4 and fifth lens group G5. If $(f_4 - f_5)/(f_4 + f_5)$ exceeds the upper limit of condition (30), the off-axis light beam passing through the fifth lens group in the wide-angle state approaches the optical axis. As such, the fluctuation of coma with field angle cannot be satisfactorily corrected. Conversely, if $(f_4 - f_5)/(f_4 + f_5)$ falls below the lower limit of condition (30), negative spherical aberration generated by the fourth lens group increases, and the fluctuations in on-axis aberrations are generated as the lens positional state changes.

The zoom lens of the ninth preferred embodiment of the present invention also preferably satisfies the design condition $$2.5 < f_1/|f_2| < 3.5. \tag{31}$$

Condition (31) stipulates an appropriate ratio for the focal lengths of first lens group G1 and second lens group G2 for increasing the compactness of the zoom lens. If $f_1/|f_2|$ exceeds the upper limit of condition (31), the overall length of the lens in the telephoto state increases. Conversely, if $f_1/|f_2|$ falls below the lower limit of condition (31), the off-axis light beam passing through first lens group G1 deviates from the optical axis, causing the lens diameter to increase.

The zoom lens of the ninth preferred embodiment of the present invention also preferably satisfies the design condition $$-0.5 < (f_2 - f_3)/(f_2 + f_3) < 0. \tag{32}$$

Condition (32) stipulates an appropriate range for the focal lengths of second lens group G2 and third lens group G3, and is necessary for attaining the coexistence of increased zoom ratio and increased optical performance. If $(f_2 - f_3)/(f_2 + f_3)$ exceeds the upper limit of condition (32), positive spherical aberration generated by third lens group G3 cannot be satisfactorily corrected. Conversely, if $(f_2 - f_3)/(f_2 + f_3)$ falls below the lower limit of condition (32), the off-axis light beam passing through second lens group G2 in the wide-angle state approaches the optical axis, and the fluctuation of coma with field angle cannot be satisfactorily corrected.

The zoom lens of the ninth preferred embodiment of the present invention also preferably satisfies the design condition $$f_t/|f_{12t}| < 0.6. \tag{33}$$

wherein $f_{12t}$ is the composite focal length of first lens group G1 and second lens group G2 in the telephoto state. Design condition (33) stipulates the lateral magnification of third lens group G3 in the telephoto state and is necessary for reducing the amount of lens movement if third lens group G3 is made the focusing group. If $f_t/|f_{12t}|$ exceeds the upper limit of condition (33), the amount of axial movement when focusing at close range is extremely large, since the lateral magnification of third lens group G3 increases. Furthermore, in the Working Examples of the present invention set forth below, an aperture ratio on the order of FNO 2.8 is realized. However, it is straightforward, for example, to reduce the zoom ratio and increase the aperture ratio, or to increase the FNO and increase the zoom ratio.

To prevent image blurring caused by hand vibration and the like, which tends to occur when taking a photo with a high zoom ratio zoom lenses, it is possible to include with each preferred embodiment of the present invention, as discussed above, an antivibration optical system. This is accomplished by first providing a blur detection system that detects blurring, and a driving means for shifting (i.e., driving) all or part of one lens group as an eccentric lens group. Then, detecting blurring by the blur detection system and shifting the image by shifting the eccentric lens group by the drive means so that the detected blurring is corrected.

In addition, the zoom lens of the present invention can be applied not only to a zoom lens that continuously changes the focal length while maintaining a fixed image plane position, but also to a varifocal lens wherein the image plane position fluctuates when continuously changing the focal length, or to a so-called step zoom lens that changes the focal length in steps, rather than continuously.

Working Examples

Set forth below are 16 Working Examples of the zoom lenses of the present invention as described above. In each Working Example, the aspherical surface is expressed by the following numerical expression (d):

$$S(y) = (y^2/R)/\{1 + (1 - \kappa \cdot y^2/R^2)^{1/2}\} + C4 \cdot y^4 + C6 \cdot y^6 + C8 \cdot y^8 + C10 \cdot y^{10} + \tag{d}$$

wherein y is the height in the direction perpendicular to the optical axis, S(y) is the deflection amount (sag amount) in height y, R is the reference radius of curvature (vertex radius of curvature), κ is the conical coefficient, and Cn is the nth order aspherical coefficient.

Tables 1a–d through 16a–d list the design values and design conditions for Working Examples 1–16, respectively. In the Tables, f is the focal length, FNO is the f-number, 2ω is the field angle, φ is the aperture stop radius, and Bf is the back focus. Also, S is the surface number, r is the radius of curvature, d is the axial distance between surfaces, n is the index of refraction with respect to the d-line (λ=587.6 nm), and ν is the Abbe number. Aberration plots are provided for Working Example 1 to show the degree of aberration correction. Such aberration plots are easily generated for Working Examples 2–16 from the corresponding design tables. The data for the aspherical surfaces are provided in Tables 1b–16b. In addition, a radius of curvature of "∞" indicates a plane surface.

Working Examples 1–3

As shown in FIG. 1, the zoom lens represents to Working Examples 1–3 of the present invention and comprises, from object plane 12 to image plane 14 along optical axis 16, a first lens group G1 having a positive refractive power, second lens group G2 having a negative refractive power, third lens group G3 having a negative refractive power, fourth lens group G4 having a positive refractive power, fifth lens group G5 having a positive refractive power, and sixth lens group G6 having a negative refractive power.

When performing the focal length variable operation (zooming) from the wide-angle positional state to the telephoto positional state, at least second lens group G2 moves imagewise and sixth lens group G6 moves objectwise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes.

Working Example 1

Figure 2:
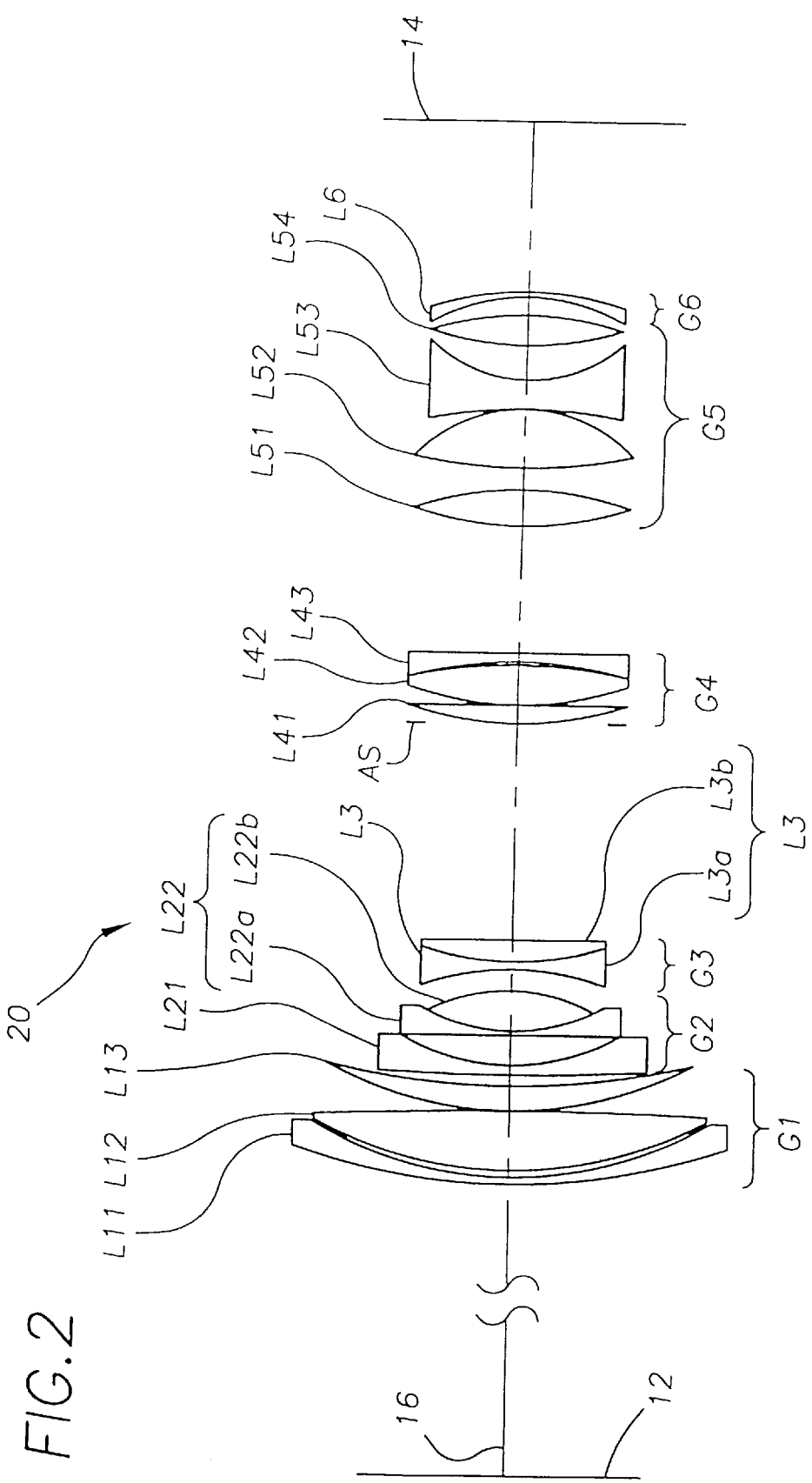
FIG. 2 is an optical diagram of the configuration of the zoom lens according to Working Example 1 of the present invention.

FIG. 2 shows the configuration of a zoom lens 20 according to Working Example 1 of the present invention. Zoom lens 20 comprises, from object plane 12 to image plane 14 along optical axis 16 (i.e., objectwise to imagewise), first lens group G1 comprising objectwise to imagewise, a negative meniscus lens L11 having an objectwise convex surface, a biconvex lens L12, and positive meniscus lens L13 having an objectwise convex surface. Second lens group G2 comprises, objectwise to imagewise, a negative meniscus lens L21 having an objectwise convex surface, and a negative cemented lens L22 having a biconcave lens L22a and a biconvex lens L22b. Third lens group G3 comprises, objectwise to imagewise, a negative cemented lens L3 having a biconcave lens L3a and a positive meniscus lens L3b having an objectwise convex surface. Fourth lens group G4 comprises, objectwise to imagewise, a biconvex lens L41, a biconvex lens L42, and negative meniscus lens L43 having an objectwise concave surface. Fifth lens group G5 comprises, objectwise to imagewise, a biconvex lens L51, a biconvex lens L52, a biconcave lens L53, and a biconvex lens L54. Sixth lens group G6 comprises a negative meniscus lens L6 having an objectwise concave surface.

In Working Example 1, when varying power (zooming) from the wide-angle state to the telephoto state, first lens group G1 first moves imagewise and then moves objectwise, second lens group G2 and third lens group G3 move imagewise, and fourth lens group G4 to sixth lens group G6 move objectwise. Thus, the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 first increases and then decreases. In addition, an aperture stop AS is located adjacent fourth lens group G4 between third lens group G3 and fourth lens group G4, and moves together with fourth lens group G4. Further, the aperture stop radius increases when zooming from the wide-angle state to the telephoto state.

Tables 1a–d list the design values and design conditions for Working Example 1 of the present invention.

TABLE 1a

DESIGN TABLE

| f | 28.80 | 70.00 | 140.00 | 194.00 |
|---|---|---|---|---|
| FNO | 2.90 | 2.90 | 2.90 | 2.90 |
| 2ω | 75.65 | 33.15 | 16.95 | 12.22° |
| Aperture Diameter | 26.00 | 32.24 | 35.22 | 35.40 |

TABLE 1a-continued

DESIGN TABLE

| s | r | d | n | ν |
|---|---|---|---|---|
| 1 | 161.8062 | 1.500 | 1.84666 | 23.83 |
| 2 | 76.7425 | 1.000 | | |
| 3 | 76.9182 | 9.900 | 1.62041 | 60.35 |
| 4 | −1133.1769 | 0.100 | | |
| 5 | 70.9581 | 6.700 | 1.69350 | 53.31 |
| 6 | 253.4789 | (d6 = variable) | | |
| 7 | 1674.5951 | 1.200 | 1.81474 | 37.03 |
| 8 | 30.4350 | 7.750 | | |
| 9 | −200.8124 | 0.900 | 1.83500 | 42.97 |
| 10 | 41.4244 | 5.700 | 1.84666 | 23.83 |
| 11 | −168.3388 | (d11 = variable) | | |
| 12 | −52.6800 | 1.000 | 1.67003 | 47.19 |
| 13 | 42.4871 | 3.800 | 1.84666 | 23.83 |
| 14 | 169.5940 | (d14 = variable) | | |
| 15 | ∞ | 0.700 | Aperture stop | |
| 16 | 61.5342 | 4.900 | 1.49782 | 82.52 |
| 17 | −197.1872 | 0.100 | | |
| 18 | 64.2715 | 5.000 | 1.49782 | 82.52 |
| 19 | −193.6733 | 1.300 | | |
| 20 | −87.4033 | 0.800 | 1.83400 | 37.35 |
| 21 | −6013.1438 | (d21 = variable) | | |
| 22 | 66.9795 | 4.300 | 1.69680 | 55.48 |
| 23 | −153.7929 | 9.200 | | |
| 24 | 78.6865 | 9.100 | 1.49782 | 82.52 |
| 25 | −41.1071 | 0.100 | | |
| 26 | −160.5423 | 1.000 | 1.82027 | 29.69 |
| 27 | 31.3268 | 6.450 | | |
| 28 | 110.2877 | 4.700 | 1.71736 | 29.50 |
| 29 | −70.1805 | (d29 = variable) | | |
| 30 | −38.0379 | 1.000 | 1.83500 | 42.97 |
| 31 | −59.0360 | (Bf) | | |

TABLE 1b

ASPHERIC COEFFICIENTS

S7 r = 1674.5951    κ = 5.5228    $C_4 = +1.23744 \times 10^{-6}$
///  $C_6 = -7.80256 \times 10^{-10}$    $C_8 = +4.36329 \times 10^{-13}$    $C_{10} = -9.00276 \times 10^{-15}$
S22 r = 66.9795    κ = 2.3824    $C_4 = -5.00920 \times 10^{-6}$
///  $C_6 = -2.89371 \times 10^{-9}$    $C_8 = +1.16663 \times 10^{-12}$    $C_{10} = -9.00276 \times 10^{-15}$ TABLE 1c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0007 | 194.0017 |
| d6 | 1.5000 | 22.4101 | 40.6790 | 47.9809 |
| d11 | 4.6623 | 5.4954 | 5.4954 | 12.3558 |
| d14 | 48.9055 | 21.7913 | 9.6248 | 1.7500 |
| d21 | 28.7619 | 10.0340 | 2.4570 | 1.0000 |
| d29 | 2.9672 | 4.3268 | 5.0384 | 4.3105 |
| Bf | 38.0002 | 60.7400 | 68.1438 | 69.4049 |

TABLE 1d

DESIGN CONDITION VALUES:

$f_1 = 100.5335$
$f_2 = -41.1088$
$f_3 = -73.2715$
$f_4 = 82.6660$
$f_5 = 57.2137$
(1) $f_1/(f_w \cdot f_t)^{1/2} = 1.345$
(2) $TL_w/TL_t = 0.947$
(3) $D_{34}/f_w = 1.698$
(4) $D_{12}/f_t = 0.247$
(5) $D_{45}/f_5 = 0.503$
(6) $f_3/f_2 = 1.782$
(7) $f_4/f_5 = 1.445$ FIGS. 3A(I)–3A(IV), 3B(I)–3B(IV), 3C(I)–3C(IV) and 3D(I)–3D(IV) are aberration plots of Working Example 1 with respect to the d-line ($\lambda$=587.6 nm)(infinite focus) for zoom lens 20 in the wide-angle state (f=28.8), in a first intermediate focal length state (f=70.0), in a second intermediate focal length state (f=140.0), state in the telephoto state (f=194.0), respectively. In each aberration plot, Y is the image height, and A is the half field angle with respect to each image height. In the aberration plots for astigmatism (3A(II)–3D(II)), the solid line indicates the sagittal image plane, and the broken line indicates the meridional image plane. In the aberration plots for spherical aberration (3A(I)–3D(I)), the broken line indicates the sine condition.

As is clear from the aberration plots, the various aberrations in each focal length state spanning from the wide-angle state to the telephoto state are satisfactorily corrected, and excellent image formation performance is achieved. This degree of aberration correction is also representative of Working Examples 2–16, below.

Working Example 2

Figure 4:
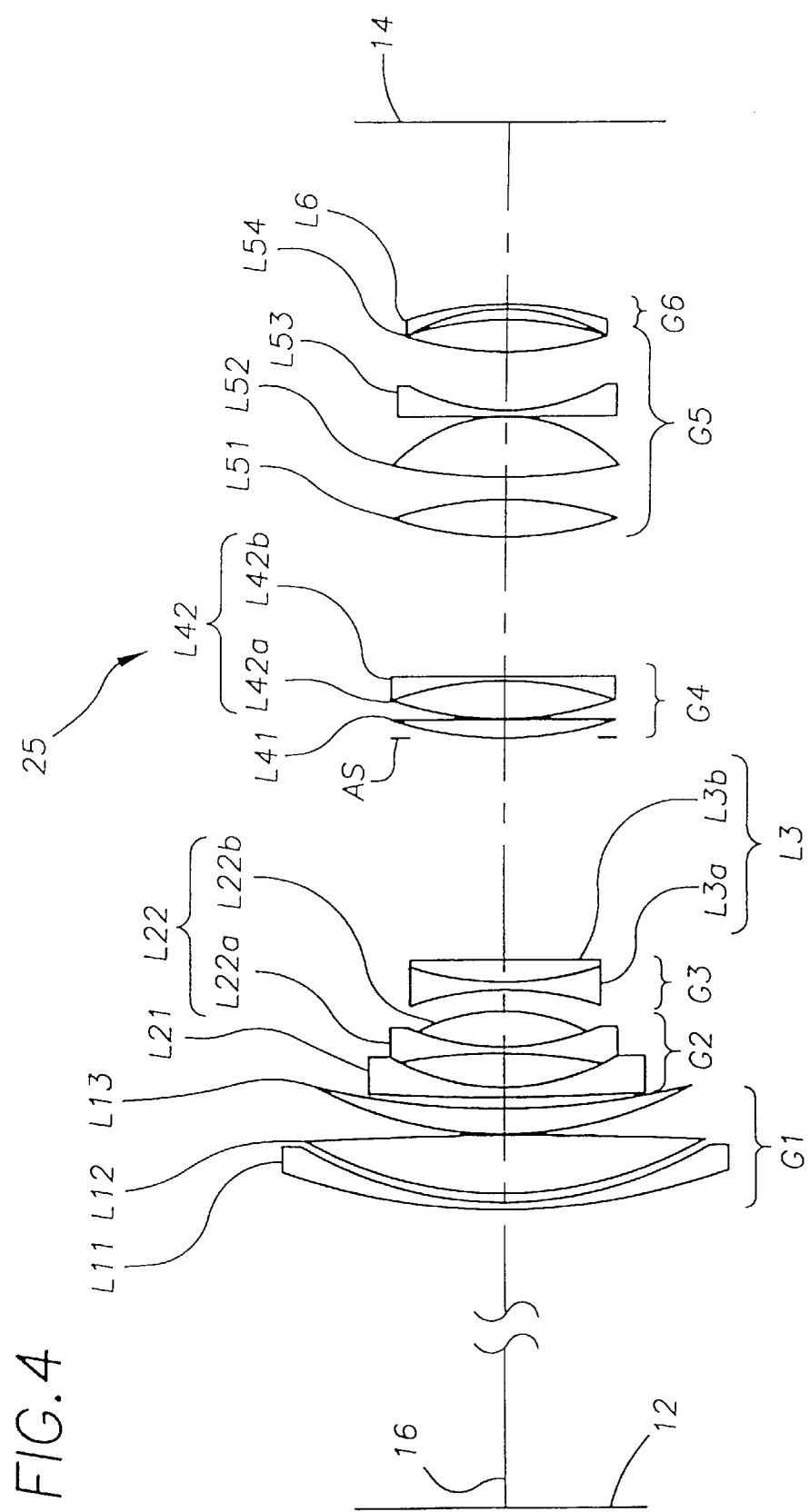
FIG. 4 is an optical diagram of the configuration of the zoom lens according to Working Example 2 of the present invention.

FIG. 4 shows the configuration of a zoom lens 25 according to Working Example 2 of the present invention. Zoom lens 25 has the same basic configuration as zoom lens 20 of FIG. 2 combined to form (Working Example 1), except that lenses 42 and 43 in zoom lens 20 are, in zoom lens 25, compound lens 42 comprising lenses 42*a* and 42*b*. Also, zoom lens 25 undergoes the same changes in the air spaces when zooming as zoom lens 20.

Tables 2a–d list the design values and design conditions for Working Example 2 of the present invention.

TABLE 2a

DESIGN TABLE

|   | f | 28.80 | 70.00 | 140.00 | 194.00 |
|---|---|---|---|---|---|
|   | FNO | 2.90 | 2.90 | 2.90 | 2.90 |
|   | 2ω | 75.41 | 33.05 | 16.88 | 12.24° |
|   | Aperture Diameter | 25.60 | 31.48 | 33.84 | 35.34 |
| S | r | d |  | n | ν |
| 1 | 190.4150 | 1.500 |  | 1.84666 | 23.83 |
| 2 | 85.9379 | 1.000 |  |  |  |

TABLE 2a-continued

DESIGN TABLE

| 3 | 84.7483 | 9.800 | 1.62041 | 60.35 |
|---|---|---|---|---|
| 4 | −423.7788 | 0.100 |  |  |
| 5 | 69.0744 | 6.000 | 1.69680 | 55.48 |
| 6 | 171.7412 | (d6 = variable) |  |  |
| 7 | 393.1037 | 1.200 | 1.81474 | 37.03 |
| 8 | 31.5103 | 7.750 |  |  |
| 9 | −160.2839 | 0.900 | 1.83500 | 42.97 |
| 10 | 46.1305 | 5.350 | 1.84666 | 23.83 |
| 11 | −163.1180 | (d11 = variable) |  |  |
| 12 | −51.0866 | 1.000 | 1.65844 | 50.84 |
| 13 | 44.3577 | 3.550 | 1.84666 | 23.83 |
| 14 | 167.0177 | (d14 = variable) |  |  |
| 15 | ∞ | 0.700 | Aperture stop |  |
| 16 | 65.6168 | 4.100 | 1.49782 | 82.52 |
| 17 | −371.0737 | 0.100 |  |  |
| 18 | 66.7445 | 6.850 | 1.49782 | 82.52 |
| 19 | −57.3842 | 1.000 | 1.83500 | 42.97 |
| 20 | −904.8357 | (d20 = variable) |  |  |
| 21 | 79.3307 | 3.350 | 1.74330 | 49.23 |
| 22 | −203.2664 | 9.900 |  |  |
| 23 | 86.2312 | 9.050 | 1.49782 | 82.52 |
| 24 | −40.8025 | 0.100 |  |  |
| 25 | 254.6695 | 1.000 | 1.80518 | 25.46 |
| 26 | 29.2625 | 7.050 |  |  |
| 27 | 106.5051 | 3.400 | 1.84666 | 23.83 |
| 28 | −162.0625 | (d28 = variable) |  |  |
| 29 | −46.2971 | 1.000 | 1.83500 | 42.97 |
| 30 | −86.4862 | (Bf) |  |  |

TABLE 2b

ASPHERIC COEFFICIENTS

S7   r = 393.1037     κ = 11.0000     $C_4 = +7.64647 \times 10^{-7}$
///  $C_6 = -5.49504 \times 10^{-10}$   $C_8 = +2.33357 \times 10^{-13}$   $C_{10} = +1.04457 \times 10^{-16}$
S21  r = 79.3307      κ = 2.2669      $C_4 = -5.18000 \times 10^{-6}$
///  $C_6 = -2.51053 \times 10^{-9}$    $C_8 = -9.16437 \times 10^{-13}$   $C_{10} = -5.29344 \times 10^{-15}$ TABLE 2c

VARIABLE SPACING WHEN VARYING POWER (ZOOMING)
FOCUSED ON OBJECT AT ∞

| Lens Position | a | b | c | d |
|---|---|---|---|---|
| f | 28.8000 | 70.0000 | 140.0007 | 194.0017 |
| d6 | 1.5000 | 23.8936 | 43.5476 | 49.4290 |
| d11 | 4.7922 | 6.9315 | 8.4315 | 11.5431 |
| d14 | 50.0388 | 21.8953 | 9.3535 | 1.7500 |
| d20 | 31.0173 | 11.5624 | 4.5146 | 1.4000 |
| d28 | 3.4633 | 4.3268 | 4.8912 | 4.1799 |
| Bf | 37.9997 | 59.9569 | 65.9685 | 70.9484 |

TABLE 2d

DESIGN CONDITION VALUES:

$f_1 = 104.4695$
$f_2 = -43.5791$
$f_3 = -72.4370$
$f_4 = 85.3736$
$f_5 = 55.8498$
(1) $f_1/(f_w \cdot f_t)^{1/2} = 1.398$
(2) $TL_w/TL_t = 0.954$
(3) $D_{34}/f_w = 1.737$
(4) $D_{12}/f_t = 0.255$
(5) $D_{45}/f_5 = 0.555$
(6) $f_3/f_2 = 1.662$
(7) $f_4/f_5 = 1.529$

Working Example 3

Figure 5:
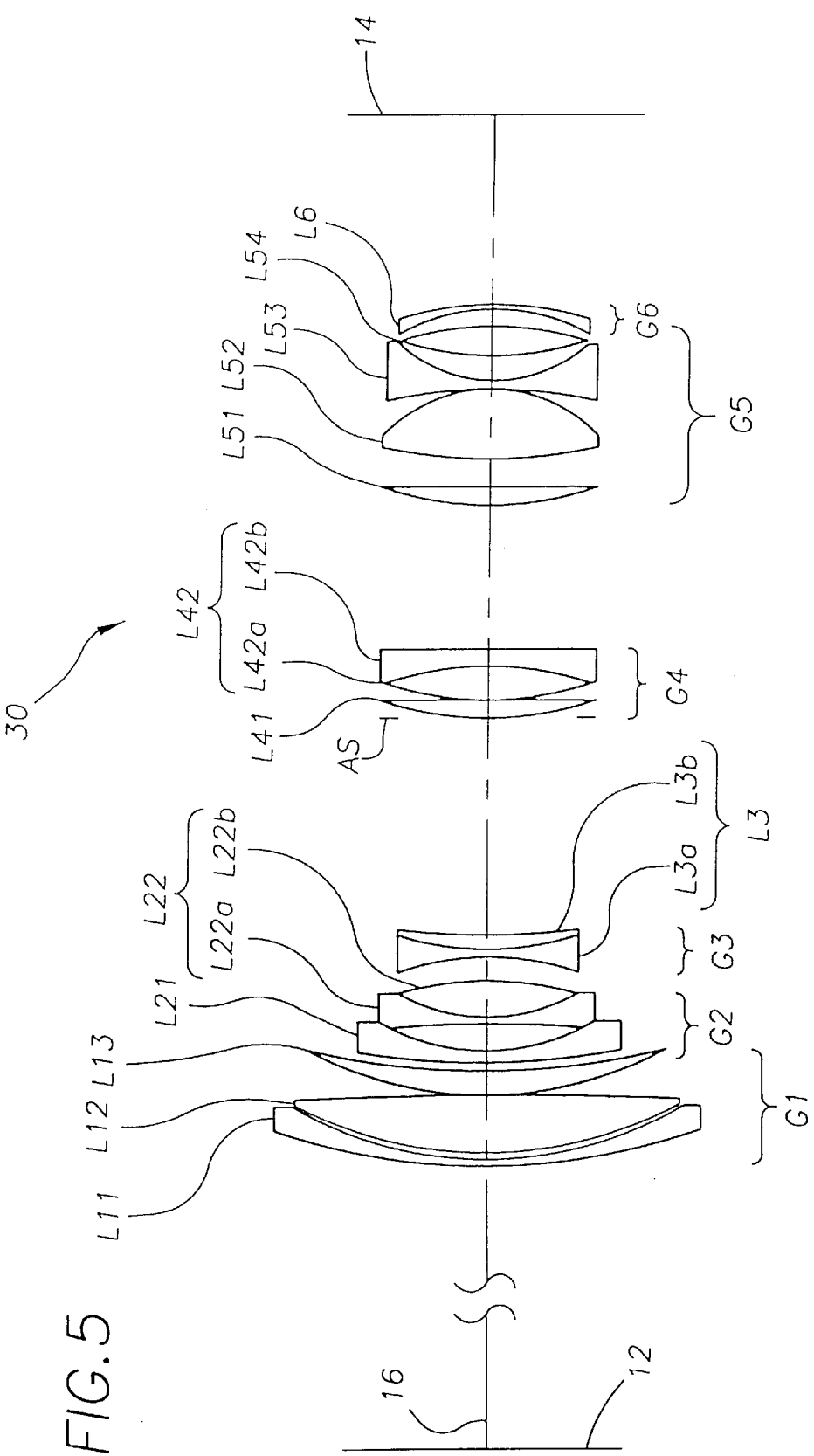
FIG. 5 is an optical diagram of the configuration of the zoom lens according to Working Example 3 of the present invention.

FIG. 5 shows the configuration of a zoom lens 30 according to Working Example 3 of the present invention. Zoom lens 30 has the same basic configuration as zoom lens 25 of FIG. 4 (Working Example 2).

In Working Example 3, when zooming from the wide-angle state to the telephoto state, first lens group G1 first moves imagewise and then moves objectwise, second lens group G2 and third lens group G3 move imagewise, and fifth lens group G5 and sixth lens group G6 move objectwise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 first increases and then decreases. However, fourth lens group G4 is fixed along the optical axis. In addition, an aperture stop AS is located adjacent fourth lens group G4 between third lens group G3 and fourth lens group G4. The aperture stop radius increases when zooming from the wide-angle state to the telephoto state, although it is fixed along the optical axis together with fourth lens group G4.

Tables 3a–3d list the design values and design conditions for Working Example 3 of the present invention.

TABLE 3a

DESIGN TABLE

| f | 28.80 | 70.00 | 140.00 | 194.00 |
|---|---|---|---|---|
| FNO | 2.90 | 2.90 | 2.90 | 2.90 |
| 2ω | 75.59 | 33.05 | 16.92 | 12.25° |
| Aperture Diameter | 26.13 | 31.58 | 34.60 | 35.78 |

| S | r | d | n | ν |
|---|---|---|---|---|
| 1 | 176.1773 | 1.500 | 1.84666 | 23.83 |
| 2 | 81.5336 | 1.000 | | |
| 3 | 80.8687 | 10.500 | 1.62041 | 60.35 |
| 4 | -557.5412 | 0.100 | | |
| 5 | 68.7958 | 6.450 | 1.69680 | 55.48 |
| 6 | 199.5057 | (d6 = variable) | | |
| 7 | 637.6892 | 1.200 | 1.81474 | 37.03 |
| 8 | 31.2514 | 7.950 | | |
| 9 | -144.5846 | 0.900 | 1.83500 | 42.97 |
| 10 | 48.1839 | 5.300 | 1.84666 | 23.83 |
| 11 | -163.1988 | (d11 = variable) | | |
| 12 | -49.7238 | 1.000 | 1.62280 | 56.93 |
| 13 | 48.0796 | 3.300 | 1.84666 | 23.83 |

TABLE 3a-continued

DESIGN TABLE

| 14 | 161.0550 | (d14 = variable) | | |
|---|---|---|---|---|
| 15 | ∞ | 0.700 | Aperture stop | |
| 16 | 68.3778 | 4.000 | 1.49782 | 82.52 |
| 17 | -427.0582 | 0.100 | | |
| 18 | 77.6111 | 6.950 | 1.49782 | 82.52 |
| 19 | -52.1300 | 1.000 | 1.83500 | 42.97 |
| 20 | -232.3430 | (d20 = variable) | | |
| 21 | 61.6060 | 4.500 | 1.65160 | 58.44 |
| 22 | -243.7490 | 7.700 | | |
| 23 | 65.9685 | 12.000 | 1.49782 | 82.52 |
| 24 | -42.5379 | 0.100 | | |
| 25 | -156.0129 | 1.000 | 1.80610 | 33.27 |
| 26 | 30.7964 | 5.000 | | |
| 27 | 110.4314 | 4.550 | 1.74950 | 35.04 |
| 28 | -72.1558 | (d28 = variable) | | |
| 29 | -38.2808 | 1.000 | 1.83500 | 42.97 |
| 30 | -62.4862 | (Bf) | | |

TABLE 3b

ASPHERIC COEFFICIENTS

| S7 | r = 637.6892 | κ = 7.4504 | $C_4 = +9.60240 \times 10^{-7}$ |
| /// | $C_6 = -7.93770 \times 10^{-10}$ | $C_8 = +7.86540 \times 10^{-13}$ | $C_{10} = -8.16590 \times 10^{-16}$ |
| S21 | r = 61.6060 | κ = 1.6361 | $C_4 = -4.14690 \times 10^{-6}$ |
| /// | $C_6 = -2.58840 \times 10^{-9}$ | $C_8 = +5.30380 \times 10^{-13}$ | $C_{10} = -8.16590 \times 10^{-15}$ |

TABLE 3c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0007 | 194.0017 |
| d6 | 1.5000 | 23.6870 | 40.9809 | 46.9308 |
| d11 | 5.8385 | 7.3082 | 8.3922 | 11.7638 |
| d14 | 50.3627 | 22.5670 | 9.4694 | 1.7500 |
| d20 | 35.6896 | 13.1134 | 4.6612 | 1.4000 |
| d28 | 3.0657 | 4.3377 | 4.8016 | 4.3599 |
| Bf | 37.9997 | 59.3036 | 67.2917 | 70.9942 |

TABLE 3d

DESIGN CONDITION VALUES:

$f_1 = 100.2638$
$f_2 = -40.5974$
$f_3 = -75.7326$
$f_4 = 82.8560$
$f_5 = 57.7304$
(1) $f_1/(f_w \cdot f_t)^{1/2} = 1.341$
(2) $TL_w/TL_t = 0.988$
(3) $D_{34}/f_w = 1.749$
(4) $D_{12}/f_t = 0.242$
(5) $D_{45}/f_5 = 0.618$
(6) $f_3/f_2 = 1.865$
(7) $f_4/f_5 = 1.435$

WORKING EXAMPLES 4–6

Next, Working Examples 4–6 according to the present invention are discussed. With reference to FIG. 6, zoom lens 35 according to Working Examples 4–6 comprises, objectwise to imagewise, a first lens group G1 having a positive refractive power, second lens group G2 having a negative refractive power, third lens group G3 having a negative refractive power, fourth lens group G4 having a positive refractive power, and fifth lens group G5 having a positive refractive power. Accordingly, when zooming from the wide-angle state to the telephoto state, at least second lens group G2 and third lens group G3 move imagewise, and fifth lens group G5 moves objectwise such that the air space between first lens group G1 and second lens group G2 increases, the air space between second lens group G2 and third lens group G3 increases, the air space between third lens group G3 and fourth lens group G4 decreases, and the air space between fourth lens group G4 and fifth lens group G5 decreases.

Working Example 4

FIG. 7 shows the configuration of a zoom lens 40 representing Working Example 4 of the present invention. Zoom lens 40 has the same basic configuration as zoom lens 35 of FIG. 6 (Working Example 3), except that fifth lens group G5 comprises, objectwise to imagewise, a positive biconvex lens L51, a positive biconvex lens L52, a negative meniscus lens L53 having an objectwise convex surface, a positive biconvex lens L54, and a negative meniscus lens L55 having an objectwise concave surface. Third lens group G3 moves objectwise when focusing at close range. Also, when zooming from the wide-angle state to the telephoto state, fourth lens group G4 is fixed along the optical axis, though this is not necessary.

Tables 4a–4d list the design values and design conditions for Working Example 4 of the present invention.

TABLE 4a

DESIGN TABLE

| f | 28.80 | 70.00 | 140.00 | 194.00 |
|---|---|---|---|---|
| FNO | 2.90 | 2.90 | 2.90 | 2.90 |
| 2ω | 75.52 | 33.05 | 16.86 | 12.23° |
| Aperture Diameter | 24.60 | 31.14 | 34.46 | 34.88 |

| S | r | d | n | ν |
|---|---|---|---|---|
| 1 | 137.7212 | 1.500 | 1.84666 | 23.83 |
| 2 | 79.9973 | 1.000 | 1.0 | |
| 3 | 78.6874 | 11.100 | 1.59319 | 67.87 |
| 4 | −562.2914 | 0.100 | 1.0 | |
| 5 | 76.4641 | 5.000 | 1.65160 | 58.44 |
| 6 | 166.1102 | (D6) | 1.0 | |
| 7 | 277.8458 | 1.200 | 1.79450 | 45.50 |
| 8 | 32.3112 | 6.950 | 1.0 | |
| 9 | −408.4269 | 0.900 | 1.83500 | 42.97 |
| 10 | 49.5012 | 4.300 | 1.84666 | 23.83 |
| 11 | ∞ | (D11) | 1.0 | |
| 12 | −52.3364 | 1.000 | 1.65160 | 58.44 |
| 13 | 47.9742 | 3.400 | 1.84666 | 23.83 |
| 14 | 186.2512 | (D14) | 1.0 | |
| 15 | ∞ | 0.700 | 1.0 | |
| 16 | 75.4180 | 3.300 | 1.59319 | 67.87 |
| 17 | ∞ | 0.100 | 1.0 | |

TABLE 4a-continued

DESIGN TABLE

| 18 | 66.9041 | 7.450 | 1.60300 | 65.42 |
|---|---|---|---|---|
| 19 | −49.6620 | 1.000 | 1.83400 | 37.35 |
| 20 | 649.2389 | (D21) | 1.0 | |
| 21 | 78.1592 | 3.400 | 1.74330 | 49.23 |
| 22 | −204.6816 | 9.400 | 1.0 | |
| 23 | 92.9839 | 9.900 | 1.49782 | 82.52 |
| 24 | −39.5173 | 0.100 | 1.0 | |
| 25 | 208.4392 | 1.000 | 1.80518 | 25.46 |
| 26 | 29.3010 | 6.750 | 1.0 | |
| 27 | 88.3424 | 3.500 | 1.84666 | 23.83 |
| 28 | −209.2210 | 3.850 | 1.0 | |
| 29 | −44.9630 | 1.000 | 1.80420 | 46.51 |
| 30 | −82.8618 | (Bf) | 1.0 | |

TABLE 4b

ASPHERIC COEFFICIENTS

| S7 | r = 11.000 | $C_4 = 4.89570 \times 10^{-7}$ | $C_6 = -1.19380 \times 10^{-9}$ |
|---|---|---|---|
| /// | $C_8 = 2.06570 \times 10^{-12}$ | $C_{10} = -1.31260 \times 10^{-15}$ | |
| S21 | r = 0.5704 | $C_4 = -4.79240 \times 10^{-6}$ | $C_6 = -2.57790 \times 10^{-9}$ |
| /// | $C_8 = -6.26790 \times 10^{-13}$ | $C_{10} = -6.48330 \times 10^{-15}$ | |

TABLE 4c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0007 | 194.0017 |
| D5 | 1.5000 | 24.5154 | 46.2698 | 54.0949 |
| D11 | 6.4908 | 10.8471 | 11.8471 | 12.8537 |
| D14 | 46.8960 | 19.3483 | 8.3455 | 1.7500 |
| D21 | 29.2660 | 10.7209 | 4.3761 | 1.4799 |
| Bf | 38.1254 | 63.3850 | 71.2605 | 71.9208 |
| f | 28.8000 | 70.0000 | 140.0007 | 194.0017 |
| Δ3 | 1.9889 | 1.5273 | 2.0984 | 2.6559 |

TABLE 4d

DESIGN CONDITION VALUES:

$f_1 = 113.3303$
$f_2 -42.0916$
$f_3 = -76.9017$
$f_4 = 88.0091$
$f_5 = 70.1403$
(8) (Ave. C) · $f_w$ = 0.329
(9) $D_2/f_1 = 0.477$
(10) $|r_a|/D_a = 1.020$
(11) $D_5/f_w = 0.326$
(12) $f_1/f_t = 0.584$
(13) $f_3/f_2 = 1.827$
(14) $f_4/f_5 = 1.255$

Working Example 5

Figure 8:
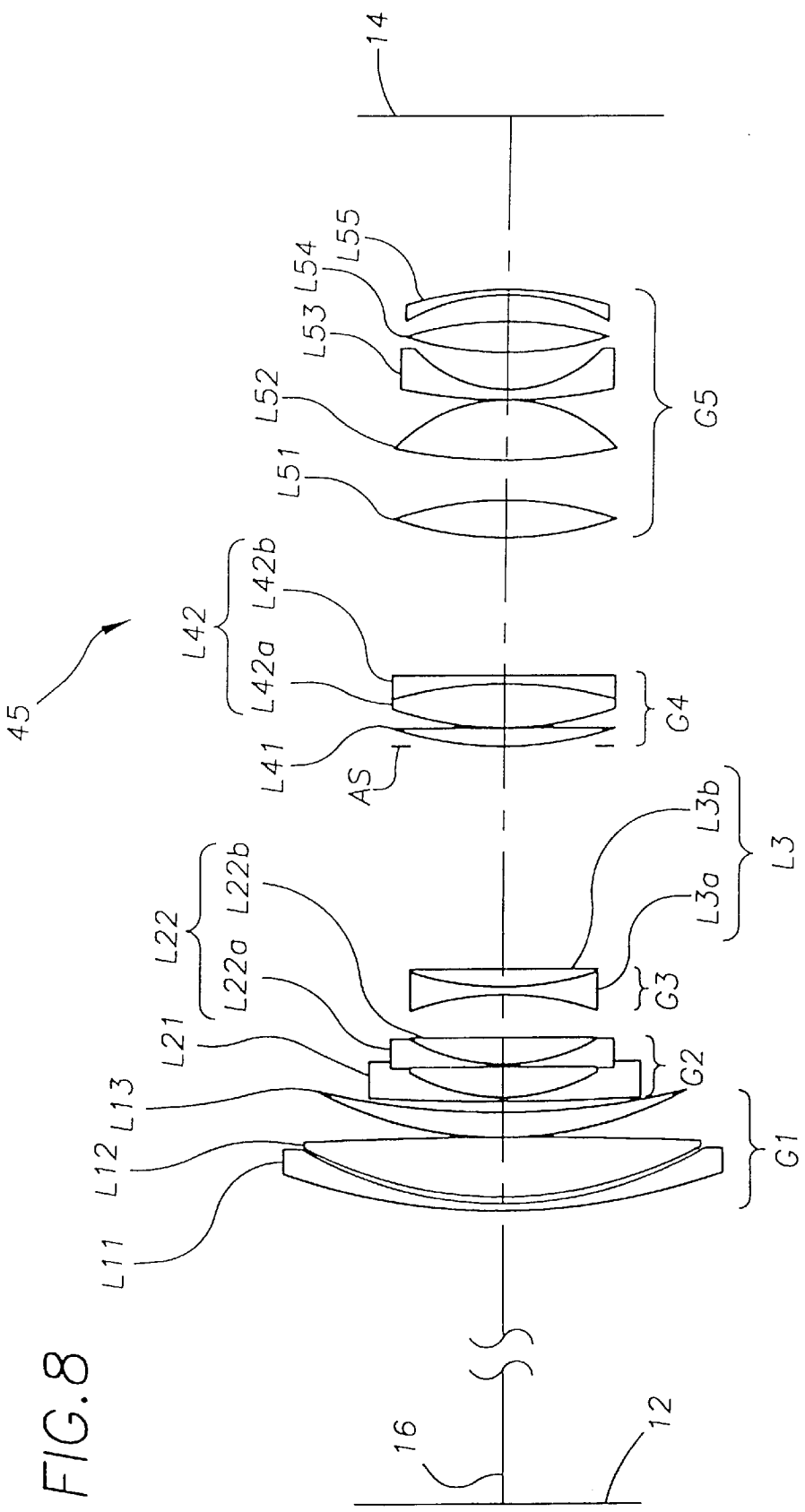
FIG. 8 is an optical diagram of the configuration of the zoom lens according to Working Example 5 of the present invention.

FIG. 8 shows the configuration of a zoom lens 45 according to Working Example 5 of the present invention. Zoom lens 45 has the same basic configuration as zoom lens 40 of FIG. 7 (Working Example 4). Third lens group G3 moves objectwise when focusing at close range.

Tables 5a–5d list the design values and design conditions for Working Example 5 of the present invention.

TABLE 5a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 75.53 | 33.05 | 16.87 | 12.24° |
| Aperture Diameter | | 24.64 | 31.54 | 34.58 | 35.04 |

| S | r | d | n | ν |
|---|---|---|---|---|
| 1 | 142.5080 | 1.500 | 1.84666 | 23.83 |
| 2 | 80.2558 | 1.000 | 1.0 | |
| 3 | 78.7991 | 10.900 | 1.60300 | 65.42 |
| 4 | −545.8065 | 0.100 | 1.0 | |
| 5 | 76.2358 | 4.900 | 1.67790 | 55.52 |
| 6 | 156.1563 | (D6) | 1.0 | |
| 7 | 283.6650 | 1.200 | 1.79450 | 45.50 |
| 8 | 31.9413 | 6.900 | 1.0 | |
| 9 | −484.3823 | 0.900 | 1.83500 | 42.97 |
| 10 | 51.0355 | 4.200 | 1.84666 | 23.83 |
| 11 | ∞ | (D11) | 1.0 | |
| 12 | −50.5493 | 1.000 | 1.65160 | 58.44 |
| 13 | 49.4874 | 3.500 | 1.84666 | 23.83 |
| 14 | 207.7760 | (D14) | 1.0 | |
| 15 | ∞ | 0.700 | 1.0 | |
| 16 | 76.9503 | 3.400 | 1.61800 | 63.39 |
| 17 | 1359.3209 | 0.100 | 1.0 | |
| 18 | 62.7412 | 7.200 | 1.49782 | 82.52 |
| 19 | −56.8763 | 1.000 | 1.83400 | 37.35 |
| 20 | 1509.2003 | (D21) | 1.0 | |
| 21 | 77.6758 | 3.550 | 1.74330 | 49.23 |
| 22 | −197.2597 | 9.700 | 1.0 | |
| 23 | 90.5823 | 9.400 | 1.49782 | 82.52 |
| 24 | −40.3677 | 0.100 | 1.0 | |
| 25 | 221.5655 | 1.000 | 1.80518 | 25.46 |
| 26 | 29.1464 | 7.050 | 1.0 | |
| 27 | 88.1519 | 3.600 | 1.84666 | 23.83 |
| 28 | −208.3678 | 3.800 | 1.0 | |
| 29 | −45.5235 | 1.000 | 1.80420 | 46.51 |
| 30 | −83.0370 | (Bf) | 1.0 | |

TABLE 5b

ASPHERIC COEFFICIENTS

| S7 | r = −9.000 | $C_4$ = 7.00492 × 10$^{-7}$ | $C_6$ = −1.14589 × 10$^{-9}$ |
|---|---|---|---|
| /// | $C_8$ = 1.86951 × 10$^{-12}$ | $C_{10}$ = −1.13237 × 10$^{-15}$ | |
| S21 | r = 1.1300 | $C_4$ = −4.86747 × 10$^{-6}$ | $C_6$ = −2.40966 × 10$^{-9}$ |
| /// | $C_8$ = −7.06837 × 10$^{-13}$ | $C_{10}$ = −5.58542 × 10$^{-15}$ | |

TABLE 5c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0000 | 194.0000 |
| D5 | 1.5000 | 24.7479 | 46.6978 | 54.5403 |
| D11 | 6.4854 | 10.9020 | 11.9019 | 12.6781 |
| D14 | 46.4172 | 19.1023 | 8.2148 | 1.7500 |
| D21 | 28.6418 | 10.2920 | 4.0519 | 1.1000 |
| Bf | 38.0000 | 63.4464 | 71.4325 | 72.2311 |
| f | 28.8000 | 70.0000 | 140.0000 | 194.0000 |
| Δ3 | 1.9554 | 1.5011 | 2.0622 | 2.6011 |

TABLE 5d

DESIGN CONDITION VALUES:

$f_1$ = 113.7726
$f_2$ = −42.1168
$f_3$ = −76.3735
$f_4$ = 87.5299
$f_5$ = 70.4900
(8) (Ave. C) · $f_w$ = 0.325
(9) $D_2/f_1$ = 0.479
(10) $|r_a|/D_a$ = 0.993
(11) $D_5/f_w$ = 0.337
(12) $f_1/f_t$ = 0.586
(13) $f_3/f_2$ = 1.813
(14) $f_4/f_5$ = 1.242

Working Example 6

Figure 9:
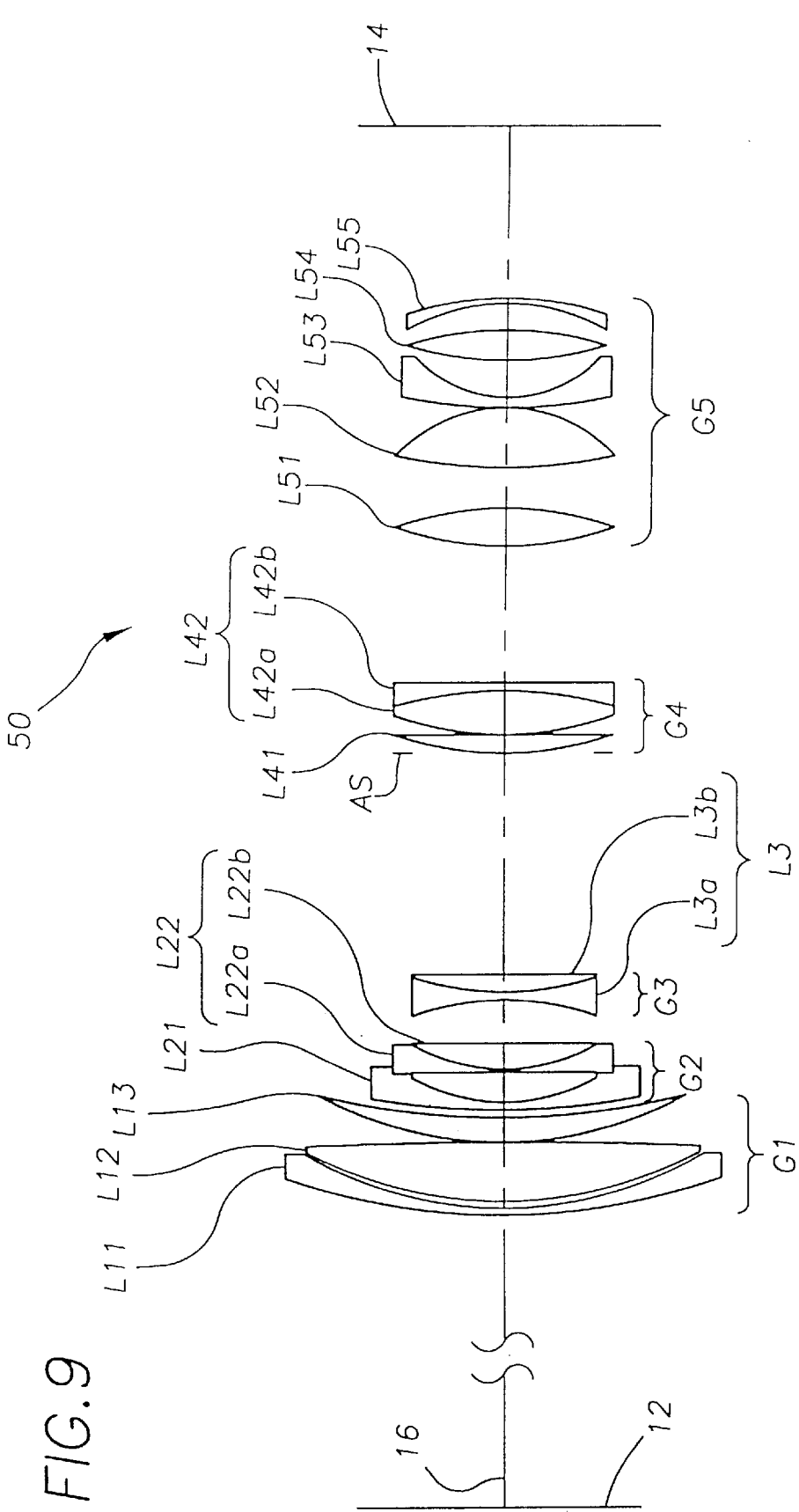
FIG. 9 is an optical diagram of the configuration of the zoom lens according to Working Example 6 of the present invention.

FIG. 9 shows the configuration of a zoom lens 50 according to Working Example 6 of the present invention. Zoom lens 50 has the same basic configuration as zoom lens 40 of FIG. 7 (Working Example 4). Third lens group G3 moves objectwise when focusing at close range.

Tables 6a–d list the design values and design conditions for Working Example 6 of the present invention.

TABLE 6a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 76.39 | 33.30 | 17.00 | 12.33° |
| Aperture Diameter | | 24.86 | 32.02 | 35.50 | 36.28 |

| S | r | d | n | ν |
|---|---|---|---|---|
| 1 | 137.4739 | 1.500 | 1.84666 | 23.83 |
| 2 | 79.7675 | 1.000 | 1.0 | |
| 3 | 78.3732 | 10.800 | 1.60300 | 65.42 |
| 4 | −598.6823 | 0.100 | 1.0 | |
| 5 | 75.4621 | 4.600 | 1.65160 | 58.44 |
| 6 | 146.9455 | (D6) | 1.0 | |
| 7 | 224.7221 | 1.200 | 1.79450 | 45.40 |

TABLE 6a-continued

DESIGN TABLE

| 8 | 31.6589 | 7.100 | 1.0 | |
|---|---|---|---|---|
| 9 | −378.7238 | 0.900 | 1.83500 | 42.97 |
| 10 | 41.4993 | 5.000 | 1.84666 | 23.83 |
| 11 | ∞ | (D11) | 1.0 | |
| 12 | −47.6057 | 1.000 | 1.64850 | 53.03 |
| 13 | 54.3989 | 3.450 | 1.84666 | 23.83 |
| 14 | 290.6579 | (D14) | 1.0 | |
| 15 | ∞ | 0.600 | 1.0 | |
| 16 | 70.4505 | 3.500 | 1.61800 | 63.39 |
| 17 | 907.3141 | 0.100 | 1.0 | |
| 18 | 72.1525 | 7.800 | 1.49782 | 82.52 |
| 19 | −50.1018 | 1.000 | 1.83400 | 37.35 |
| 20 | −294.3438 | (D21) | 1.0 | |

TABLE 6a-continued

DESIGN TABLE

| | | | | |
|---|---|---|---|---|
| 21 | 87.3203 | 3.600 | 1.74330 | 49.23 |
| 22 | −209.5988 | 9.400 | 1.0 | |
| 23 | 97.4086 | 10.100 | 1.49782 | 82.52 |
| 24 | −41.5653 | 0.100 | 1.0 | |
| 25 | 277.9666 | 2.300 | 1.80518 | 25.46 |
| 26 | 30.9389 | 7.250 | 1.0 | |
| 27 | 72.6771 | 4.500 | 1.84666 | 23.83 |
| 28 | −402.4976 | 4.200 | 1.0 | |
| 29 | −45.3072 | 1.000 | 1.83500 | 42.97 |
| 30 | −73.7649 | (Bf) | 1.0 | |

TABLE 6b

ASPHERIC COEFFICIENTS

S7  r = 10.010        $C_4 = 4.50670 \times 10^{-7}$   $C_6 = -1.04410 \times 10^{-9}$
///  $C_8 = 1.67211 \times 10^{-12}$   $C_{10} = -9.73390 \times 10^{-16}$
S21  r = 2.1883        $C_4 = -4.55797 \times 10^{-6}$   $C_6 = -2.02450 \times 10^{-9}$
///  $C_8 = -4.43880 \times 10^{-13}$  $C_{10} = -3.99852 \times 10^{-15}$ TABLE 6c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0000 | 194.0000 |
| D5 | 1.5000 | 25.3244 | 47.6863 | 55.7283 |
| D11 | 6.6289 | 11.5568 | 12.5568 | 13.2952 |
| D14 | 46.3869 | 18.7471 | 7.9119 | 1.7500 |
| D21 | 25.5054 | 9.1361 | 3.5920 | 1.1000 |
| Bf | 38.0000 | 64.4385 | 74.1450 | 76.0749 |
| f | 28.8000 | 70.0000 | 140.0000 | 194.0000 |
| Δ3 | 1.9440 | 1.4647 | 1.9456 | 2.3918 |

TABLE 6d

DESIGN CONDITION VALUES:

$f_1 = 117.2135$
$f_2 = -42.1755$
$f_3 = -77.2760$
$f_4 = 88.1444$
$f_5 = 71.3964$
(8) (Ave. C) · $f_w$ = 0.362
(9) $D_2/f_1$ = 0.475
(10) $|r_a|/D_a$ = 0.936
(11) $D_5/f_w$ = 0.326
(12) $f_1/f_t$ = 0.604
(13) $f_3/f_2$ = 1.832
(14) $f_4/f_5$ = 1.235

In Working Examples 4–6 above, close-range focus can be performed by moving any one of lens groups G1 through G6. Close-range focus can also be performed by moving first lens group G1 in the same manner as done in conventional four-group positive-negative-positive-positive zoom types. However, this approach is not suited for autofocusing since the lens diameter of the focusing lens group tends to be large. In contrast, for the zoom lens of the present invention, third lens group G3 or fourth lens group G4, arranged near of the center of the zoom lens, is well-suited to be the focusing group, since the lens diameter of each of these groups is small.

Working Examples 7–10

Next, Working Examples 7–10 according to the present invention are discussed. With reference to FIG. 10, a zoom lens 55 represents Working Examples 7–10 of the present invention and comprises, objectwise to imagewise, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a negative refractive power. When zooming from the wide-angle state to the telephoto state, at least one lens group among first lens group G1 and fourth lens group G4 moves axially, and second lens group G2 moves imagewise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes. In addition, focusing from an infinite object to a close-range object is performed by axially moving third lens group G3 objectwise.

Working Example 7

Figure 11:
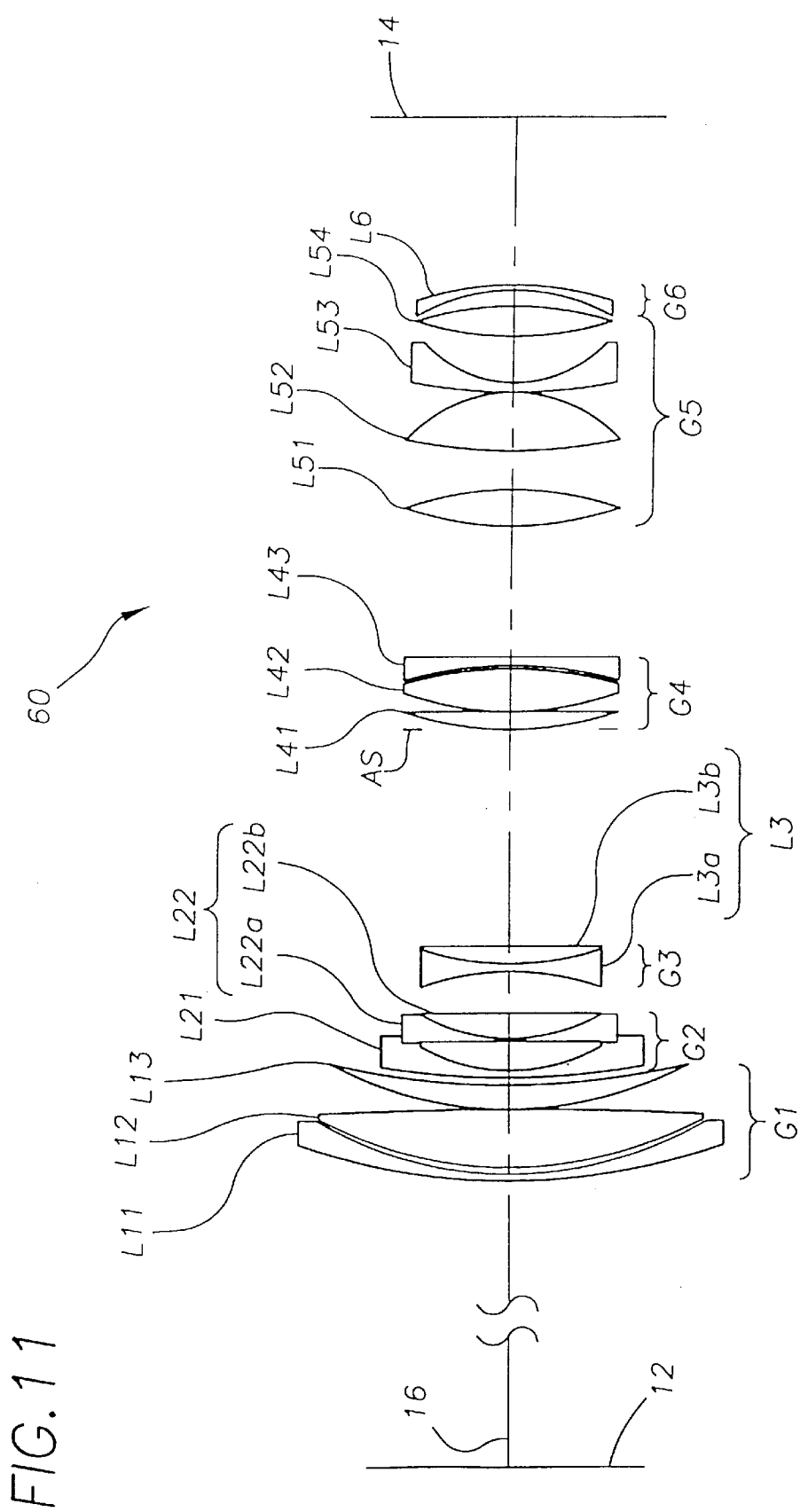
FIG. 11 is an optical diagram of the configuration of the zoom lens according to Working Example 7 of the present invention.

FIG. 11 shows the configuration of a zoom lens 60 according to Working Example 7 of the present invention. Zoom lens 60 has the same basic configuration as zoom lens 20 of FIG. 2 (Working Example 1).

Tables 7a–7d list the design values and design conditions for Working Example 7 of the present invention.

TABLE 7a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 75.65 | 33.15 | 16.95 | 12.22° |
| | Aperture Diameter | 26.00 | 32.24 | 35.22 | 35.40 |

| S | r | d | n | ν |
|---|---|---|---|---|
| 1 | 161.8062 | 1.500 | 1.84666 | 23.83 |
| 2 | 76.7425 | 1.000 | | |
| 3 | 76.9182 | 9.900 | 1.62041 | 60.35 |
| 4 | −1133.1769 | 0.100 | | |
| 5 | 70.9581 | 6.700 | 1.69350 | 53.31 |
| 6 | 253.4789 | (d6 = variable) | | |
| 7 | 1674.5951 | 1.200 | 1.81474 | 37.03 |
| 8 | 30.4350 | 7.750 | | |
| 9 | −200.8124 | 0.900 | 1.83500 | 42.97 |
| 10 | 41.4244 | 5.70() | 1.84666 | 23.83 |
| 11 | −168.3388 | (d11 = variable) | | |
| 12 | −52.6800 | 1.000 | 1.67003 | 47.19 |
| 13 | 42.4871 | 3.800 | 1.84666 | 23.83 |
| 14 | 169.5940 | (d14 = variable) | | |
| 15 | ∞ | 0.700 | Aperture stop | |
| 16 | 61.5342 | 4.900 | 1.49782 | 82.52 |
| 17 | −197.1872 | 0.100 | | |
| 18 | 64.2715 | 5.000 | 1.49782 | 82.52 |

TABLE 7a-continued

DESIGN TABLE

| | | | | |
|---|---|---|---|---|
| 19 | −193.6733 | 1.300 | | |
| 20 | −87.4033 | 0.800 | 1.83400 | 37.35 |
| 21 | −6013.1438 | (d21 = variable) | | |
| 22 | 66.9795 | 4.306 | 1.69680 | 55.48 |
| 23 | −153.7929 | 9.200 | | |
| 24 | 78.6865 | 9.100 | 1.49782 | 82.52 |
| 25 | −41.1071 | 0.100 | | |
| 26 | −160.5423 | 1.000 | 1.32027 | 29.69 |
| 27 | 31.3268 | 6.450 | | |
| 28 | 110.2877 | 4.700 | 1.71736 | 29.50 |
| 29 | −70.1805 | (d29 = variable) | | |
| 30 | −38.0379 | 1.000 | 1.83500 | 42.97 |
| 31 | −59.0360 | (Bf) | | |

TABLE 7b

ASPHERIC COEFFICIENTS

| | | | |
|---|---|---|---|
| S7 | r = 1674.5951 | κ = 5.5228 | $C_4 = +1.23744 \times 10^{-6}$ |
| /// | $C_6 = -7.80256 \times 10^{-10}$ | $C_8 = +4.36329 \times 10^{-13}$ | $C_{10} = -9.00276 \times 10^{-15}$ |
| S22 | r = 66.9795 | κ = 2.3824 | $C_4 = -5.00920 \times 10^{-6}$ |
| /// | $C_6 = -2.89371 \times 10^{-9}$ | $C_8 = +1.16663 \times 10^{-12}$ | $C_{10} = -9.00276 \times 10^{-15}$ |

TABLE 7c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 140.0007 | 194.0017 |
| d6 | 1.5000 | 22.4101 | 40.6790 | 47.9809 |
| d11 | 4.6623 | 5.4954 | 5.4954 | 12.3558 |
| d14 | 48.9055 | 21.7913 | 9.6248 | 1.7500 |
| d21 | 28.7619 | 10.0340 | 2.4570 | 1.0000 |
| d29 | 2.9672 | 4.3268 | 5.0384 | 4.3105 |
| Bf | 38.0002 | 60.7400 | 68.1438 | 69.4049 |
| f | 28.8000 | 70.0000 | 140.0007 | 194.0017 |
| Δ | 1.8086 | 1.5162 | 2.0435 | 2.6518 |

TABLE 7d

DESIGN CONDITION VALUES:

$f_1 = 100.5335$ ($\phi1 = 0.009947$)
$f_2 = -41.1088$ ($\phi2 = -0.024326$)
$f_3 = -73.2715$ ($\phi3 = -0.013648$)
$f_4 = 82.6660$ ($\phi4 = 0.012097$)
$f_5 = 57.2137$ ($\phi5 = 0.017478$)
$f_6 = -130.9127$ ($\phi6 = -0.007639$)
$\phi12_t = -0.00136$
(15) $\phi12_t \cdot f_t = -0.264$
(16) $|f_3|/(f_w \cdot f_t)^{1/2} = 0.980$
(17) $|\phi MAX| \cdot f_t = 4.719$
(18) $|\phi2 + \phi3| \cdot f_w = 1.094$
(19) $|f_3|/f_4 = 0.886$
(20) $f_1/D_{12t} = 2.095$ Working Example 8

Figure 12:
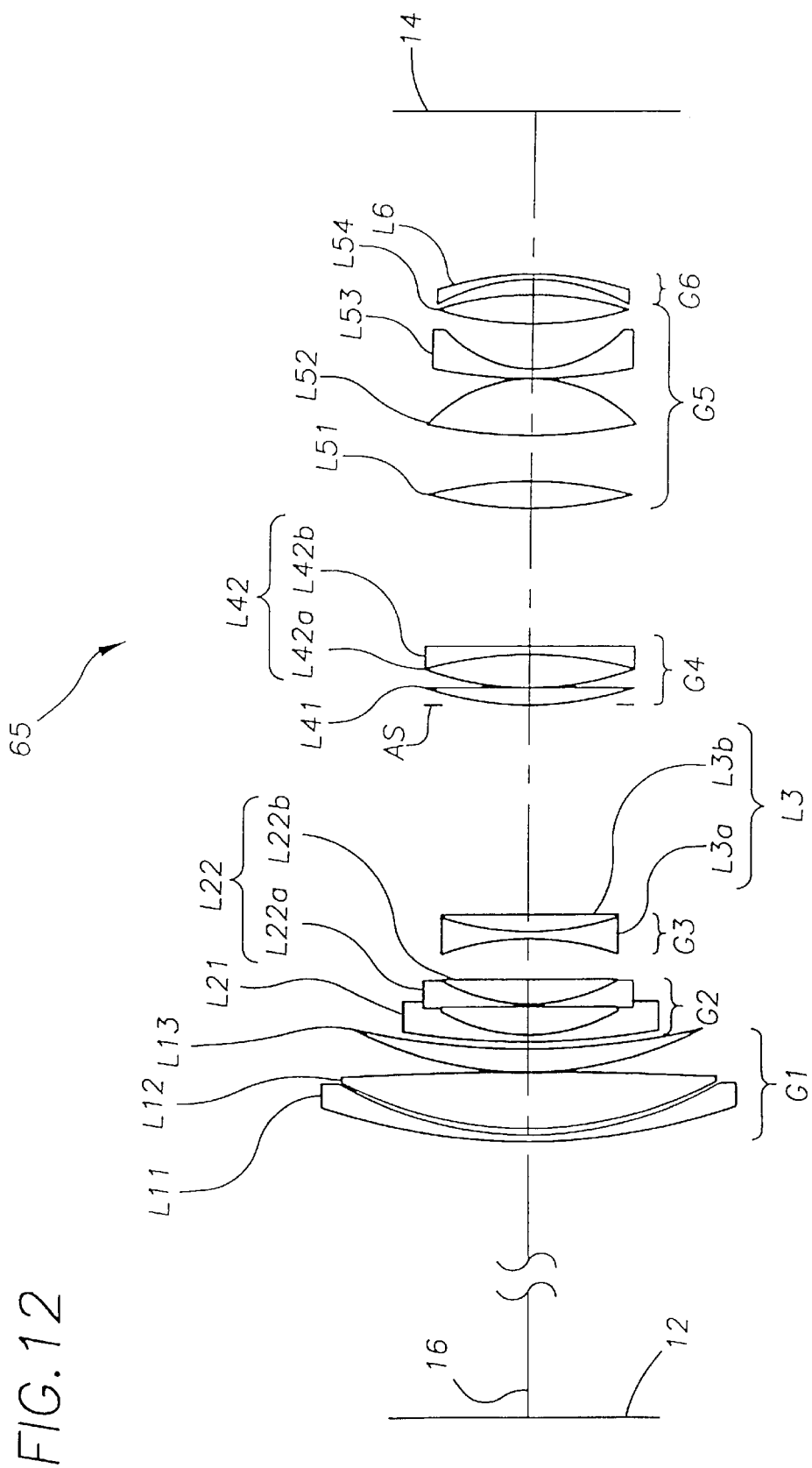
FIG. 12 is an optical diagram of the configuration of the zoom lens according to Working Example 8 of the present invention.

FIG. 12 shows the configuration of the zoom lens 65 according to Working Example 8 of the present invention. Zoom lens 65 has the same basic configuration as zoom lens 50 of FIG. 9 (Working Example 6).

Tables 8a–8d list the design values and design conditions for Working Example 8 of the present invention.

TABLE 8a

DESIGN TABLE

| | | | | |
|---|---|---|---|---|
| f | 28.80 | 70.00 | 140.00 | 194.00 |
| FNO | 2.90 | 2.90 | 2.90 | 2.90 |
| 2ω | 75.41 | 33.05 | 16.88 | 12.24° |
| Aperture Diameter | 25.60 | 31.48 | 33.84 | 35.34 |

TABLE 8a-continued

DESIGN TABLE

| S | r | d | n | ν |
|---|---|---|---|---|
| 1 | 190.4150 | 1.500 | 1.84666 | 23.83 |
| 2 | 85.9379 | 1.000 | | |
| 3 | 84.7483 | 9.800 | 1.62041 | 60.35 |
| 4 | −423.7788 | 0.100 | | |
| 5 | 69.0744 | 6.000 | 1.69680 | 55.48 |
| 6 | 171.7412 | (d6 = variable) | | |
| 7 | 393.1037 | 1.200 | 1.81474 | 37.03 |
| 8 | 31.5103 | 7.750 | | |
| 9 | −160.2839 | 0.900 | 1.83500 | 42.97 |
| 10 | 46.1305 | 5.350 | 1.84666 | 23.83 |
| 11 | −163.1180 | (d11 = variable) | | |
| 12 | −51.0866 | 1.000 | 1.65844 | 50.84 |
| 13 | 44.3577 | 3.550 | 1.84666 | 23.83 |
| 14 | 167.0177 | (d14 = variable) | | |
| 15 | ∞ | 0.700 | Aperture stop | |
| 16 | 65.6168 | 4.100 | 1.49782 | 82.52 |
| 17 | −371.0737 | 0.100 | | |
| 18 | 66.7445 | 6.850 | 1.49782 | 82.52 |
| 19 | −57.3842 | 1.000 | 1.83500 | 42.97 |
| 20 | −904.8357 | (d20 = variable) | | |
| 21 | 79.3307 | 3.350 | 1.74330 | 49.23 |
| 22 | −203.2664 | 9.900 | | |
| 23 | 86.2312 | 9.050 | 1.49782 | 82.52 |
| 24 | −40.8025 | 0.100 | | |
| 25 | 254.6695 | 1.000 | 1.80518 | 25.46 |
| 26 | 29.2625 | 7.050 | | |
| 27 | 106.5051 | 3.400 | 1.84666 | 23.83 |
| 28 | −162.0625 | (d28 = variable) | | |
| 29 | −46.2971 | 1.000 | 1.83500 | 42.97 |
| 30 | −86.4862 | (Bf) | | |

TABLE 8b

ASPHERIC COEFFICIENTS

| | | | |
|---|---|---|---|
| S7 | r = 393.1037 | κ = 11.000 | $C_4 = +7.64647 \times 10^{-7}$ |
| /// | $C_6 = -5.49504 \times 10^{-10}$ | $C_8 = +2.33357 \times 10^{-13}$ | $C_{10} = +1.04457 \times 10^{-16}$ |

TABLE 8b-continued

ASPHERIC COEFFICIENTS

S21  r = 79.3307       κ = 2.2669           $C_4 = -5.18000 \times 10^{-6}$
///  $C_6 = -2.51053 \times 10^{-9}$   $C_8 = -9.16437 \times 10^{-13}$   $C_{10} = -5.29344 \times 10^{-15}$

TABLE 8c

VARIABLE SPACING WHEN VARYING POWER (ZOOMING) FOCUSED ON OBJECT AT ∞

| Lens Position | a | b | c | d |
|---|---|---|---|---|
| f   | 28.7997 | 69.9992 | 139.9987 | 193.9991 |
| d6  | 1.5000  | 23.8936 | 43.5476  | 49.4290  |
| d11 | 4.7922  | 6.9315  | 8.4315   | 11.5431  |
| d14 | 50.0388 | 21.8953 | 9.3535   | 1.7500   |
| d20 | 31.0173 | 11.5624 | 4.5146   | 1.4000   |
| d28 | 3.4633  | 4.3268  | 4.8912   | 4.1799   |
| Bf  | 37.9997 | 59.9569 | 65.9685  | 70.9484  |
| f   | 28.7997 | 69.9992 | 139.9987 | 193.9991 |
| Δ   | 1.9015  | 1.6078  | 2.2920   | 2.6695   |

TABLE 8d

DESIGN CONDITION VALUES:

$f_1 = 104.4695$ (φ1 = 0.009572)
$f_2 = -43.5791$ (φ2 = -0.022947)
$f_3 = -72.4370$ (φ3 = -0.013805)
$f_4 = 85.3736$ (φ4 = 0.011713)
$f_5 = 55.8498$ (φ5 = 0.017905)
$f_6 = -120.6842$ (φ6 = -0.008286)
$φ12_t = -0.001226$
(15) $φ12_t \cdot f_t = -0.238$
(16) $|f_3|/(f_w \cdot f_t)^{1/2} = 0.969$
(17) $|φMAX| \cdot f_t = 4.452$
(18) $|φ2 + φ3| \cdot f_w = 1.058$
(19) $|f_3|/f_4 = 0.848$
(20) $f_1/D_{12t} = 2.033$

Working Example 9

FIG. 12 shows the configuration of a zoom lens 65 according to Working Example 9 of the present invention. Zoom lens 65 has the same basic configuration as zoom lens 25 of FIG. 4 (Working Example 2).

In Working Example 9, when zooming from the wide-angle state to the telephoto state, first lens group G1 first moves imagewise and then moves objectwise, second lens group G2 and third lens group G3 move imagewise, and fifth lens group G5 and sixth lens group G6 move objectwise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 first increases and then decreases. However, fourth lens group G4 is fixed along the optical axis. In addition, an aperture stop AS is located adjacent fourth lens group G4 between third lens group G3 and fourth lens group G4. The aperture stop diameter increases when zooming from the wide-angle state to the telephoto state, although it is fixed along the optical axis together with fourth lens group G4.

Tables 9a–d lists the design values and design conditions for Working Example 9 of the present invention.

TABLE 9a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 75.59 | 33.05 | 16.92 | 12.25° |
| | Aperture Diameter | 26.13 | 31.58 | 34.60 | 35.78 |

| S | r | d | n | ν |
|---|---|---|---|---|
| 1  | 176.1773  | 1.500         | 1.84666 | 23.83 |
| 2  | 81.5336   | 1.000         |         |       |
| 3  | 80.8687   | 10.500        | 1.62041 | 60.35 |
| 4  | -557.5412 | 0.100         |         |       |
| 5  | 68.7958   | 6.456         | 1.69680 | 55.48 |
| 6  | 199.5057  | (d6 = variable) |       |       |
| 7  | 637.6892  | 1.200         | 1.81474 | 37.03 |
| 8  | 31.2514   | 7.950         |         |       |
| 9  | -144.5846 | 0.900         | 1.83500 | 42.97 |
| 10 | 48.1839   | 5.300         | 1.84666 | 23.83 |
| 11 | -163.1988 | (d11 = variable) |     |       |
| 12 | -49.7238  | 1.000         | 1.62280 | 56.93 |
| 13 | 48.0796   | 3.300         | 1.84666 | 23.83 |
| 14 | 161.0550  | (d14 = variable) |     |       |
| 15 | ∞         | 0.700         | Aperture stop | |
| 16 | 68.3778   | 4.000         | 1.49782 | 82.52 |
| 17 | -427.0582 | 0.100         |         |       |
| 18 | 77.6111   | 6.950         | 1.49782 | 82.52 |
| 19 | -52.1300  | 1.000         | 1.83500 | 42.97 |
| 20 | -232.3430 | (d20 = variable) |     |       |
| 21 | 61.6060   | 4.500         | 1.65160 | 58.44 |
| 22 | -243.7490 | 7.700         |         |       |
| 23 | 65.9685   | 12.000        | 1.49782 | 82.52 |
| 24 | -42.5379  | 0.100         |         |       |
| 25 | -156.0129 | 1.000         | 1.80610 | 33.27 |
| 26 | 30.7964   | 5.000         |         |       |
| 27 | 110.4314  | 4.550         | 1.74950 | 35.04 |
| 28 | -72.1558  | (d28 = variable) |     |       |
| 29 | -38.2808  | 1.000         | 1.83500 | 42.97 |
| 30 | -62.4862  | (Bf)          |         |       |

TABLE 9b

ASPHERIC COEFFICIENTS

S7   r = 637.6892      κ = 7.4504           $C_4 = +9.60240 \times 10^{-7}$
///  $C_6 = -7.93770 \times 10^{-10}$   $C_8 = +7.86450 \times 10^{-13}$   $C_{10} = -8.16590 \times 10^{-16}$
S21  r = 61.6060       κ = 1.6361           $C_4 = -4.14690 \times 10^{-6}$
///  $C_6 = <2.58840 \times 10^{-9}$    $C_8 = +5.30380 \times 10^{-13}$   $C_{10} = -8.16590 \times 10^{-15}$ TABLE 9c

VARIABLE SPACING WHEN VARYING POWER (ZOOMING) FOCUSED ON OBJECT AT ∞

| Lens Position | a | b | c | d |
|---|---|---|---|---|
| f | 28.8000 | 69.9995 | 139.9986 | 193.9967 |
| d6 | 1.5000 | 23.6870 | 40.9809 | 46.9308 |
| d11 | 5.8385 | 7.3082 | 8.3922 | 11.7638 |
| d14 | 50.3627 | 22.5670 | 9.4694 | 1.7500 |
| d20 | 35.6896 | 13.1134 | 4.6612 | 1.4000 |
| d28 | 3.0657 | 4.3377 | 4.8016 | 4.3599 |
| Bf | 37.9997 | 59.3036 | 67.2917 | 70.9942 |
| f | 28.8000 | 69.9995 | 139.9986 | 193.9967 |
| Δ | 1.8781 | 1.6698 | 2.2143 | 2.6314 |

TABLE 9d

DESIGN CONDITION VALUES:

$f_1 = 100.2638$ ($\phi_1 = 0.009974$)
$f_2 = 40.5974$ ($\phi_2 = -0.024632$)
$f_3 = -75.7326$ ($\phi_3 = -0.013204$)
$f_4 = 82.8560$ ($\phi_4 = 0.012069$)
$f_5 = 57.7304$ ($\phi_5 = 0.017322$)
$f_6 = -120.6169$ ($\phi_6 = -0.008291$)
$\phi 12_t = -0.001563$
(15) $\phi 12_t \cdot f_t = -0.303$
(16) $|f_3|/(f_w \cdot f_t)^{1/2} = 1.013$
(17) $|\phi MAX| \cdot f_t = 4.779$
(18) $|\phi 2 + \phi 3| \cdot f_w = 1.090$
(19) $|f_3|/f_4 = 0.914$
(20) $f_1/D_{12t} = 2.136$ Working Example 10

Figure 13:
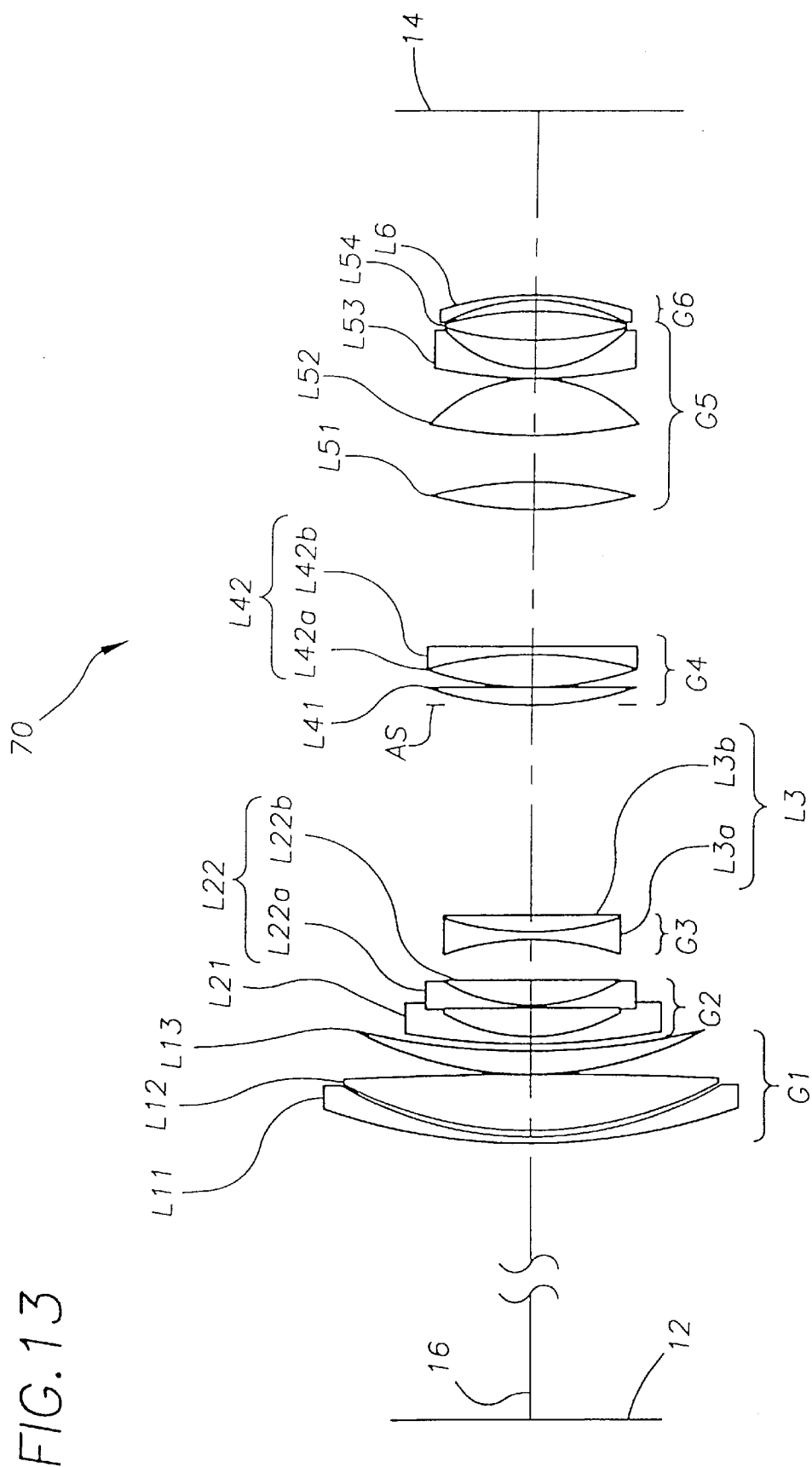
FIG. 13 is an optical diagram of the configuration of the zoom lens according to Working Example 9 of the present invention.

FIG. 13 shows the configuration of a zoom lens 70 according to Working Example 10 of the present invention. Zoom lens 70 has the same basic configuration as zoom lens 65 of FIG. 12 (Working Example 9).

Tables 10a–d list the design values and design conditions for Working Example 10 of the present invention.

TABLE 10a

DESIGN TABLE

| f | 28.80 | 70.00 | 140.00 | 194.00 |
|---|---|---|---|---|
| FNO | 2.90 | 2.90 | 2.90 | 2.90 |
| 2ω | 75.48 | 33.05 | 16.91 | 12.25° |
| Aperture Diameter | 25.22 | 30.72 | 33.30 | 34.28 |

| S | r | d | n | ν |
|---|---|---|---|---|
| 1 | 156.9863 | 1.500 | 1.84666 | 23.83 |
| 2 | 81.6688 | 1.000 | | |
| 3 | 79.9629 | 10.950 | 1.60300 | 65.42 |
| 4 | -557.6591 | 0.100 | | |
| 5 | 71.5456 | 5.950 | 1.69680 | 55.48 |
| 6 | 171.3790 | (d6 = variable) | | |
| 7 | 392.9948 | 1.200 | 1.79450 | 45.50 |
| 8 | 30.9447 | 7.100 | | |
| 9 | -1455.4522 | 0.900 | 1.83500 | 42.97 |
| 10 | 49.2595 | 4.400 | 1.84666 | 23.83 |
| 11 | ∞ | (d11 = variable) | | |
| 12 | -48.0862 | 1.000 | 1.63854 | 55.48 |
| 13 | 44.6394 | 3.500 | 1.84666 | 23.83 |
| 14 | 155.2173 | (d14 = variable) | | |
| 15 | ∞ | 0.700 | Aperture stop | |
| 16 | 60.8264 | 4.500 | 1.49782 | 82.52 |
| 17 | -272.3116 | 0.100 | | |
| 18 | 65.4497 | 7.150 | 1.49782 | 82.52 |
| 19 | -52.1048 | 1.000 | 1.83500 | 42.97 |
| 20 | -1055.9683 | (d20 = variable) | | |
| 21 | 71.2343 | 3.550 | 1.69680 | 55.48 |
| 22 | -210.7443 | 9.100 | | |
| 23 | 81.1307 | 9.000 | 1.49782 | 82.52 |
| 24 | -38.8014 | 0.100 | | |
| 25 | -173.2366 | 1.000 | 1.71736 | 29.50 |
| 26 | 30.4812 | 5.900 | | |
| 27 | 104.6971 | 4.100 | 1.75520 | 27.53 |
| 28 | -91.7624 | (d28 = variable) | | |
| 29 | -37.8613 | 1.000 | 1.83500 | 42.97 |
| 30 | -59.9719 | (Bf) | | |

TABLE 10b

ASPHERIC COEFFICIENTS

S7   r = 392.9948   κ = 5.4783   $C_4 = +8.97960 \times 10^{-7}$
///   $C_6 = -1.20390 \times 10^{-9}$   $C_8 = +1.97840 \times 10^{-12}$   $C_{10} = -1.25910 \times 10^{-16}$
S21   r = 71.2343   κ = 0.8801   $C_4 = -4.71710 \times 10^{-6}$
///   $C_6 = -2.87190 \times 10^{-9}$   $C_8 = -9.24030 \times 10^{-13}$   $C_{10} = -9.84880 \times 10^{-15}$ TABLE 10c

VARIABLE SPACING WHEN VARYING POWER (ZOOMING) FOCUSED ON OBJECT AT ∞

| Lens Position | a | b | c | d |
|---|---|---|---|---|
| f | 28.8000 | 69.9996 | 139.9988 | 193.9984 |
| d6 | 1.5000 | 24.9218 | 44.0987 | 50.5007 |
| d11 | 6.1351 | 8.2820 | 9.2820 | 12.4744 |
| d14 | 47.5617 | 21.0223 | 9.0376 | 1.7500 |
| d20 | 28.5968 | 10.7612 | 3.8044 | 1.1000 |
| d28 | 3.5114 | 4.7114 | 5.0392 | 4.6703 |
| f | 28.8000 | 69.9996 | 139.9988 | 193.9984 |
| Δ | 1.8016 | 1.5658 | 2.1628 | 2.6060 |

TABLE 10d

DESIGN CONDITION VALUES:

$f_1 = 105.9365$ ($\phi_1 = 0.009440$)
$f_2 = -41.6516$ ($\phi_2 = -0.024009$)
$f_3 = -70.5885$ ($\phi_3 = -0.014167$)
$f_4 = 79.2135$ ($\phi_4 = 0.012624$)
$f_5 = 55.6390$ ($\phi_5 = 0.017973$)
$f_6 = -125.5708$ ($\phi_6 = -0.007964$)
$\phi12_t = -0.001407$
(15) $\phi12_t \cdot f_t = -0.273$
(16) $|f_3|/(f_w \cdot f_t)^{1/2} = 0.944$
(17) $|\phi MAX| \cdot f_t = 4.658$
(18) $|\phi_2 + \phi_3| \cdot f_w = 1.099$
(19) $|f_3|/f_4 = 0.891$
(20) $f_1/D_{12t} = 2.098$

WORKING EXAMPLES 11–13

Next, Working Examples 11–13 according to the present invention are discussed. With reference to FIG. 15*a*, zoom lens 80 represents Working Examples 11–13 and comprises, objectwise to imagewise, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. When zooming from the wide-angle state to the telephoto state, at least second lens group G2 and third lens group G3 move imagewise, and fifth lens group G5 moves objectwise such that the air space between first lens group G1 and second lens group G2 increases, the air space between second lens group G2 and third lens group G3 increases, the air space between third lens group G3 and fourth lens group G4 decreases, and the air space between fourth lens group G4 and fifth lens group G5 decreases.

Working Example 11

Figure 14:
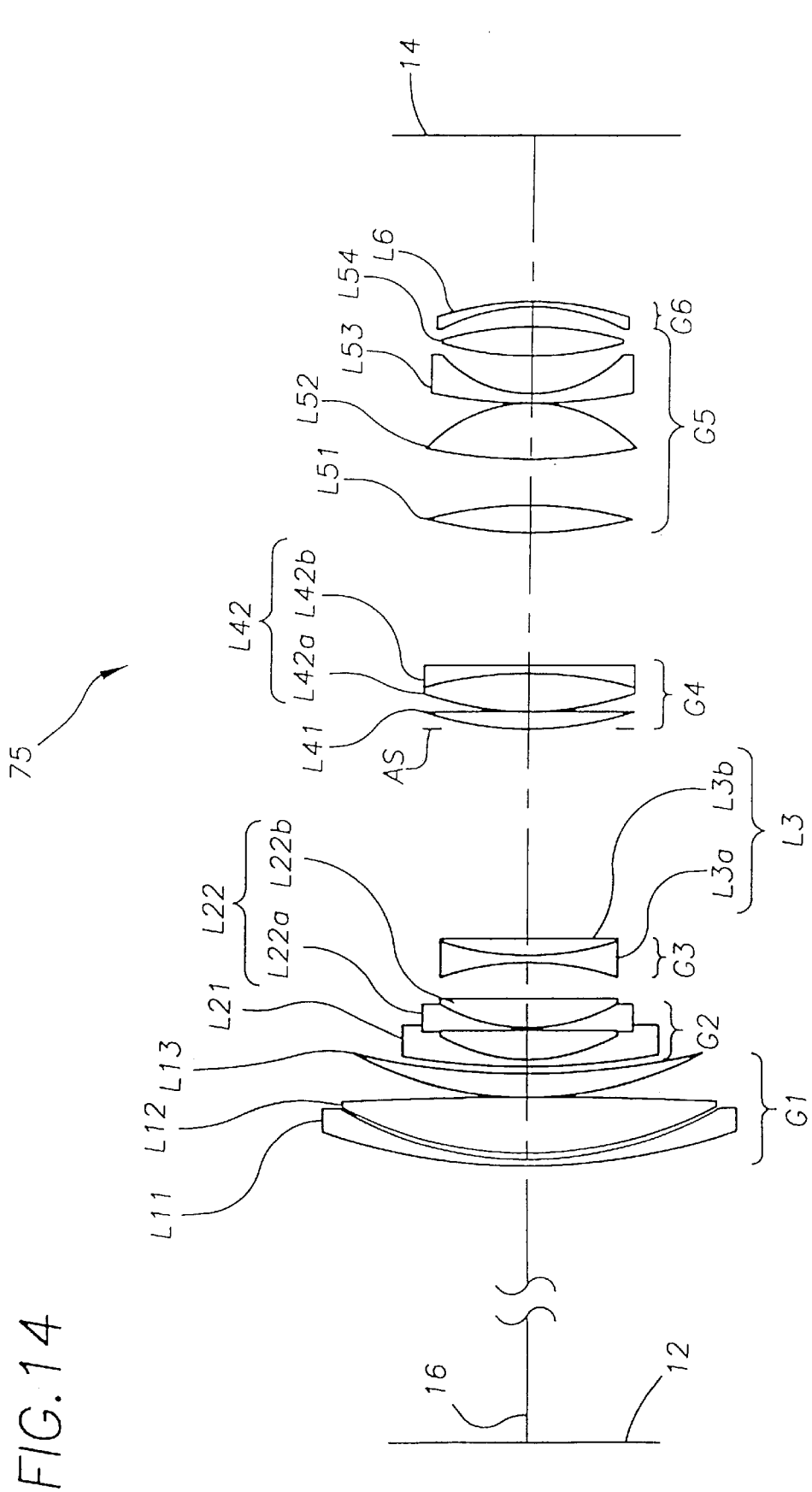
FIG. 14 is an optical diagram of the configuration of the zoom lens according to Working Example 10 of the present invention.
Figure 16:
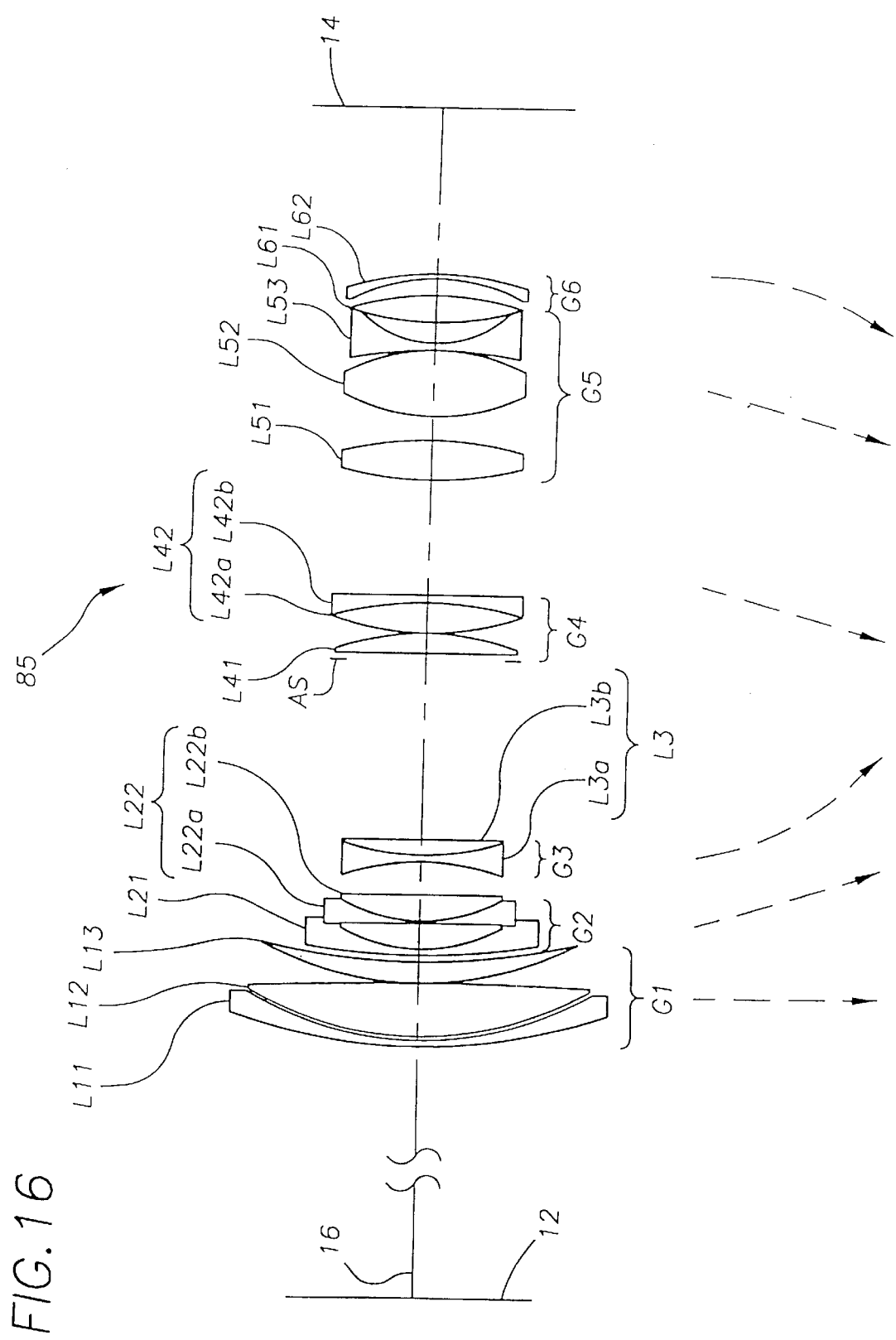
FIG. 16 is an optical diagram of the configuration of the zoom lens according to Working Example 11 of the present invention, with dashed arrows depicting the axial movement of the lens groups when zooming.

FIG. 16 shows the configuration of a zoom lens 85 according to Working Example 11 of the present invention. Zoom lens 85 has the same basic configuration as zoom lens 75 of FIG. 14 (Working Example 10), except that lens L22 is biconcave, and the objectwise surface of lens L41 is substantially more planar (i.e., has a larger radius of curvature).

In Working Example 11, when zooming from the wide-angle state to the telephoto state, second lens group G2 and third lens group G3 move imagewise, and fourth lens group G4, fifth lens group G5, and sixth lens group G6 move objectwise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes. In addition, first lens group G1 is fixed along the optical axis. An aperture stop AS is located between third lens group G3 and fourth lens group G4, and moves together with fourth lens group G4. The aperture stop diameter increases as the lens positional state changes from the wide-angle state to the telephoto state. Third lens group G3 moves objectwise when focusing at close range.

Tables 11a–d list the design values and design conditions for Working Example 11 according to the present invention.

TABLE 11a

DESIGN TABLE

| f | 28.80 | 70.00 | 140.00 | 194.00 |
|---|---|---|---|---|
| FNO | 2.88 | 2.88 | 2.88 | 2.88 |
| 2ω | 76.38 | 33.30 | 17.08 | 12.34° |
| Aperture Diameter | 25.96 | 32.48 | 36.02 | 37.50 |

| S | r | d | n | ν |
|---|---|---|---|---|
| 1 | 138.3891 | 1.50 | 1.92286 | 20.88 |
| 2 | 75.4719 | 1.00 | 1.0 | |
| 3 | 76.2996 | 11.30 | 1.59318 | 67.87 |
| 4 | −818.7692 | 0.10 | 1.0 | |
| 5 | 69.2981 | 7.10 | 1.74330 | 49.23 |
| 6 | 262.9790 | (D6) | 1.0 | |
| 7 | 854.9644 | 1.20 | 1.81474 | 37.03 |
| 8 | 32.9128 | 7.60 | 1.0 | |
| 9 | −130.4347 | 0.90 | 1.80420 | 46.51 |
| 10 | 37.5987 | 5.35 | 1.92286 | 20.88 |
| 11 | −1383.3263 | (D11) | 1.0 | |
| 12 | −50.5204 | 1.00 | 1.74330 | 49.23 |
| 13 | 93.7485 | 2.60 | 1.92286 | 20.88 |
| 14 | 894.4541 | (D14) | 1.0 | |
| 15 | 00 | 0.70 | 1.0 | |
| 16 | 2286.6278 | 3.20 | 1.62041 | 60.35 |
| 17 | −88.1322 | 0.10 | 1.0 | |
| 18 | 48.7611 | 9.90 | 1.49782 | 82.52 |
| 19 | −51.1368 | 1.00 | 1.83400 | 37*35 |
| 20 | −1041.6389 | (D20) | 1.0 | |
| 21 | 82.4183 | 8.70 | 1.72000 | 50.35 |
| 22 | −123.0703 | 3.80 | 1.0 | |
| 23 | 69.0366 | 12.00 | 1.59318 | 67.87 |
| 24 | −52.0987 | 0.10 | 1.0 | |
| 25 | −104.4301 | 1.85 | 1.83400 | 37.35 |
| 26 | 33.8911 | (D26) | 1.0 | |
| 27 | 134.9880 | 4.75 | 1.71700 | 47.99 |
| 28 | −77.2825 | 3.05 | 1.0 | |
| 29 | −45.9111 | 1.00 | 1.83500 | 42.97 |
| 30 | −71.0022 | (Bf) | 1.0 | |

TABLE 11b

ASPHERIC COEFFICIENTS

S7  r = −9.0000      $C_4 = +8.0005 \times 10^{-7}$    $C_6 = -4.4310 \times 10^{-10}$
///  $C_8 = +1.0014 \times 10^{-12}$  $C_{10} = -6.3906 \times 10^{-16}$
S21  r = 1.4831      $C_4 = -2.9199 \times 10^{-6}$    $C_6 = -1.3176 \times 10^{-9}$
///  $C_8 = +3.8082 \times 10^{-13}$  $C_{10} = -3.2978 \times 10^{-15}$

TABLE 11c

VARIABLE SPACING WHEN VARYING POWER (ZOOMING) FOCUSED ON OBJECT AT ∞

| Lens Position | a | b | c | d |
|---|---|---|---|---|
| f | 28.7999 | 69.9996 | 139.9990 | 193.9985 |
| D6 | 1.2505 | 21.2320 | 35.1368 | 40.0476 |

TABLE 11c-continued

VARIABLE SPACING WHEN VARYING POWER (ZOOMING) FOCUSED ON OBJECT AT ∞

| Lens Position | a | b | c | d |
|---|---|---|---|---|
| D11 | 6.2635 | 10.4036 | 11.0036 | 14.3539 |
| D14 | 49.8206 | 24.5159 | 10.0611 | 1.7500 |
| D20 | 40.0191 | 10.1516 | 2.3489 | 1.6000 |
| D26 | 4.2505 | 18.7866 | 11.0495 | 4.4293 |
| Bf | 37.9996 | 54.5639 | 70.1035 | 77.4725 |
| f | 28.8000 | 70.00000 | 140.0000 | 194.0000 |
| Δ3 | 1.8415 | 1.6188 | 1.9912 | 2.2570 |

TABLE 11d

DESIGN CONDITION VALUES:

$f_1 = 91.5599$
$f_2 = -37.8208$
$f_3 = -72.2560$
$f_5 = 139.0502$
$f_6 = 118.7562$
(21) $f_5/f_6 = 1.171$
(22) $D_1/(f_t - f_w) = 0$
(23) $D_2/(f_w \cdot f_t)^{1/2} = 0.519$
(24) $D_5/(f_w \cdot f_t)^{1/2} = 0.530$
(25) $\Delta 2/(|f_2| + |f_3|) = 0.073$
(26) $f_1/(f_w \cdot f_t)^{1/2} = 1.225$
(27) $M_1/M_4 = 1.726$ Working Example 12

Figure 17:
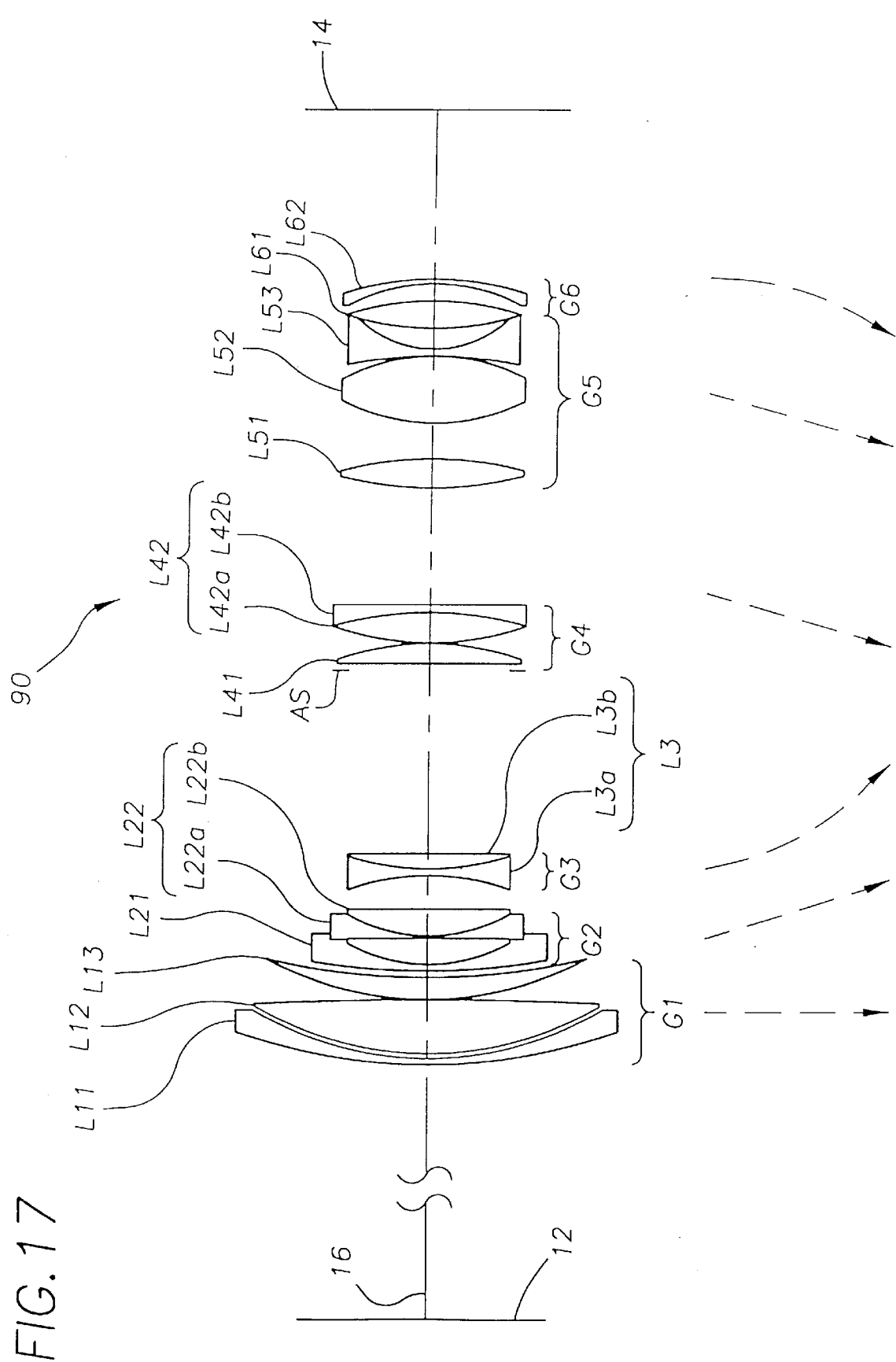
FIG. 17 is an optical diagram of the configuration of the zoom lens according to Working Example 12 of the present invention, with dashed arrows depicting the axial movement of the lens groups when zooming.

FIG. 17 shows the configuration of a zoom lens 90 according to Working Example 12 of the present invention. Zoom lens 90 has the same basic configuration as zoom lens 85 of FIG. 16 (Working Example 11).

In Working Example 12, when zooming from the wide-angle state to the telephoto state, first lens group G1 and fourth lens group G4 are fixed axially, second lens group G2 and third lens group G3 move imagewise such that the air space between the second and third lens groups increases, fifth lens group G5 moves objectwise, and sixth lens group G6 moves objectwise along a zoom trajectory that differs from fifth lens group G5. An aperture stop AS is located between third lens group G3 and fourth lens group G4. When zooming from the wide-angle state to the telephoto state, the aperture stop diameter increases, although it is fixed with respect to the optical axis. Third lens group G3 moves objectwise when focusing at close range.

Tables 12a–d list the design values and design conditions for Working Example 12 according to the present invention.

TABLE 12a

DESIGN TABLE

| f | 28.80 | 70.00 | 140.00 | 194.00 |
|---|---|---|---|---|
| FNO | 2.88 | 2.88 | 2.88 | 2.88 |
| 2ω | 76.40 | 33.31 | 17.08 | 12.33° |
| Aperture Diameter | 25.66 | 32.42 | 36.22 | 37.68 |

| S | r | d | n | ν |
|---|---|---|---|---|
| 1 | 144.3739 | 1.50 | 1.92286 | 20.88 |
| 2 | 76.4298 | 1.00 | 1.0 | |
| 3 | 77.6169 | 11.25 | 1.59318 | 67.87 |
| 4 | -758.9875 | 0.10 | 1.0 | |
| 5 | 68.2287 | 7.20 | 1.74330 | 49.23 |
| 6 | 261.7709 | (D6) | 1.0 | |
| 7 | 766.3932 | 1.20 | 1.81474 | 37.03 |
| 8 | 32.5037 | 7.70 | 1.0 | |
| 9 | -127.6918 | 0.90 | 1.80420 | 46.51 |
| 10 | 37.3748 | 5.50 | 1.92286 | 20.88 |
| 11 | -723.9893 | (D11) | 1.0 | |
| 12 | -49.1806 | 1.00 | 1.74330 | 49.23 |
| 13 | 100.7266 | 2.55 | 1.92286 | 20.88 |
| 14 | 1613.0980 | (D14) | 1.0 | |
| 15 | ∞ | 0.70 | 1.0 | |
| 16 | 937.6925 | 3.35 | 1.62041 | 60.35 |
| 17 | -88.4816 | 0.10 | 1.0 | |
| 18 | 50.2171 | 9.80 | 1.49782 | 82.52 |
| 19 | -50.5734 | 1.00 | 1.83400 | 37.35 |
| 20 | -4649.7697 | (D20) | 1.0 | |
| 21 | 89.6907 | 5.70 | 1.72000 | 50.35 |
| 22 | -115.3692 | 5.35 | | |
| 23 | 71.8816 | 12.00 | 1.59318 | 67.87 |
| 24 | -50.3051 | 0.10 | 1.0 | |
| 25 | -104.4284 | 4.00 | 1.83400 | 37.35 |
| 26 | 34.2193 | (D26) | 1.0 | |
| 27 | 127.2351 | 4.85 | 1.71700 | 47.99 |
| 28 | -74.6444 | 3.00 | 1.0 | |
| 29 | -45.5316 | 1.00 | 1.83500 | 42.97 |
| 30 | -72.1972 | (Bf) | 1.0 | |

TABLE 12b

ASPHERIC COEFFICIENTS

S7  $r = -9.0000$   $C_4 = +8.4027 \times 10^{-7}$   $C_6 = -3.6910 \times 10^{-10}$
///  $C_8 = +8.1779 \times 10^{-13}$   $C_{10} = -5.1312 \times 10^{-16}$
S21  $r = 1.4956$   $C_4 = -2.9113 \times 10^{-6}$   $C_6 = -1.4238 \times 10^{-9}$
///  $C_8 = +7.2661 \times 10^{-13}$   $C_{10} = -3.7414 \times 10^{-15}$ TABLE 12c

VARIABLE SPACING WHEN VARYING POWER (ZOOMING) FOCUSED ON OBJECT AT ∞

| Lens Position | a | b | c | d |
|---|---|---|---|---|
| f | 28.8047 | 69.9996 | 139.9990 | 193.9965 |
| D6 | 1.2000 | 21.3652 | 35.1808 | 40.1525 |
| D11 | 6.3168 | 10.3779 | 10.9779 | 14.2604 |
| D14 | 48.6945 | 24.4182 | 10.0532 | 1.7500 |
| D20 | 39.3624 | 9.9075 | 2.1357 | 1.6000 |
| D26 | 4.1192 | 17.6429 | 10.0228 | 3.4848 |
| Bf | 37.9980 | 53.9298 | 69.3209 | 76.3935 |
| f | 28.8000 | 70.0000 | 140.0000 | 194.0000 |
| Δ3 | 1.8393 | 1.6295 | 1.9870 | 2.2635 |

TABLE 12d

DESIGN CONDITION VALUES:

$f_1 = 91.7667$
$f_2 = -38.4566$
$f_3 = -71.9282$
$f_4 = 84.4339$
$f_5 = 128.7246$
$f_6 = 114.3856$
(21) $f_5/f_6 = 1.125$
(22) $D_1/(f_t - f_w) = 0$
(23) $D_2/(f_w \cdot f_t)^{1/2} = 0.521$
(24) $D_5/(f_w \cdot f_t)^{1/2} = 0.628$
(25) $\Delta 2/(|f_2| + |f_3|) = 0.072$
(26) $f_1/(f_w \cdot f_t)^{1/2} = 1.228$
(27) $M_1/M_4 = 1.747$ Working Example 13

Figure 18:
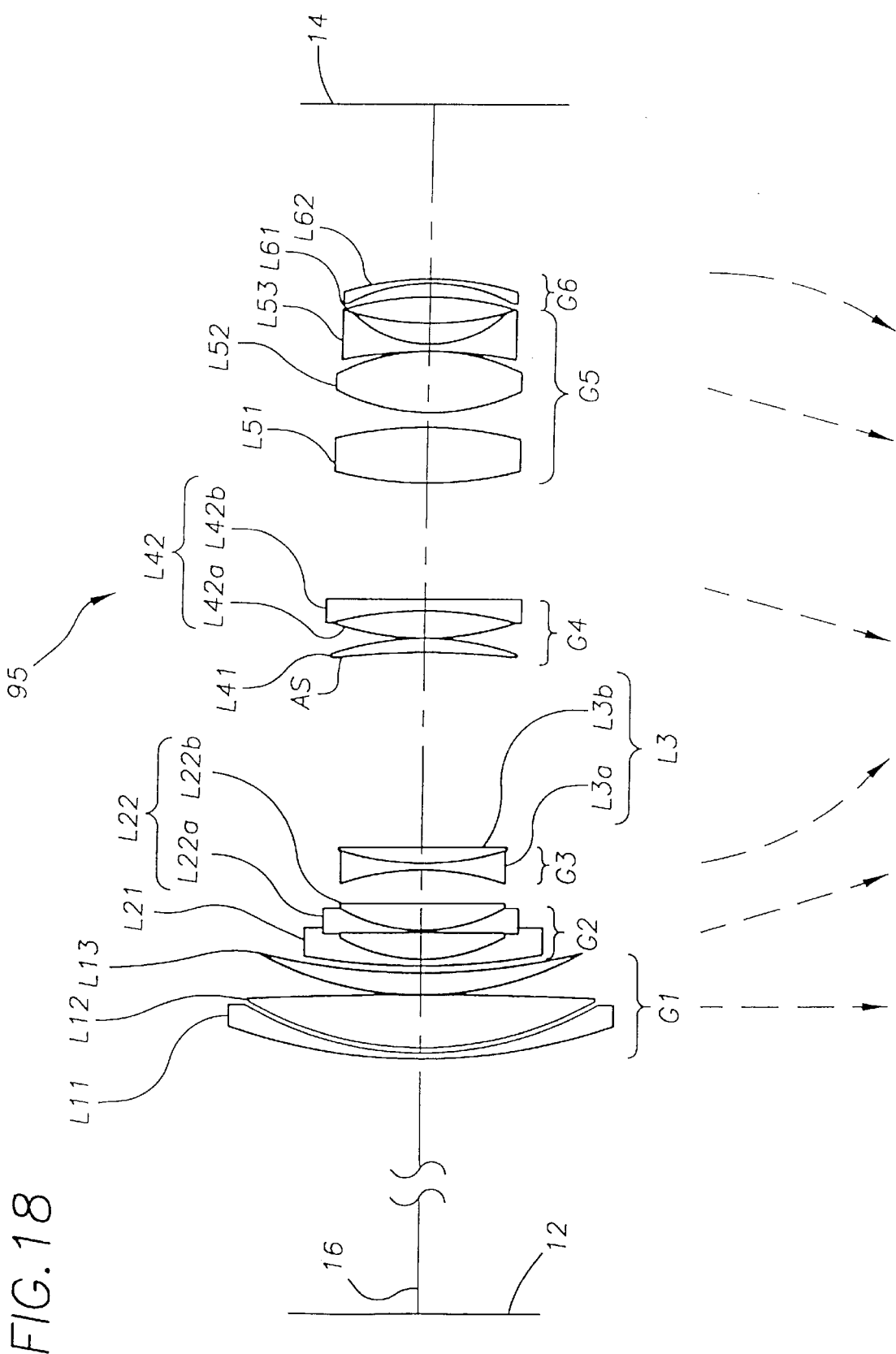
FIG. 18 is an optical diagram of the configuration of the zoom lens according to Working Example 13 of the present invention, with dashed arrows depicting the axial movement of the lens groups when zooming.

FIG. 18 shows the configuration of a zoom lens as according to Working Example 13 of the present invention. Zoom lens 95 has the same general configuration as zoom lens 90 of FIG. 77 (Working Example 12), except that lens L41 is a positive meniscus lens having an objectwise concave surface.

In Working Example 13, when zooming from the wide-angle state to the telephoto state, first lens group G1 moves objectwise, second lens group G2 and third lens group G3 move imagewise, and fifth lens group G5 and sixth lens group G6 move objectwise such that the air space between first lens group G1 and second lens group G2 increases, the air space between second lens group G2 and third lens group G3 increases, the air space between third lens group G3 and fourth lens group G4 decreases, the air space between fourth lens group G4 and fifth lens group G5 decreases, and the air space between fifth lens group G5 and sixth lens group G6 changes. Also, when zooming from the wide-angle state to the telephoto state, fourth lens group G4 is fixed with respect to the optical axis. An aperture stop AS is located between third lens group G3 and fourth lens group G4. When zooming from the wide-angle state to the telephoto state, the aperture stop diameter increases, although it is fixed with respect to the optical axis. Third lens group G3 moves objectwise when focusing at close range.

Tables 13a–d below list the design values and design conditions for Working Example 13 according to the present invention.

TABLE 13a

DESIGN TABLE

| f | 28.80 | 70.00 | 140.00 | 194.00 |
|---|---|---|---|---|
| FNO | 2.88 | 2.88 | 2.88 | 2.88 |
| 2ω | 76.23 | 33.37 | 17.02 | 12.31° |
| Aperture Diameter | 25.26 | 32.12 | 35.98 | 37.48 |

TABLE 13a-continued

DESIGN TABLE

| S | r | d | n | ν |
|---|---|---|---|---|
| 1 | 193.2709 | 1.50 | 1.84666 | 23.83 |
| 2 | 89.8483 | 1.00 | 1.0 | |
| 3 | 88.6175 | 10.80 | 1.60300 | 65.42 |
| 4 | −340.0238 | 0.10 | 1.0 | |
| 5 | 73.7095 | 5.20 | 1.71300 | 53.93 |
| 6 | 153.6693 | (D6) | 1.0 | |
| 7 | 277.6968 | 1.20 | 1.79668 | 45.37 |
| 8 | 34.1275 | 7.40 | 1.0 | |
| 9 | −162.7658 | 0.90 | 1.77250 | 49.61 |
| 10 | 38.8612 | 5.30 | 1.84666 | 23.83 |
| 11 | ∞ | (D11) | 1.0 | |
| 12 | −46.0766 | 1.00 | 1.65160 | 58.44 |
| 13 | 90.6302 | 2.80 | 1.84666 | 23.83 |
| 14 | 1186.5200 | (D14) | 1.0 | |
| 15 | ∞ | 0.72 | 1.0 | |
| 16 | −321.4315 | 2.25 | 1.59318 | 67.87 |
| 17 | −98.7415 | 0.10 | 1.0 | |
| 18 | 61.1386 | 9.20 | 1.59318 | 67.87 |
| 19 | −42.5094 | 1.00 | 1.83400 | 37.35 |
| 20 | −296.1661 | (D20) | 1.0 | |
| 21 | 85.1944 | 12.15 | 1.71300 | 53.93 |
| 22 | −112.0244 | 2.60 | 1.0 | |
| 23 | 66.9873 | 12.00 | 1.49782 | 82.52 |
| 24 | −47.2487 | 0.10 | 1.0 | |
| 25 | −116.3858 | 6.30 | 1.83400 | 37.35 |
| 26 | 34.2324 | (D26) | 1.0 | |
| 27 | 125.4407 | 4.95 | 1.70154 | 41.15 |
| 28 | −72.2240 | 3.10 | 1.0 | |
| 29 | −43.6389 | 1.00 | 1.83500 | 42.97 |
| 30 | −64.4054 | (Bf) | 1.0 | |

TABLE 13b

ASPHERIC COEFFICIENTS

S7   r = −7.8623   $C_4 = +4.6110 \times 10^{-7}$   $C_6 = -4.1866 \times 10^{-10}$
///   $C_8 = +1.2514 \times 10^{-12}$   $C_{10} = -9.7310 \times 10^{-16}$
S21   r = 2.8770   $C_4 = -3.2424 \times 10^{-6}$   $C_6 = -1.7925 \times 10^{-9}$
///   $C_8 = +1.0193 \times 10^{-12}$   $C_{10} = -4.6187 \times 10^{-15}$

TABLE 13c

VARIABLE SPACING WHEN VARYING POWER (ZOOMING) FOCUSED ON OBJECT AT ∞

| Lens Position | a | b | c | d |
|---|---|---|---|---|
| f | 28.8000 | 70.0000 | 139.9985 | 193.9971 |
| D6 | 1.4667 | 26.7287 | 47.6556 | 55.0299 |
| D11 | 8.3049 | 8.3049 | 11.1757 | 13.9284 |
| D14 | 46.0314 | 21.9738 | 8.9055 | 1.7500 |
| D20 | 39.5925 | 11.1567 | 3.4583 | 1.6000 |
| D26 | 3.8441 | 12.4549 | 6.7700 | 3.6349 |
| Bf | 38.0000 | 57.8242 | 71.2070 | 76.2000 |
| f | 28.8000 | 70.0000 | 140.0000 | 194.0000 |
| Δ3 | 1.9265 | 1.6452 | 2.0334 | 2.3486 |

TABLE 13d

DESIGN  
CONDITION VALUES:

$f_1 = 116.04455$  
$f_2 = -42.25306$  
$f_3 = -78.71789$  
$f_4 = 88.79801$  
$f_5 = 129.65876$  
$f_6 = 106.51749$  
(21) $f_5/f_6 = 1.217$  
(22) $D_1/(f_t - f_w) = 0.090$  
(23) $D_2/(f_w \cdot f_t)^{1/2} = 0.517$  
(24) $D_5/(f_w \cdot f_t)^{1/2} = 0.508$  
(25) $\Delta 2/(|f_2| + |f_3|) = 0.046$  
(26) $f_1/(f_w \cdot f_t)^{1/2} = 1.552$ The zoom lenses of Working Examples 11, 12 and 13 of the present invention as described above, have an aperture ratio on the order of FNO No. 2.8, a field angle in the wide-angle state exceeding 75°, and a zoom ratio on the order of 7×. In addition, a reduction in the lens diameter and a reduction in the overall length of the lens in the telephoto state were simultaneously achieved by the appropriate use of aspherical surfaces. An increased zoom ratio and aperture size, or increased compactness may be attained by the further use of aspherical surfaces. Also, in Working Example 11, when zooming from the wide-angle state to the telephoto state, first lens group G1 is fixed at a position along the optical axis. However, this first lens group may also be moved in the range consistent with design condition (2).

WORKING EXAMPLES 14–16

Figure 19:
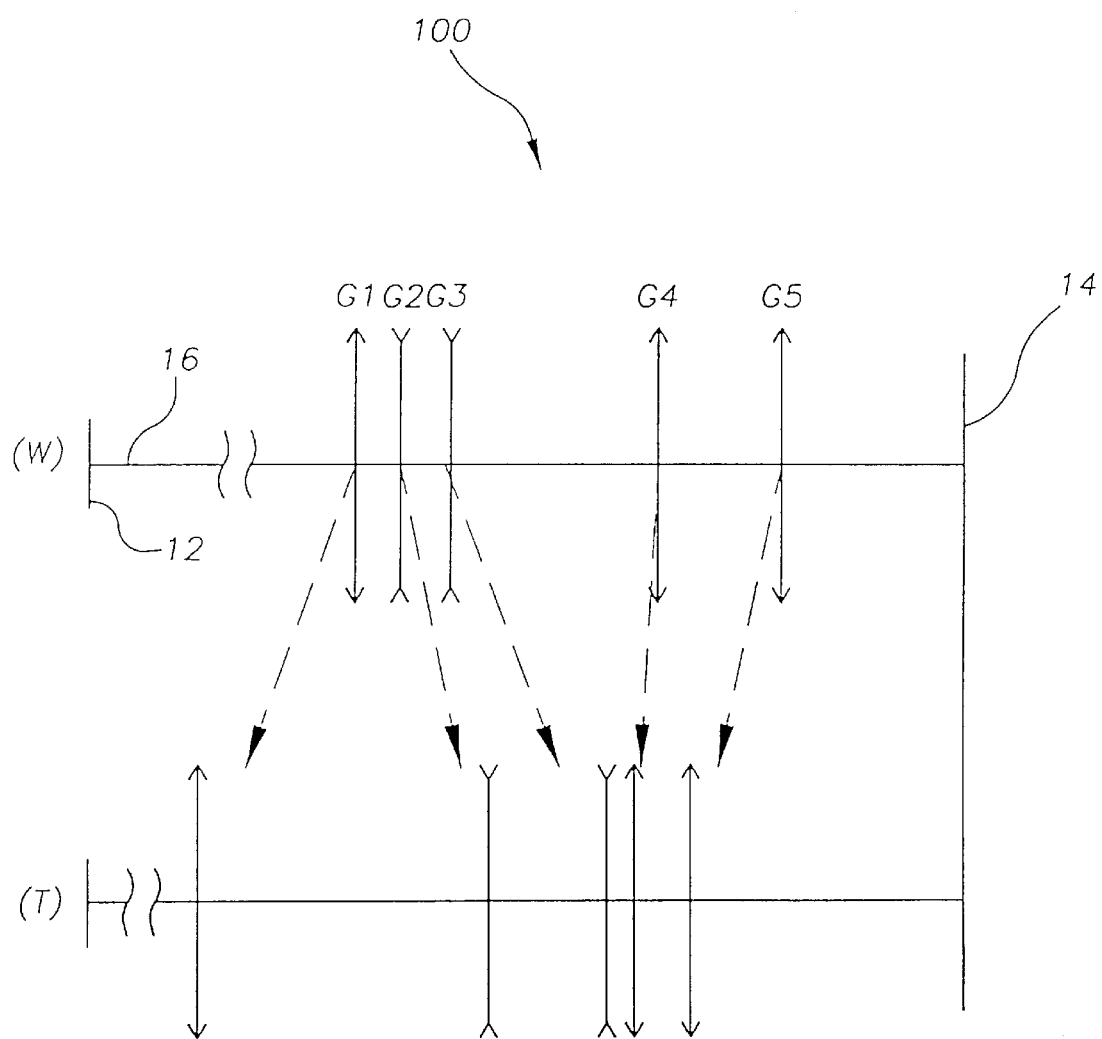
FIG. 19 is a schematic optical diagram of the lens groups comprising the zoom lens of Working Examples 14–16 of the present invention, with dashed arrows depicting the movement of each lens group when zooming from the extreme wide-angle state (W) to the extreme telephoto state (T)

Next, Working Examples 14–16 according to the present invention are discussed. With reference to FIG. 19, zoom lens 100 represents Working Examples 14–16 and comprises, objectwise to imagewise, a first lens group G1 having positive refractive power, a second lens group G2 having negative refractive power, a third lens group G3 having negative refractive power, a fourth lens group G4 having a positive refractive power, and a fifth lens group G5 having positive refractive power. Accordingly, when zooming from the wide-angle state to the telephoto state, at least second lens group G2 and third lens group G3 move imagewise, and fifth lens group G5 moves objectwise so that the air space between first lens group G1 and second lens group G2 increases, the air space between second lens group G2 and third lens group G3 increases, the air space between third lens group G3 and fourth lens group G4 decreases, and the air space between fourth lens group G4 and fifth lens group G5 decreases.

Working Example 14

Figure 20:
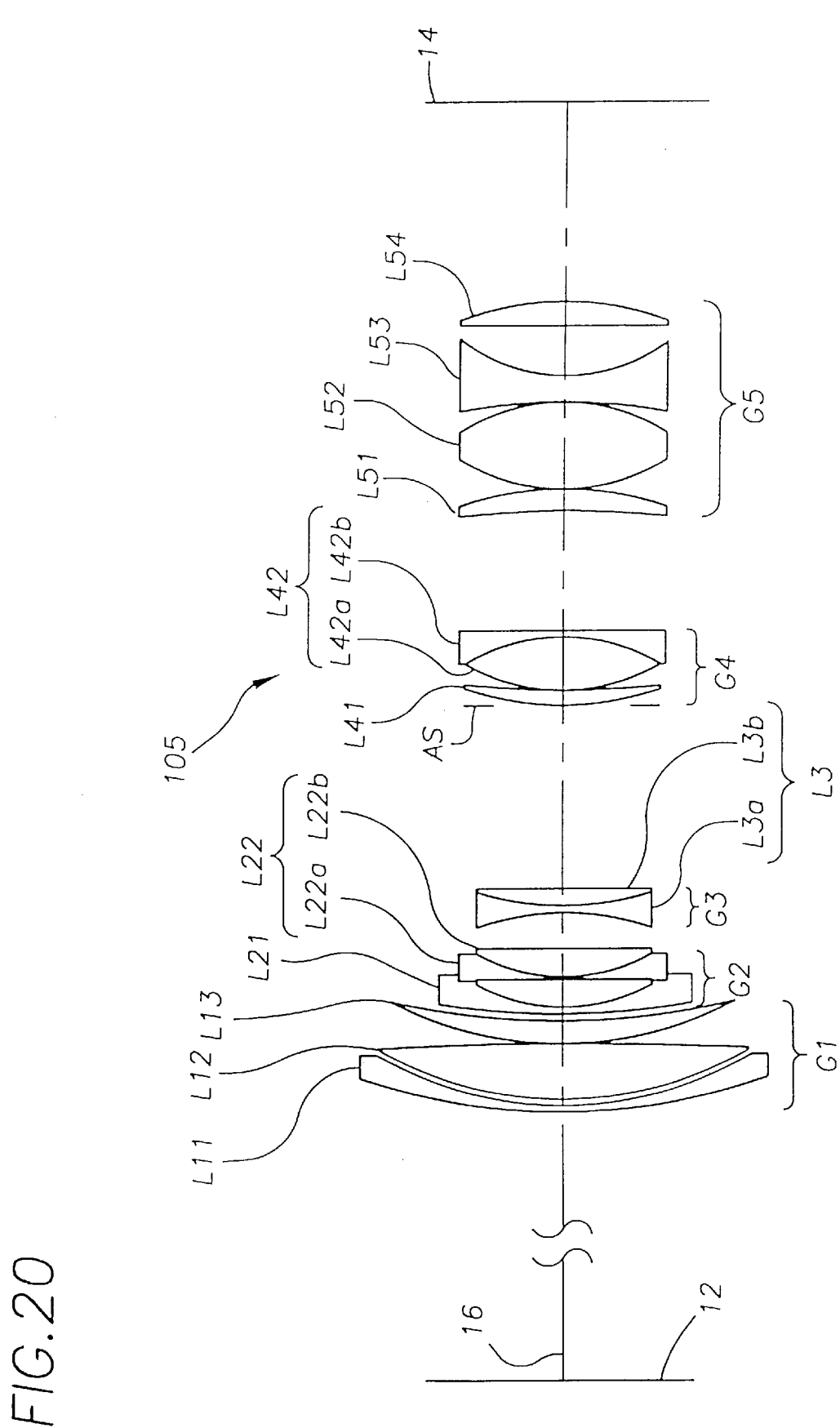
FIG. 20 is an optical diagram of the configuration of the zoom lens according to Working Example 14 of the present invention.

FIG. 20 shows the lens configuration of a zoom lens 105 according to Working Example 14 of the present invention. Lens groups G1–G4 of zoom lens 105 have the same basic configuration as lens groups G1–G4 of zoom lens 45 of FIG. 8 (Working Example 5). Fifth lens group G5 comprises a positive biconvex lens L51, a biconvex lens L52, a biconcave lens L53 and a biconvex lens L54. An aperture stop AS is located between third lens group G3 and fourth lens group G4, and moves together with fourth lens group G4. The aperture stop diameter increases as the lens positional state changes from the wide-angle state to the telephoto state. In addition, third lens group G3 moves objectwise when focusing at close range.

Tables 14a–d list the design values and design conditions for Working Example 14 according to the present invention.

TABLE 14a

DESIGN TABLE

| f | 28.80 | 70.00 | 140.00 | 194.00 |
|---|---|---|---|---|
| FNO | 2.90 | 2.90 | 2.90 | 2.90 |
| 2ω | 76.19 | 33.30 | 17.03 | 12.34° |
| Aperture Diameter | 25.02 | 31.46 | 35.32 | 35.98 |

| S | r | d | n | ν |
|---|---|---|---|---|
| 1 | 132.3062 | 1.500 | 1.84666 | 23.83 |
| 2 | 79.2121 | 1.000 | 1.0 | |
| 3 | 78.3091 | 11.200 | 1.60309 | 65.42 |
| 4 | −532.8922 | 0.100 | 1.0 | |
| 5 | 73.5167 | 4.300 | 1.65160 | 58.44 |
| 6 | 126.0337 | (D6) | 1.0 | |
| 7 | 193.2957 | 1.200 | 1.77250 | 49.61 |
| 8 | 30.4799 | 7.950 | 1.0 | |
| 9 | −225.6733 | 0.900 | 1.77250 | 49.61 |
| 10 | 58.5416 | 3.900 | 1.84666 | 23.83 |
| 11 | ∞ | (D11) | 1.0 | |
| 12 | −44.9319 | 1.000 | 1.62280 | 56.93 |
| 13 | 52.8818 | 3.250 | 1.84666 | 23.83 |
| 14 | 227.8615 | (D14) | 1.0 | |
| 15 | ∞ | 0.700 | 1.0 | |
| 16 | 88.1418 | 3.300 | 1.59319 | 67.87 |
| 17 | −578.8843 | 0.100 | 1.0 | |
| 18 | 49.4409 | 8.650 | 1.49782 | 82.52 |
| 19 | −52.6791 | 1.000 | 1.83500 | 42.97 |
| 20 | 1988.2645 | (D20) | 1.0 | |
| 21 | 406.5779 | 4.000 | 1.69680 | 45.48 |
| 22 | −92.0325 | 0.100 | 1.0 | |
| 23 | 67.9050 | 13.000 | 1.65160 | 58.44 |
| 24 | −50.3510 | 0.100 | 1.0 | |
| 25 | −76.7669 | 7.000 | 1.83400 | 37.35 |
| 26 | 43.6883 | 7.000 | 1.0 | |
| 27 | 930.6501 | 4.650 | 1.62041 | 60.35 |
| 28 | −56.3613 | (Bf) | 1.0 | |

TABLE 14b

ASPHERIC COEFFICIENTS

S7  r = 7.3794     $C_4 = +3.85273 \times 10^{-7}$   $C_6 = -1.17922 \times 10^{-9}$  
///  $C_8 = +2.51899 \times 10^{-12}$  $C_{10} = -1.71315 \times 10^{-15}$  
S21  r = 11.0000    $C_4 = -4.22179 \times 10^{-6}$   $C_6 = -7.52773 \times 10^{-10}$  
///  $C_8 = -5.36928 \times 10^{-13}$  $C_{10} = -2.80474 \times 10^{-15}$

TABLE 14c

VARIABLE SPACING WHEN VARYING POWER (ZOOMING)  
FOCUSED ON OBJECT AT ∞

| Lens Position | a | b | c | d |
|---|---|---|---|---|
| f | 28.8000 | 70.0000 | 140.0007 | 194.0017 |
| D5 | 1.5000 | 27.0469 | 48.7470 | 52.2784 |
| D11 | 7.5535 | 10.8417 | 11.4417 | 12.0417 |
| D14 | 44.9410 | 18.4841 | 7.5263 | 1.7500 |

TABLE 14c-continued

VARIABLE SPACING WHEN VARYING POWER (ZOOMING) FOCUSED ON OBJECT AT ∞

| Lens Position | a | b | c | d |
|---|---|---|---|---|
| D21 | 21.9616 | 8.7679 | 3.8265 | 1.7958 |
| Bf | 50.2372 | 76.9262 | 89.3996 | 91.2335 |
| f | 28.8000 | 70.0000 | 140.0000 | 194.0000 |
| Δ3 | 1.7981 | 1..4367 | 1.8116 | 2.2466 |

TABLE 14d

DESIGN CONDITION VALUES:

$f_1 = 119.9234$
$f_2 = -42.0547$
$f_3 = -74.6172$
$f_4 = 85.9153$
$f_5 = 70.2983$
$f_b = -66.0953$
$f_{12t} = -423.364$
(28) $(r_1 + r_2)/(r_1 - r_2) = 0.886$
(29) $|f_b|/f_5 = 0.940$
(30) $(f_4 - f_5)/(f_4 + f_5) = 0.100$
(31) $f_1/|f_2| = 2.852$
(32) $(f_2 - f_3)/(f_2 + f_3) = -0.279$
(33) $f_1/|f_{12t}| = 0.458$

Working Example 15

Figure 21:
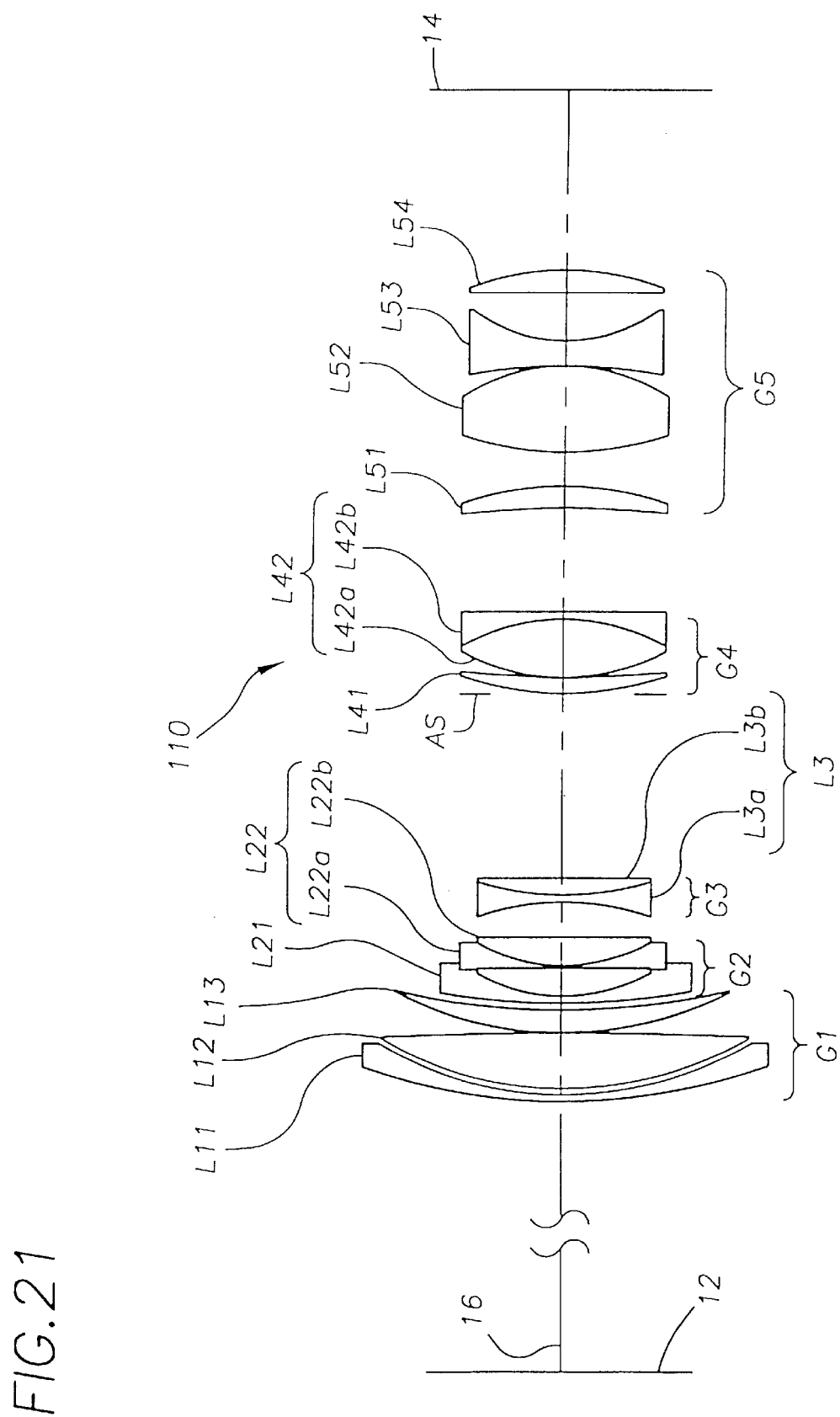
FIG. 21 is an optical diagram of the configuration of the zoom lens according to Working Example 15 of the present invention.
Figure 22:
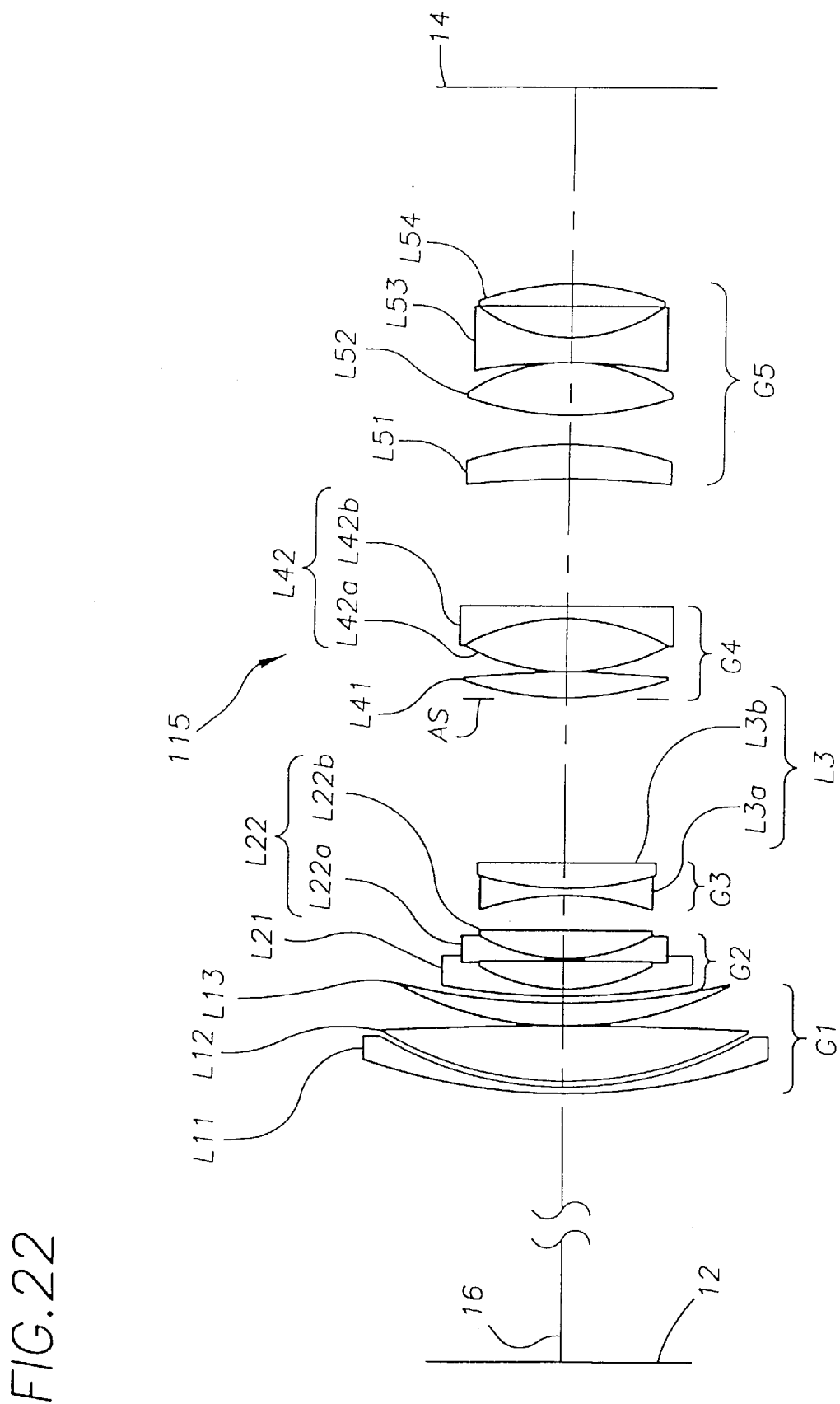
FIG. 22 is an optical diagram of the configuration of the zoom lens according to Working Example 16 of the present invention.

FIG. 21 shows the configuration of a zoom lens 110 according to Working Example 15 of the present invention. Zoom lens 110 has the same basic configuration as zoom lens 105 of FIG. 19 (Working Example 14). An aperture stop AS is located between third lens group G3 and fourth lens group G4, and moves together with fourth lens group G4.

The aperture stop diameter increases as the lens positional state changes from the wide-angle state to the telephoto state. Third lens group G3 moves objectwise when focusing at close range.

Tables 15a–d list the design values and design conditions for Working Example 15 of the present invention.

TABLE 15a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 76.27 | 33.30 | 17.03 | 12.34° |
| | Aperture Diameter | 24.98 | 31.28 | 35.18 | 35.86 |

| S | r | d | n | ν |
|---|---|---|---|---|
| 1 | 117.1024 | 1.500 | 1.92286 | 20.88 |
| 2 | 80.6231 | 1.000 | 1.0 | |
| 3 | 80.2776 | 10.580 | 1.60300 | 65.42 |
| 4 | -717.9301 | 0.100 | 1.0 | |
| 5 | 76.6585 | 4.400 | 1.65160 | 58.44 |

TABLE 15a-continued

DESIGN TABLE

| 6 | 131.1840 | (D6) | 1.0 | |
|---|---|---|---|---|
| 7 | 188.4345 | 1.200 | 1.80420 | 46.51 |
| 8 | 30.4799 | 7.920 | 1.0 | |
| 9 | -249.2295 | 0.900 | 1.77250 | 49.61 |
| 10 | 53.8578 | 3.940 | 1.84666 | 23.83 |
| 11 | ∞ | (D11) | 1.0 | |
| 12 | -44.0313 | 1.000 | 1.62280 | 56.93 |
| 13 | 51.8050 | 3.280 | 1.84666 | 23.83 |
| 14 | 221.8299 | (D14) | 1.0 | |
| 15 | ∞ | 0.700 | 1.0 | |
| 16 | 77.7674 | 3.450 | 1.59319 | 67.87 |
| 17 | -1048.4714 | 0.100 | 1.0 | |
| 18 | 53.4900 | 8.330 | 1.49782 | 82.52 |
| 19 | -51.9829 | 1.000 | 1.83500 | 42.97 |
| 20 | ∞ | (D20) | 1.0 | |
| 21 | 303.6197 | 3.000 | 1.75500 | 52.32 |
| 22 | -98.6602 | 3.600 | 1.0 | |
| 23 | 133.3430 | 13.000 | 1.60300 | 65.47 |
| 24 | -44.7587 | 0.100 | 1.0 | |
| 25 | -117.7427 | 7.000 | 1.80610 | 33.27 |
| 26 | 46.8016 | 6.470 | 1.0 | |
| 27 | 349.8673 | 3.560 | 1.80420 | 46.51 |
| 28 | -96.9906 | (Bf) | 1.0 | |

TABLE 15b

ASPHERIC COEFFICIENTS

S7   $r = -0.2776$   $C_4 = +5.03090 \times 10^{-7}$   $C_6 = -9.02122 \times 10^{-10}$
///  $C_8 = +1.84810 \times 10^{-12}$   $C_{10} = -1.26710 \times 10^{-15}$
S21  $r = 1.4967$   $C_4 = -4.76220 \times 10^{-6}$   $C_6 = -7.54770 \times 10^{-10}$
///  $C_8 = -1.39350 \times 10^{-12}$   $C_{10} = -5.68570 \times 10^{-16}$ TABLE 15c

VARIABLE SPACING WHEN VARYING POWER (ZOOMING) FOCUSED ON OBJECT AT ∞

| Lens Position | a | b | c | d |
|---|---|---|---|---|
| f | 28.8002 | 70.0004 | 140.0008 | 194.0009 |
| D5 | 1.5000 | 27.0603 | 48.2785 | 56.6649 |
| D11 | 8.2306 | 10.6283 | 11.2283 | 11.8283 |
| D14 | 43.4664 | 18.2124 | 7.4043 | 1.7500 |
| D21 | 21.1458 | 8.5565 | 3.6850 | 1.7000 |
| Bf | 50.8695 | 77.2317 | 90.0235 | 91.9270 |
| f | 28.8002 | 70.0004 | 140.0008 | 194.0009 |
| Δ3 | 1.7158 | 1.4068 | 1.7659 | 2.1887 |

TABLE 15d

DESIGN CONDITION VALUES:

$f_1 = 118.8613$
$f_2 = -41.5933$
$f_3 = -72.9824$
$f_4 = 86.3188$
$f_5 = 69.5681$
$f_b = -86.0682$
$f_{12t} = -424.898$
(28) $(r_1 + r_2)/(r_1 - r_2) = 0.566$
(29) $|f_b|/f_5 = 1.237$
(30) $(f_4 - f_5)/(f_4 + f_5) = 0.107$
(31) $f_1/|f_2| = 2.856$
(32) $(f_2 - f_3)/(f_2 + f_3) = -0.274$
(33) $f_t/|f_{12t}| = 0.457$

Working Example 16

FIG. 21 shows the configuration of a zoom lens 115 according to Working Example 16 of the present invention. Zoom lens 115 has the same basic configuration as zoom lens 110 of FIG. 20 (Working Example 15). An aperture stop AS is located between third lens group G3 and fourth lens group G4 and moves together with fourth lens group G4. The aperture stop diameter increases as the lens positional state from the wide-angle state to the telephoto state. Third lens group G3 moves objectwise when focusing at close range.

Tables 16a–d list the design values and design conditions for Working Example 16 of the present invention.

TABLE 16a

DESIGN TABLE

| | f | 28.80 | 70.00 | 140.00 | 194.00 |
|---|---|---|---|---|---|
| | FNO | 2.90 | 2.90 | 2.90 | 2.90 |
| | 2ω | 76.25 | 33.30 | 17.03 | 12.34° |
| | Aperture Diameter | 25.62 | 32.20 | 26.52 | 32.20 |

| S | r | d | n | ν |
|---|---|---|---|---|
| 1 | 115.8022 | 1.500 | 1.92286 | 20.88 |
| 2 | 79.4173 | 1.000 | 1.0 | |
| 3 | 79.0424 | 10.730 | 1.60300 | 65.42 |
| 4 | -701.5145 | 0.100 | 1.0 | |
| 5 | 76.7245 | 4.330 | 1.65160 | 58.44 |
| 6 | 127.3222 | (D6) | 1.0 | |
| 7 | 182.6349 | 1.200 | 1.80420 | 46.51 |
| 8 | 30.2450 | 8.060 | 1.0 | |
| 9 | -219.8733 | 0.900 | 1.77250 | 49.61 |
| 10 | 46.8071 | 4.360 | 1.84666 | 23.83 |
| 11 | ∞ | (D11) | 1.0 | |
| 12 | -42.8771 | 1.000 | 1.62280 | 56.93 |
| 13 | 54.7586 | 6.030 | 1.84666 | 23.83 |
| 14 | 268.8082 | (D14) | 1.0 | |
| 15 | ∞ | 0.700 | 1.0 | |
| 16 | 94.9355 | 3.940 | 1.49782 | 82.52 |
| 17 | -208.7690 | 0.100 | 1.0 | |
| 18 | 50.5793 | 9.220 | 1.49782 | 82.52 |
| 19 | -55.6780 | 1.000 | 1.83400 | 37.35 |
| 20 | 3712.9134 | (D20) | 1.0 | |
| 21 | 240.6326 | 7.850 | 1.74330 | 49.23 |
| 22 | -93.7463 | 4.410 | 1.0 | |
| 23 | 118.8725 | 9.580 | 1.48749 | 70.45 |
| 24 | -42.3887 | 0.100 | 1.0 | |
| 25 | -158.9909 | 7.000 | 1.83400 | 37.35 |
| 26 | 46.9155 | 4.300 | 1.0 | |
| 27 | 269.8997 | 3.500 | 1.80420 | 46.51 |
| 28 | -113.1850 | (Bf) | 1.0 | |

TABLE 16b

ASPHERIC COEFFICIENTS

S7   $r = -4.2993$    $C_4 = +5.73421 \times 10^{-7}$   $C_6 = -9.28161 \times 10^{-10}$
///  $C_8 = +1.88381 \times 10^{-12}$   $C_{10} = -1.29468 \times 10^{-15}$
S21  $r = 8.7601$    $C_4 = -4.85424 \times 10^{-6}$   $C_6 = -1.26065 \times 10^{-9}$
///  $C_8 = -2.95632 \times 10^{-13}$   $C_{10} = -2.74874 \times 10^{-15}$

TABLE 16c

VARIABLE SPACING WHEN VARYING POWER (ZOOMING) FOCUSED ON OBJECT AT ∞

| Lens Position | a | b | c | d |
|---|---|---|---|---|
| f | 28.7999 | 69.9997 | 139.9991 | 193.9984 |
| D5 | 1.5000 | 27.1463 | 48.4908 | 56.9003 |
| D11 | 8.2407 | 10.0787 | 10.6787 | 11.2787 |
| D14 | 43.0788 | 17.8880 | 7.2001 | 1.7500 |
| D21 | 22.6609 | 8.8857 | 3.7274 | 1.7000 |
| Bf | 52.6277 | 80.2031 | 94.4433 | 97.4598 |
| f | 28.7999 | 69.9997 | 139.9991 | 193.9984 |
| Δ3 | 1.6616 | 1.3566 | 1.6640 | 2.0157 |

TABLE 16d

DESIGN CONDITION VALUES:

$f_1 = 120.2915$
$f_2 = -41.0605$
$f_3 = -73.0708$
$f_4 = 84.8082$
$f_5 = 72.6558$
$f_b = -84.7356$
$f_{12t} = -374.623$
(28) $(r_1 + r_2)/(r_1 - r_2) = 0.409$
(29) $|f_b|/f_5 = 1.166$
(30) $(f_4 - f_5)/(f_4 + f_5) = 0.077$
(31) $f_1/|f_2| = 2.930$
(32) $(f_2 - f_3)/(f_2 + f_3) = -0.280$
(33) $f_t/|f_{12t}| = 0.518$

According to the various Working Examples of the present invention as set forth above, a zoom lens was achieved having an aperture ratio on the order of FNO 2.8, a field angle in the wide-angle state exceeding 75°, and a zoom ratio on the order of 7×. In addition, in each Working Example, a reduction in the lens diameter and a reduction in the overall length of the lens in the telephoto state was simultaneously achieved by the appropriate introduction of aspherical surfaces. The aperture size, zoom ratio, and zoom lens compactness could be further increased by the further introduction of aspherical surfaces.

In Working Examples 1 through 16 of the present invention, set forth above, aberrations are substantially and satisfactorily corrected at a brightness of FNO 2.8 in each focal length state from the maximum wide-angle state (f=28.8 mm) to the maximum telephoto state (f=194.0 mm), and aberrations are satisfactorily corrected in the image plane within a range up to an image height of 21.6 mm. Furthermore, in Working Examples 4–16, correction of aberrations is satisfactorily achieved at a brightness of imagewise numerical aperture NA=0.17 even in a close-range focus state wherein the lateral magnification is approximately −1/30, and correction of aberrations is satisfactorily achieved in the image plane within a range up to an image height of 21.6 mm.

In addition, in the Working Examples set forth above, at least one entire lens group among the plurality of lens groups G1 to G6 comprising the zoom lens could also be non-axially provided, or certain sub-lens groups among at least one lens group among the plurality of lens groups G1 to G5 could also be non-axially movably provided. Also, a blur (i.e., anti-vibration) detection system, as discussed above, can be built into the zoom lens. Consequently, image blurring can be corrected by detecting vibration of the zoom lens by the blur detection system, and shifting the image by shifting the eccentric lens group(s) by the drive means such that the detected blurring is corrected. Based on such a configuration, it is possible to prevent failures due to image blurring caused by hand vibration and the like, which tends to occur with high zoom ratio zoom lenses.

In each of the Working Examples described above, the radius of curvature, surface spacing and focal length are in units of mm, and each numerical working example has an image circle ideally suited to Leica-sized (Leica format: 24×36 mm) film. However, the present invention is not limited only to the use of Leica-sized film. For example, it is also suited to use in advanced photo systems (APS: 18×24 mm) film, and to image pickup devices like CCDs.

The abovementioned preferred embodiments for carrying out the present invention are strictly intended to clarify the technical details of the present invention; therefore, the present invention is not limited to the abovementioned preferred embodiments for carrying out the present invention, nor shall it be interpreted in the narrow sense. Alternatives, modifications and equivalents can be constructed within the scope of the present invention as defined in the appended claims.

What is claimed is:

1. A zoom lens capable of forming an image of an object and zooming between a maximum wide-angle state and a maximum telephoto state, the zoom lens comprising objectwise to imagewise:
    a) a first lens group having overall positive refractive power;
    b) a second lens group having overall negative refractive power and separated from said first lens group by a first air space;
    c) a third lens group having overall negative refractive power and separated from said second lens group by a second air space, said third lens group being axially moveable for focusing;
    d) a fourth lens group having overall positive refractive power and separated from said third lens group by a third air space;
    e) wherein the zoom lens is designed such that when zooming from the maximum wide-angle state to the maximum telephoto state, at least one lens group among said first lens group and said fourth lens group moves axially and said second lens group moves axially imagewise so as to increase said first and second air spaces, and decrease said third air space; and
    f) the following conditions are satisfied:

$$-0.5 < \phi 12_t \cdot f_t < 0.3$$

$$0.8 < |f_3|/(f_w \cdot f_t)^{1/2} < 1.2$$

wherein $f_3$ is the focal length of said third lens group $\phi 12_t$ is the composite refractive power of said first lens group and said second lens group in the maximum telephoto state, $f_w$ is the focal length of the zoom lens in the maximum wide-angle state, and $f_t$ is the focal length of the zoom lens in the maximum telephoto state.

2. A zoom lens according to claim 1, further including:
    a) a fifth lens group having overall a positive refractive power provided imagewise of said fourth lens group and separated from said fourth lens group by a fourth air space; and
    b) wherein the zoom lens is designed such that when changing the lens positional state from the maximum wide-angle state to the maximum telephoto state, said fifth lens group moves objectwise so as to decrease said fourth air space.

3. A zoom lens according to claim 2, further including
    a) a sixth lens group having overall a negative refractive power and arranged imagewise of said fifth lens group and separated from said fifth lens group by a fifth air space; and
    b) wherein the zoom lens is designed such that when changing the lens positional state from the maximum wide-angle state to the maximum telephoto state, said sixth lens group moves objectwise so as to change said fifth air space.

4. A zoom lens according to claim 1 satisfying the condition $$2 < |\phi MAX| \cdot f_t < 8$$

wherein $\phi MAX$ is the refractive power of the lens group having the strongest refractive power among said lens groups comprising said zoom lens, and $f_t$ is the focal length of the zoom lens in the maximum telephoto state.

5. A zoom lens according to claim 4 satisfying the condition $$0.9 < |\phi 2 + \phi 3| \cdot f_w < 1.3$$

wherein $\phi 2$ is the refractive power of said second lens group, $\phi 3$ is the refractive power of said third lens group, and $f_w$ is the focal length of the entire zoom lens in the maximum wide-angle state.

6. A zoom lens according to claim 5 satisfying the condition $$0.7 < |f_3|/f_4 < 1.0$$

wherein $f_3$ is the focal length of said third lens group and $f_4$ is the focal length of said fourth lens group.

7. A zoom lens according to claim 1 satisfying the condition $$1.5 < f_1/D_{12t} < 2.5$$

wherein $f_1$ is the focal length of said first lens group, and $D_{12t}$ is the axial extent of said first air space in the maximum telephoto state.

* * * * *